(12) United States Patent
Takatsuka et al.

(10) Patent No.: US 12,088,907 B2
(45) Date of Patent: Sep. 10, 2024

(54) SENSOR DEVICE AND SIGNAL PROCESSING METHOD WITH OBJECT DETECTION USING ACQUIRED DETECTION SIGNALS

(71) Applicant: Sony Group Corporation, Tokyo (JP)

(72) Inventors: Susumu Takatsuka, Tokyo (JP); Hiroki Tetsukawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 299 days.

(21) Appl. No.: 17/606,837

(22) PCT Filed: Apr. 25, 2020

(86) PCT No.: PCT/JP2020/017872
§ 371 (c)(1),
(2) Date: Oct. 27, 2021

(87) PCT Pub. No.: WO2020/250584
PCT Pub. Date: Dec. 17, 2020

(65) Prior Publication Data
US 2022/0210317 A1   Jun. 30, 2022

(30) Foreign Application Priority Data
Jun. 14, 2019   (JP) .................................. 2019-111094

(51) Int. Cl.
*H04N 23/62*     (2023.01)
*H04N 23/80*     (2023.01)

(52) U.S. Cl.
CPC ............ *H04N 23/62* (2023.01); *H04N 23/80* (2023.01)

(58) Field of Classification Search
None
See application file for complete search history.

(56) References Cited

U.S. PATENT DOCUMENTS 8,520,095 B2 * 8/2013 Uchida ................ H04N 23/951
348/229.1
9,465,444 B1   10/2016 Ramaswamy
(Continued)

FOREIGN PATENT DOCUMENTS

| CN | 102387344 A | 3/2012 |
|----|-------------|--------|
| CN | 103190144 A | 7/2013 |

(Continued)

OTHER PUBLICATIONS

Kawai, Yoshihiko, "Face Recognition Technique for TV Program Video", NHK Science & Technology Research Laboratories, No. 164, pp. 23 to 30, Aug. 2017.

(Continued)

*Primary Examiner* — Cynthia Segura
(74) *Attorney, Agent, or Firm* — Michael Best & Friedrich LLP

(57) ABSTRACT

A sensor device includes an array sensor that includes a plurality of visible light or invisible light imaging elements arranged one-dimensionally or two-dimensionally, an image processing unit that performs image processing for image signals obtained by image capturing using the array sensor, and a threshold setting unit. The threshold setting unit sets a threshold used for parameter setting for all or some of parameters used for image capturing processing associated with image capturing performed by the array sensor or image processing performed by the image processing unit to achieve a process using the parameter changed on the basis of the threshold.

18 Claims, 37 Drawing Sheets

(56) References Cited

U.S. PATENT DOCUMENTS

| | | | |
|---|---|---|---|
| 2002/0080998 A1 | 6/2002 | Matsukawa | |
| 2005/0157169 A1* | 7/2005 | Brodsky | G08B 13/19652 |
| | | | 348/169 |
| 2008/0089557 A1 | 4/2008 | Iwaki | |
| 2009/0157264 A1 | 6/2009 | Linsenmaier | |
| 2013/0050502 A1* | 2/2013 | Saito | G06T 7/20 |
| | | | 348/169 |
| 2014/0198951 A1 | 7/2014 | Aoba | |
| 2014/0313381 A1 | 10/2014 | Isobe | |
| 2015/0178930 A1* | 6/2015 | Gao | G06F 16/78 |
| | | | 382/103 |
| 2015/0341535 A1 | 11/2015 | Forutanpour | |
| 2015/0350726 A1* | 12/2015 | Tan | H04N 19/136 |
| | | | 348/441 |
| 2015/0358549 A1 | 12/2015 | Cho | |
| 2016/0117848 A1 | 4/2016 | Hattori | |
| 2016/0173752 A1 | 6/2016 | Caviedes | |
| 2017/0161569 A1 | 6/2017 | Ren | |
| 2017/0337435 A1 | 11/2017 | Uliyar | |
| 2018/0232587 A1 | 8/2018 | Wang | |
| 2019/0149752 A1 | 5/2019 | Takahashi | |
| 2019/0158732 A1 | 5/2019 | Shimauchi | |
| 2019/0171897 A1 | 6/2019 | Merai | |
| 2020/0014898 A1* | 1/2020 | Imai | G06V 20/58 |
| 2021/0192692 A1* | 6/2021 | Takatsuka | H04N 7/18 |
| 2021/0225013 A1* | 7/2021 | Kim | G06V 40/10 |
| 2021/0256286 A1* | 8/2021 | Takatsuka | H04N 23/667 |
| 2021/0258518 A1* | 8/2021 | Takatsuka | H04N 25/40 |
| 2022/0296081 A1* | 9/2022 | Nygaard Espeland | |
| | | | G06F 18/24133 |
| 2022/0301319 A1* | 9/2022 | Horiba | G06V 20/56 |
| 2023/0111580 A1* | 4/2023 | Takatsuka | H04N 23/64 |
| | | | 348/222.1 |

FOREIGN PATENT DOCUMENTS

| | | |
|---|---|---|
| CN | 105050473 A | 11/2015 |
| CN | 106464801 A | 2/2017 |
| CN | 107896303 A | 4/2018 |
| CN | 107924458 A | 4/2018 |
| JP | 2002-259969 A | 9/2002 |
| JP | 2007318262 A | 12/2007 |
| JP | 2008054297 A | 3/2008 |
| JP | 2010-50877 A | 3/2010 |
| JP | 2010-74634 A | 4/2010 |
| JP | 2010086429 A | 4/2010 |
| JP | 2014225868 A | 12/2014 |
| JP | 2017-78877 A | 4/2017 |
| WO | WO-2007023992 A1 | 3/2007 |

OTHER PUBLICATIONS

International Search Report (PCT/ISA/210), International Application No. PCT/JP2020/017872, dated Jun. 30, 2020.

Yoshihiko Kawai, Face Recognition Technique for TV Program Video, NHK Science & Technology Research Laboratories / No. 164 / Aug. 2017 p. 23-p. 30.

Chen Z et al: "Locating target at high speed using image decimation decomposition processing", Pattern Recognition, Mar. 1, 2001 (Mar. 1, 2001), vol. 34, No. 3, pp. 685-694, Elsevier, GB, XP004321295.

* cited by examiner

FIG. 2
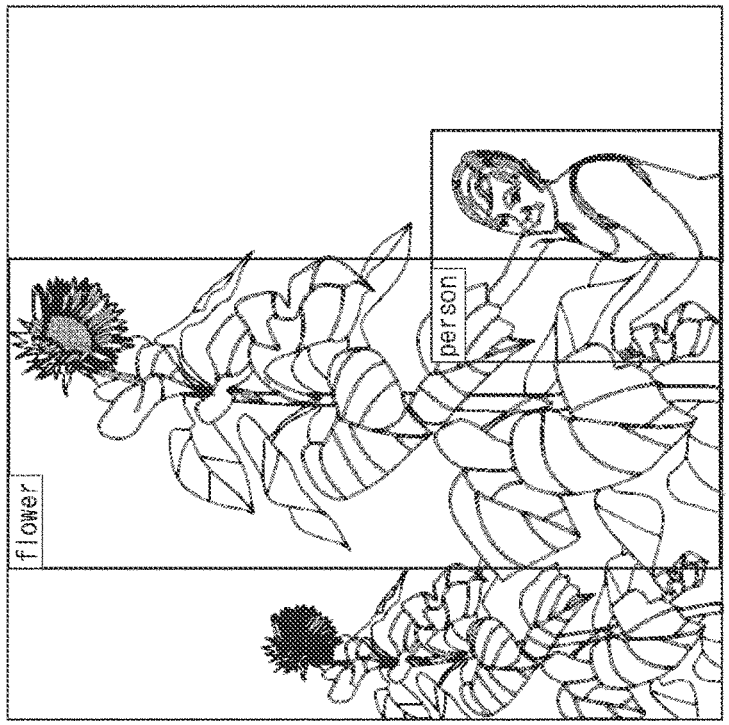
A. NORMAL IMAGE QUALITY ADJUSTMENT
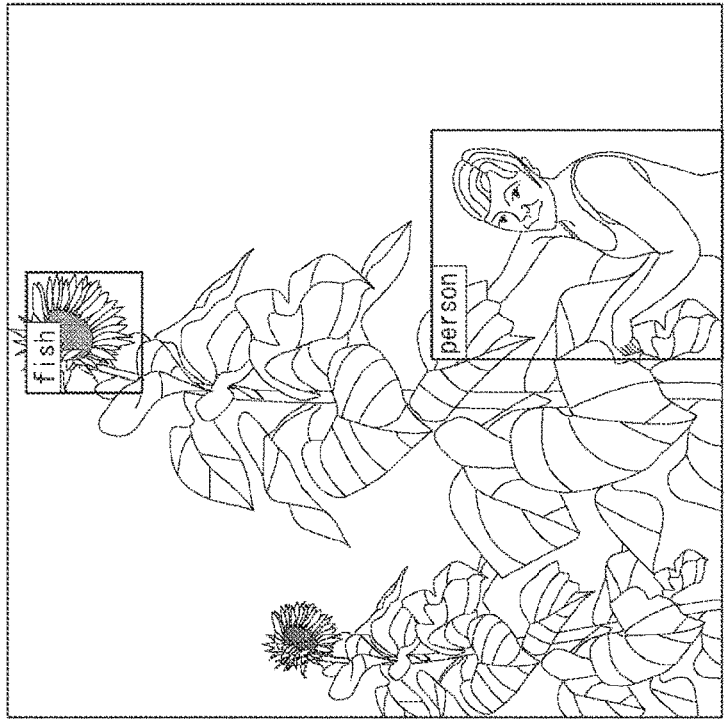
B. AFTER IMAGE QUALITY ADAPTATION FOR IMAGE RECOGNITION FIG.4
A  SD
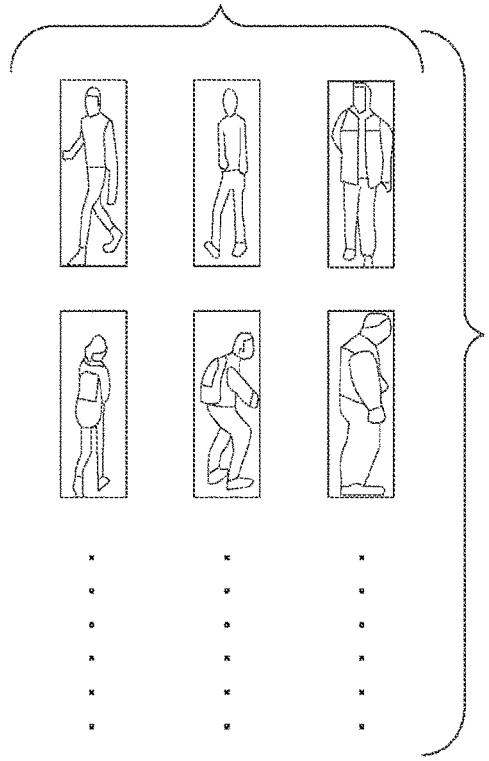
 Deep learning  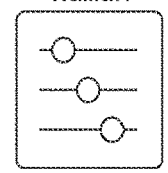 PR1 Human
B
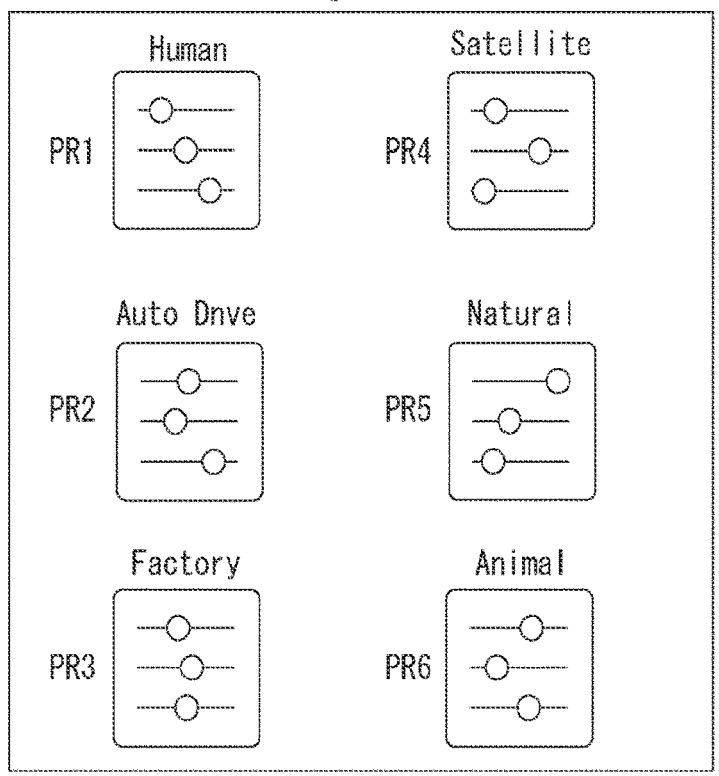

FIG. 7
A
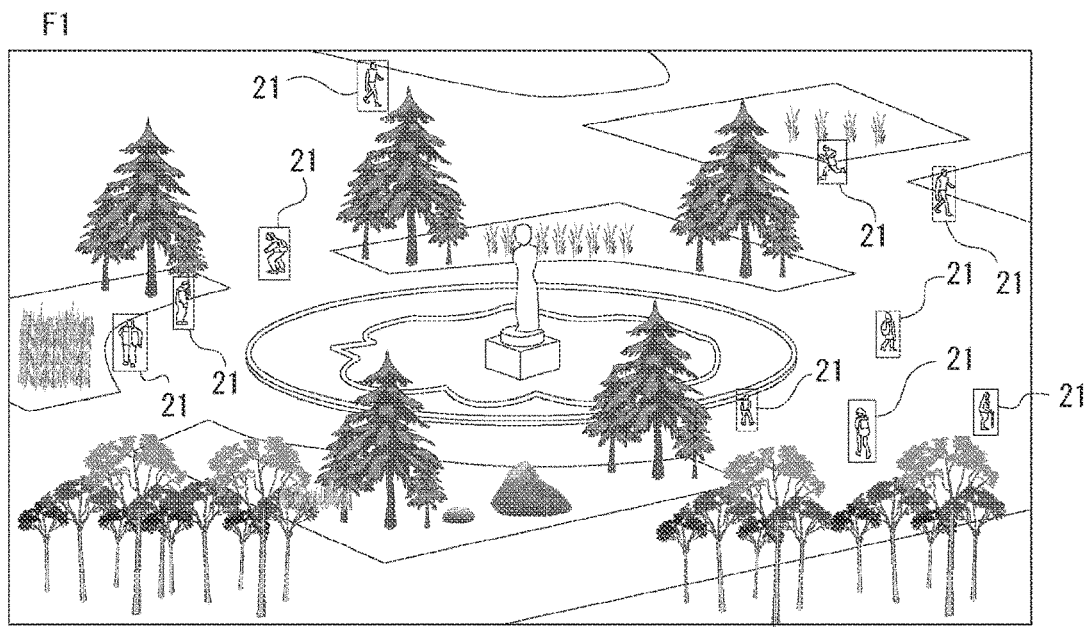
B
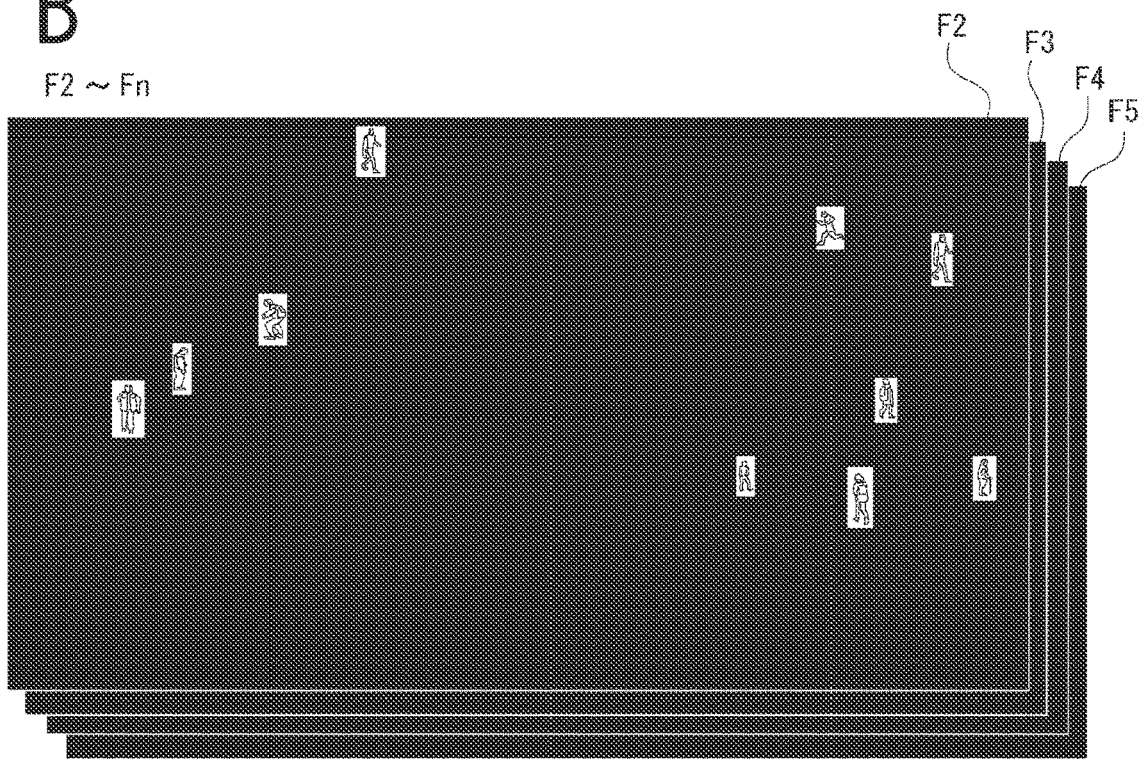

FIG.15
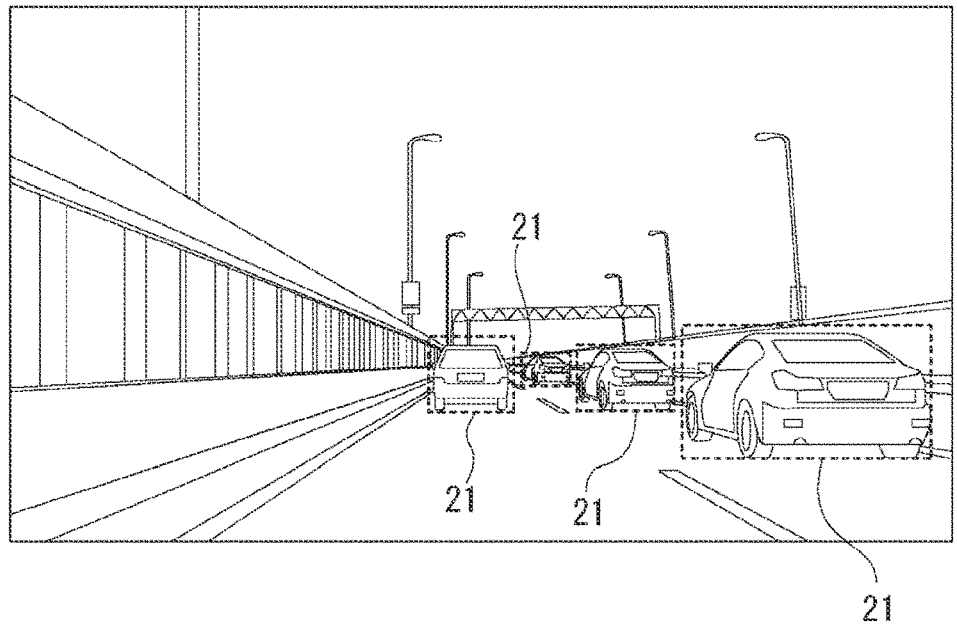
ROI CALCULATION
A
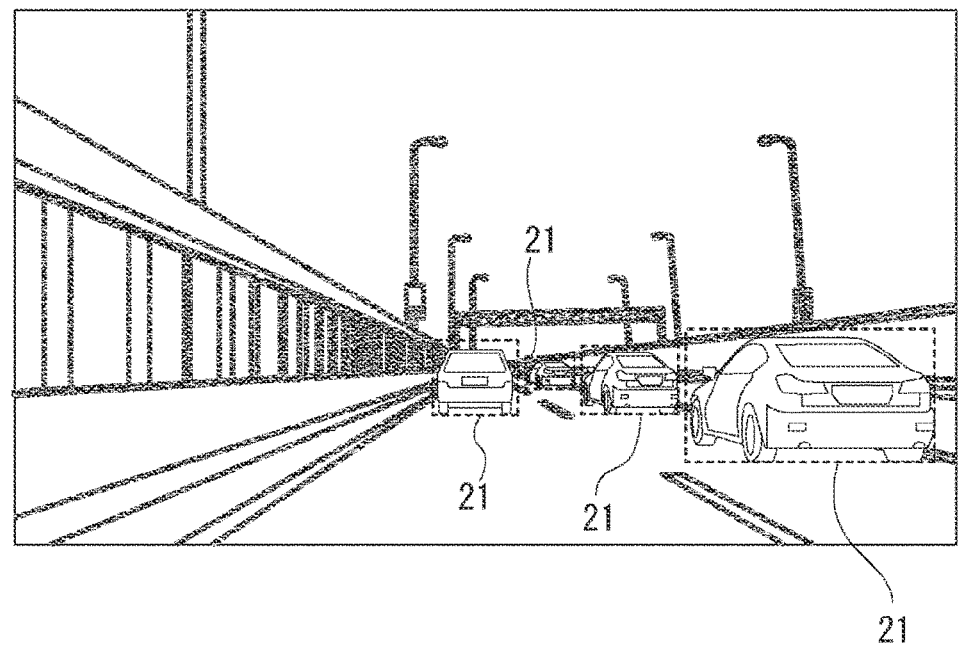
COMPRESSION PROCESS
B

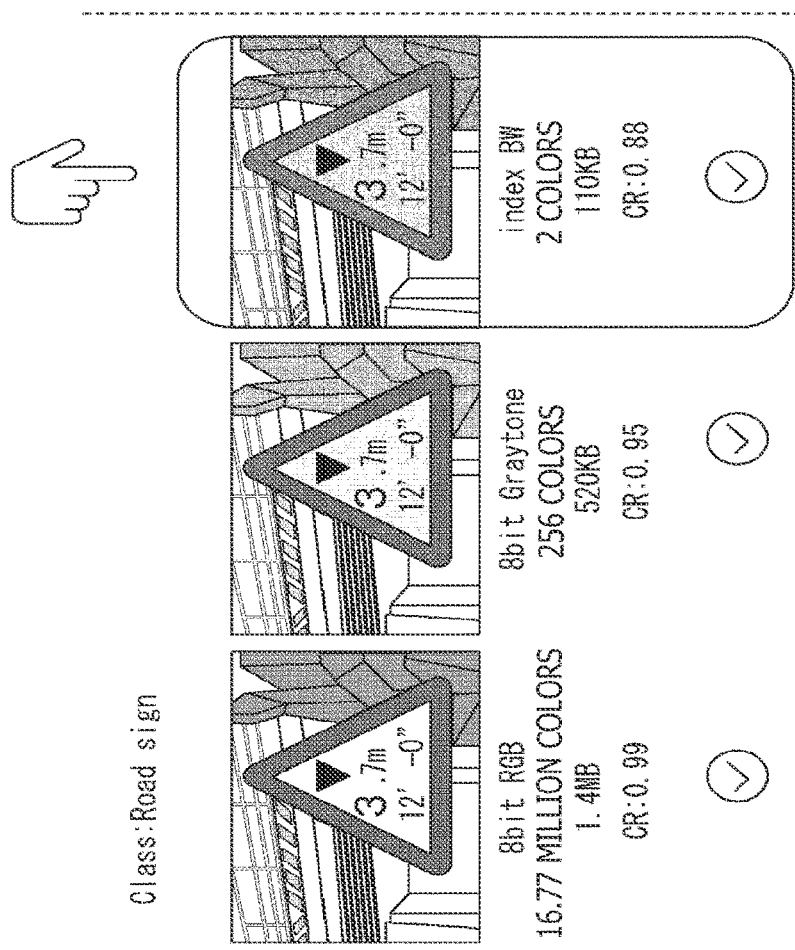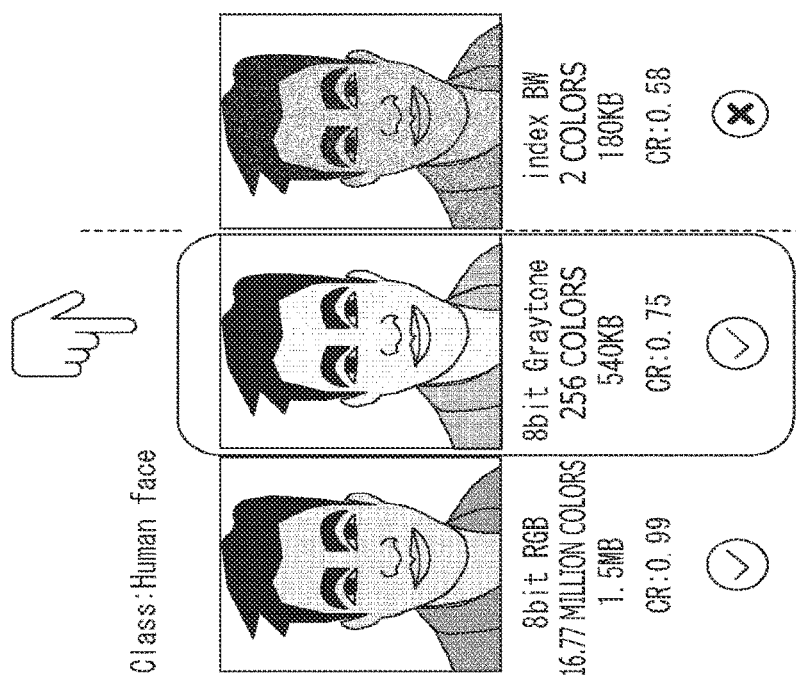
FIG. 20

FIG.23
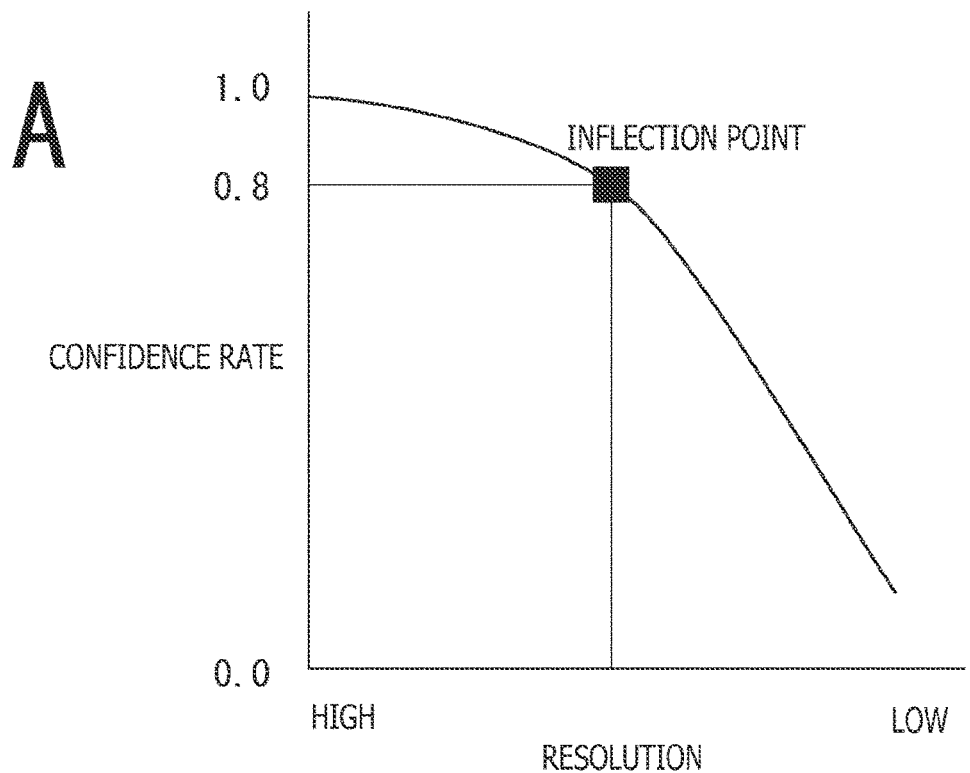
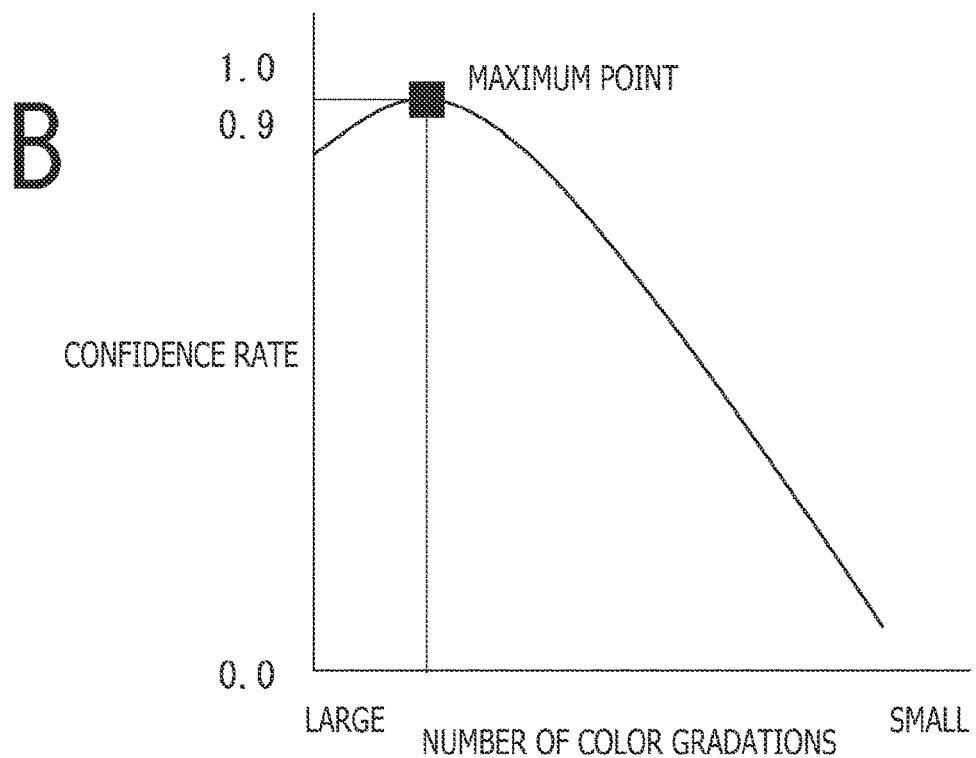

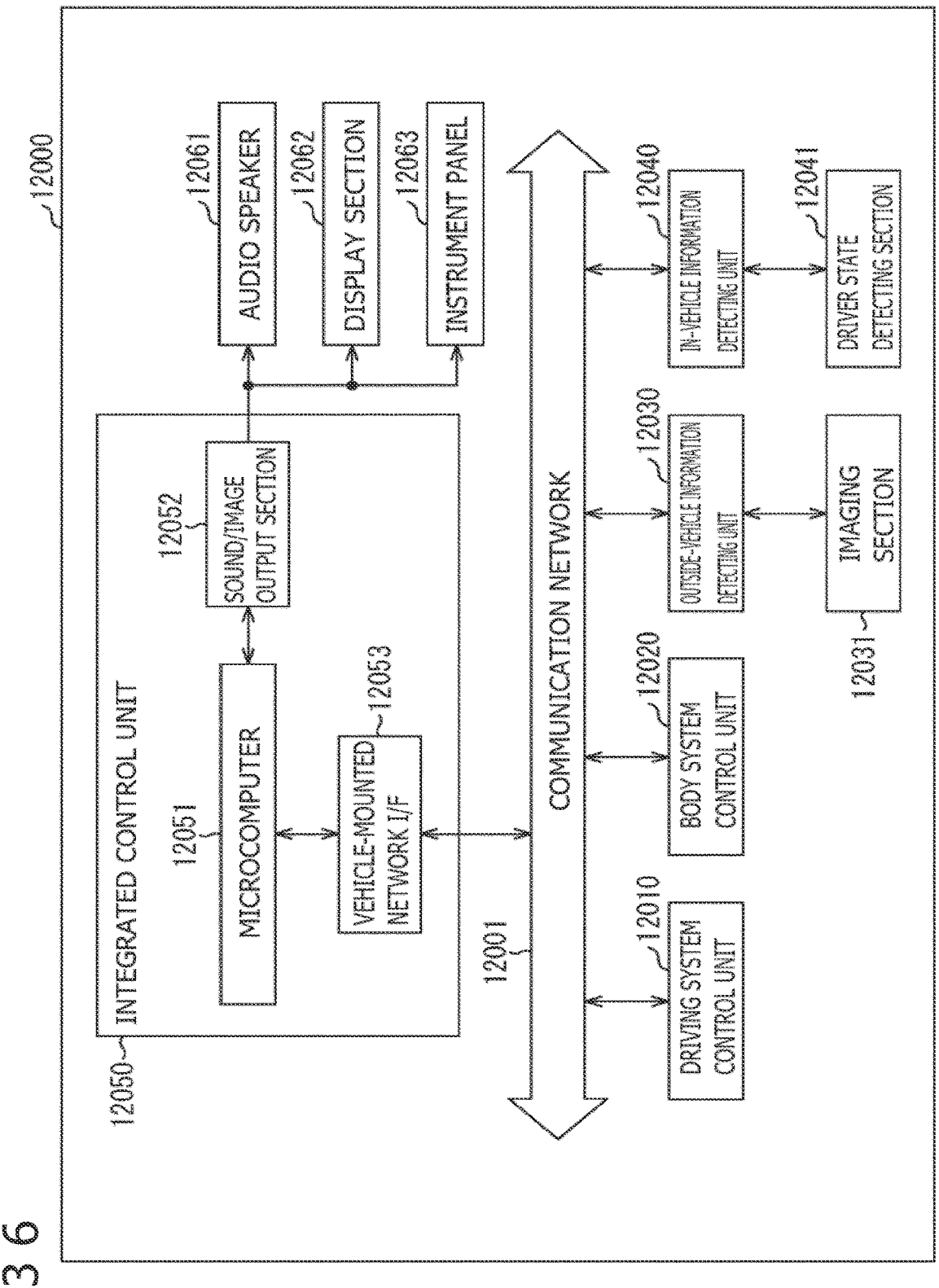
F I G . 3 6

SENSOR DEVICE AND SIGNAL PROCESSING METHOD WITH OBJECT DETECTION USING ACQUIRED DETECTION SIGNALS

TECHNICAL FIELD

The present technology relates to a sensor device, a parameter setting method, and a signal processing method, and particularly to a technical field of a sensor device which has a function of processing image signals obtained by an array sensor.

BACKGROUND ART

For achieving object detection using an array sensor which includes an array of what is generally called imaging elements, it has been known to capture an image using the array sensor, transmit image signals of the captured image to a processor outside the array sensor, and perform an object detection calculation process on the external processor side.

NPL 1 identified below discloses a technology relating to a facial recognition process for facial recognition from an image.

Further, PTL 1 identified below discloses a technology which includes setting of a region of interest within an area of an image captured by an image sensor.

Further, PTL 2 identified below discloses a technology which changes an operation frequency according to movement of a monitoring area.

CITATION LIST

Patent Literature

[PTL 1]
  JP 2014-225868A
[PTL 2]
  JP 2007-318262A

Non Patent Literature

[NPL 1]
  Yoshihiko Kawai, Face Recognition Technique for TV Program Video, NHK Science & Technology Research Laboratories/No. 164/2017.8 P23-P30

SUMMARY

Technical Problems

Image quality of an array sensor including an image sensor has been so adjusted as to create a beautiful picture as viewed by a viewer. However, when a main body which makes a determination is constituted by a computer like a case of image recognition, there arises such a problem that accuracy of class (category or genre) identification of an imaged target lowers even in a case of an image captured with beautiful image quality as viewed from a viewer.

In this case, considering a process such as object detection using image recognition, it is preferable to achieve image processing suited for a purpose of object detection rather than creation of a beautiful picture.

Further, it is preferable to reduce loads for processing, storage, and transfer while achieving the purpose of object detection or the like.

Accordingly, the present disclosure proposes a technology capable of obtaining image signals suited for a purpose of object detection by image recognition or other purposes, and also capable of reducing processing loads or the like.

Solution to Problems

A sensor device according to a first disclosed technology is directed to a sensor device including: an array sensor that includes a plurality of visible light or invisible light imaging elements arranged one-dimensionally or two-dimensionally; an image processing unit that performs image processing for image signals obtained by image capturing using the array sensor; and a threshold setting unit that sets a threshold used for parameter setting for all or some of parameters used for image capturing processing associated with image capturing performed by the array sensor or image processing performed by the image processing unit to achieve a process using the parameter set on the basis of the threshold.

The threshold is set to determine the parameter on the basis of the threshold.

Examples of the parameter associated with image capturing processing include an exposure time of the array sensor, readout timing from the array sensor, and a frame rate.

Examples of the parameter associated with image processing include resolution and the number of color gradations of an image.

The sensor device according to the first disclosed technology described above may be so configured that the threshold setting unit sets the threshold corresponding to a class of an object detected from the image signals.

Specifically, the image processing unit performs image processing for the image signals obtained by the array sensor. In this case, the threshold for setting the image processing parameter is set on the basis of the class of the detected object in the image signals.

Note that the object detected from the image signals refers to an object which may become a detection target for a purpose of recognition from the image. Any object may be designated as the object of the detection target referred to herein. For example, the target object may be any object, such as a human, an animal, a mobile body (e.g., car, bicycle, and aircraft), a natural object (e.g., vegetable and plant), an industrial product/part, a building, an institution, a mountain, a sea, a river, a star, the sun, and a cloud.

The class refers to a category of an object recognized using image recognition. For example, classification separates an object to be detected into classes such as a "human," a "car," an "airplane," a "ship," a "truck," a "sign," a "bird," a "cat," a "dog," a "deer," a "frog," and a "horse."

Subsequently, a threshold considered to be appropriate is set according to the class such as a "human," a "car," and a "sign."

The sensor device according to the first disclosed technology described above may be so configured that the threshold setting unit sets the threshold on the basis of a learning process performed for the image signals.

For example, the threshold is obtained by performing a learning process as local learning on the sensor device side.

The sensor device according to the first disclosed technology described above may be so configured that the threshold setting unit sets the threshold such that a predetermined rate is obtained as a confidence rate of object detection.

In a case of object detection from image signals output from the sensor device, such as detection of a human, the threshold is set such that a level required for detection accuracy of this detection is met, for example.

The sensor device according to the first disclosed technology described above may be so configured that the threshold setting unit is provided in a device having a housing identical to a housing of the image processing unit.

For example, the threshold setting unit is provided in a unit functioning as the sensor device, or a terminal apparatus or an imaging apparatus including the sensor device.

A sensor device according to a second disclosed technology is directed to a sensor device including: a plurality of detection elements arranged one-dimensionally or two-dimensionally; a signal processing unit that acquires detection signals obtained by the array sensor, and performs signal processing for the detection signals; and a calculation unit that detects an object from the detection signals obtained by the array sensor, and gives, to the signal processing unit, an instruction of region information generated on the basis of detection of the object as region information associated with acquisition of the detection signals obtained from the array sensor or associated with signal processing for the detection signals. The calculation unit sets an active area of the detection signals acquired from the array sensor on the basis of information associated with previous region information, and detects the object using the detection signals of the active area.

Accordingly, object detection for generating the region information is achieved on the basis of information associated with not the entire region of the array sensor, but the region designated as the active area.

Note that the information associated with the region information refers to information associated with an object detection region on the basis of which the region information is generated, or the region information itself.

The sensor device according to the second disclosed technology described above may be so configured that the calculation unit sets the active area such that a plurality of pieces of region information generated in a previous predetermined period each contains a detection region detected by object detection on the basis of which the respective pieces of region information are generated.

In other words, in the case of object detection performed for generating the region information, the active area is defined as a region where the detection target object appears.

The sensor device according to the second disclosed technology described above may be so configured that the signal processing unit includes an acquisition unit that selectively acquires detection signals from the detection elements of the array sensor, and that the acquisition unit acquires, as one frame of the detection signals, the detection signals of the detection elements selected on the basis of the region information received from the calculation unit. In a case where a targeted object is not detected by object detection from the detection signals acquired from the array sensor in a state where the acquisition unit has selected the detection elements on the basis of the region information, the calculation unit instructs the acquisition unit to acquire the detection signals of the active area from the array sensor in a following frame.

Specifically, when the targeted object is not detected from the frame for which only information associated with some of the detection elements has been acquired, the calculation unit restores detection signal acquisition using the acquisition unit to the state of detection signal acquisition from the active area.

The sensor device according to the second disclosed technology described above may be so configured that the calculation unit detects the object from the detection signals of the active area in a target frame designated as a keyframe in the detection signals obtained from the array sensor, and generates the region information on the basis of detection of the object.

Specifically, the calculation unit selects the frame corresponding to the keyframe in accordance with a predetermined selection algorithm to perform a process of the active area setting.

The sensor device according to the second disclosed technology described above may be so configured that the calculation unit identifies a class of the object detected from the detection signals obtained from the array sensor, and generates region information corresponding to the object using a template that indicates an acquisition region of the detection signals in correspondence with the identified class, and the calculation unit includes a threshold setting unit that sets a threshold for all or some of parameters used for signal processing performed by the signal processing unit or acquisition of the detection signals using the array sensor, and sets, on the basis of the threshold, the parameter for a process performed for the acquisition region indicated by the template.

The threshold is set to change the parameter of the process performed for the acquisition region indicated by the template on the basis of the threshold.

A sensor device according to a third disclosed technology includes: an array sensor that includes a plurality of detection elements arranged one-dimensionally or two-dimensionally; a signal processing unit that acquires detection signals obtained by the array sensor, and performs signal processing for the detection signals; and a threshold setting unit that sets a threshold of a frame rate according to a class identified for an object detected from the detection signals obtained by the array sensor such that a process using the frame rate set on the basis of the threshold is performed according to the class identified for the object detected from the detection signals obtained by the array sensor.

The threshold corresponding to the class is set to change the frame rate on the basis of the threshold.

The sensor device according to the third disclosed technology described above may be so configured that the threshold setting unit sets the threshold as a frame rate at which object tracking from an image is maintained.

The frame rate at which object tracking can be maintained differs for each class in object detection from image signals output from the sensor device.

Accordingly, object tracking is maintained according to the class.

The sensor device according to the third disclosed technology described above may be so configured that control is performed on the basis of a setting value of a frame rate of either a first mode or a second mode according to a result of object detection, and that a setting value of a frame rate set by the threshold setting unit is used as the setting value of the frame rate of one of the first mode and the second mode.

For example, a value of readout interval or the like of the array sensor is stored as the setting value to give an instruction of the frame rate. In the one mode, the frame rate is a rate set according to the threshold.

The sensor device according to the first, the second, and the third disclosed technologies described above may include an output unit that outputs image signals subjected to image processing by the image processing unit to an external device.

Specifically, the image signals subjected to image processing using a parameter selected on the basis of class recognition are transmitted and output to the external device. For example, the external device is assumed to be an external processor which detects an object, or a processor in a cloud.

Further, the sensor device according to the first, the second, and the third disclosed technologies described above may be so configured that the output unit also transmits information associated with class identification of the image signals to be output.

Information associated with class identification, such as the identified class and the number of objects (number of objects) is output together with the output image signals.

Further, the sensor device according to the first, the second, and the third disclosed technology described above may be so configured that the image processing unit performs, as image processing for the image signals, at least one of color correction, gamma correction, color gradation processing, gain processing, contour emphasis processing, data compression processing, frame rate conversion, resolution conversion, aspect ratio conversion, contrast adjustment processing, sharpness adjustment processing, gray level adjustment processing, or sampling rate change processing.

Specifically, the image processing unit changes color, luminance, hue, sharpness, data size (resolution or frame rate), and the like.

An image processing method according to the first disclosed technology described above is directed to a signal processing method performed by a sensor device including: an array sensor that includes a plurality of visible light or invisible light imaging elements arranged one-dimensionally or two-dimensionally; and an image processing unit that performs image processing for image signals obtained by image capturing using the array sensor. The signal processing method includes setting a threshold used for parameter setting for all or some of parameters used for image capturing processing associated with image capturing performed by the array sensor or image processing performed by the image processing unit to achieve a process using the parameter changed on the basis of the threshold.

For example, image signals indicating minimum necessary quality or the like for processing of object detection or the like can be output by setting (changing) the parameter using the threshold.

An image processing method according to the second disclosed technology described above is directed to a signal processing method performed by a sensor device including: a plurality of detection elements arranged one-dimensionally or two-dimensionally; and a signal processing unit that acquires detection signals obtained by the array sensor, and performs signal processing for the detection signals. The image processing method includes: performing a process that detects an object from the detection signals obtained by the array sensor, and gives, to the signal processing unit, an instruction of region information generated on the basis of detection of the object as region information associated with acquisition of the detection signals obtained from the array sensor or associated with signal processing for the detection signals, performing a process that sets an active area for the detection signals acquired from the array sensor on the basis of previous region information; and detecting the object using the detection signals of the active area as the detection signals obtained by the array sensor.

In this case, the process of object detection for setting the region information need not be performed for the entire frame of the image.

An image processing method according to the third disclosed technology is directed to a signal processing method performed by a sensor device including: an array sensor that includes a plurality of detection elements arranged one-dimensionally or two-dimensionally; and a signal processing unit that acquires detection signals obtained by the array sensor, and performs signal processing for the detection signals. The signal processing method setting a threshold of a frame rate according to a class identified for an object detected from the detection signals obtained by the array sensor such that a process using the frame rate set on the basis of the threshold is performed according to the class identified for the object detected from the detection signals obtained by the array sensor.

A frame rate suited for the class of the detection target is applied by setting (changing) the frame rate using the threshold.

BRIEF DESCRIPTION OF DRAWINGS

FIG. 2 is an explanatory diagram depicting a relation between image recognition accuracy and image quality.

FIG. 4 is an explanatory diagram of an image quality parameter set according to the first embodiment.

FIG. 7 is an explanatory diagram of an area-clipped frame according to the second embodiment.

FIG. 15 is an explanatory diagram of intelligent compression according to the fourth embodiment.

FIG. 20 is an explanatory diagram of threshold setting according to classes according to the sixth embodiment.

FIG. 23 is an explanatory diagram of threshold setting according to the sixth embodiment.

FIG. 36 is a block diagram depicting an example of schematic configuration of a vehicle control system.

DESCRIPTION OF EMBODIMENTS

Embodiments will be hereinafter described in a following order.

<1. Configuration of sensor device>
<2. First embodiment: classified image adaptation>
<3. Second embodiment: area clipping>
<4. Third embodiment: area clipping using AROI>
<5. Fourth embodiment: intelligent compression>
<6. Fifth embodiment: active sampling>
<7. Sixth embodiment: image adaptation by threshold setting>
<8. Seventh embodiment: active area clipping>
<9. Eighth embodiment: area clipping using threshold setting and AROI>
<10. Ninth embodiment: active sampling by threshold setting>
<11. Application example to mobile body>
<12. Summary and modifications>

Note that described in the following embodiments by way of example will be a sensor device 1 which has an imaging element array and functions as an image sensor for outputting image signals as detection signals.

Particularly, the sensor device 1 of the embodiments is assumed to have an object detection function achieved by image analysis, and constitutes a device which is called an intelligent array sensor.

1. Configuration of Sensor Device

Figure 1:
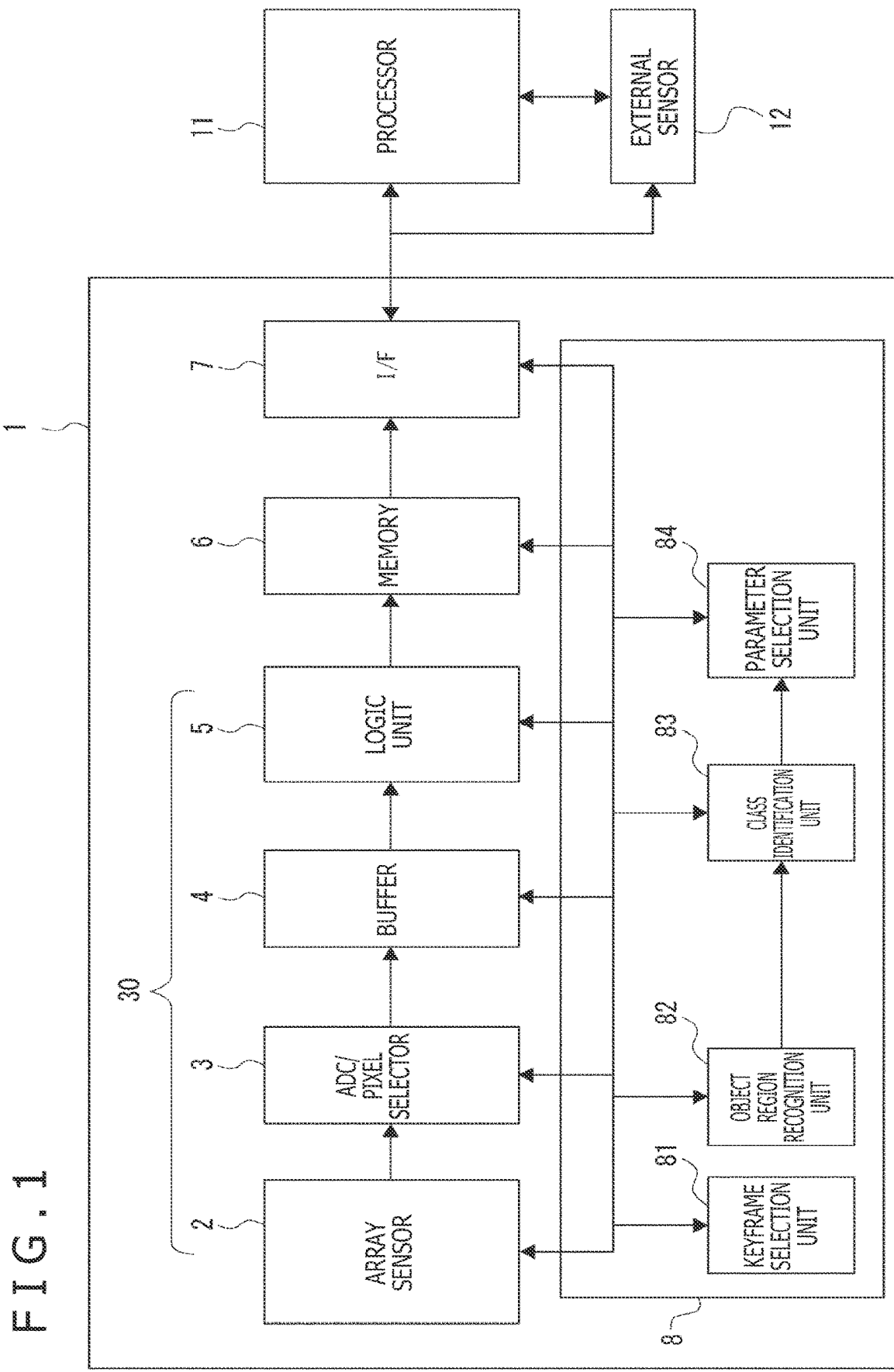
FIG. 1 is a block diagram of a sensor device applicable to a first to a fifth, and a seventh embodiments of the present technology.

FIG. 1 depicts a configuration example of the sensor device 1. Note that FIG. 1 also depicts a processor 11 and an external sensor 12 each functioning as an external device which establishes data communication with the sensor device 1. The processor 11 is assumed to be any type of processor communicably connected to the sensor device 1.

The sensor device 1 includes, as hardware, an image sensor device, a storage area such as a DRAM (Dynamic Random Access Memory), and a component part constituting an AI (artificial intelligence) function processor. In this case, these three parts form a structure such as a three-layer laminate structure, one layer having what is generally called a horizontally mounted configuration, and two-layer (e.g., the same layer containing the DRAM and the AI function processor) laminate structure to constitute an integrated device.

As depicted in FIG. 1, the sensor device 1 includes an array sensor 2, an ADC (Analog to Digital Converter)/pixel selector 3, a buffer 4, a logic unit 5, a memory 6, an interface unit 7, and a calculation unit 8.

The ADC/pixel selector 3, the buffer 4, and the logic unit 5 constitute an example of a signal processing unit 30 which performs signal processing to output detection signals obtained by the array sensor 2 to the outside.

The array sensor 2 includes visible light or non-visible light imaging elements constituting detection elements. A plurality of the imaging elements is arranged one-dimensionally or two-dimensionally. For example, the array sensor 2 includes a large number of the imaging elements two-dimensionally arranged in a row direction and a column direction, and is configured to output two-dimensional image signals by photoelectric conversion performed by each of the imaging elements.

While the array sensor 2 is assumed to output two-dimensional image signals as an image sensor in the following description, the array sensor 2 included in the sensor device 1 may have other configurations, such as a sensor array module including an array of sound wave detection elements, and a sensor array module including an array of haptic sense information detection elements.

The ADC/pixel selector 3 converts electric signals photoelectrically converted by the array sensor 2 into digital data, and outputs image signals in the form of digital data.

Further, the ADC/pixel selector 3 which has a function of selecting pixels (imaging elements) of the array sensor 2 is also capable of reading photoelectrically converted signals of only pixels selected by the array sensor 2, converting the read signals into digital data, and outputting the converted signals.

Accordingly, the ADC/pixel selector 3 normally outputs digital data of photoelectrically converted signals of all effective pixels constituting an image of one frame, but is also capable of outputting digital data of photoelectrically converted signals of only selected pixels.

Image signals are read in units of frame by the ADC/pixel selector 3. The image signals of each frame are temporarily stored in the buffer 4, and read and supplied to processing performed by the logic unit 5 at appropriate timing.

The logic unit 5 performs various types of necessary signal processing (image processing) for input image signals of each frame.

For example, it is assumed that the logic unit 5 achieves image quality adjustment by performing processing such as color correction, gamma correction, color gradation processing, gain processing, contour emphasis processing, contrast adjustment processing, sharpness adjustment processing, and gray level adjustment processing.

It is also assumed that the logic unit 5 performs processing for changing a data size, such as data compression processing, resolution conversion, frame rate conversion, aspect ratio conversion, and sampling rate change.

Parameters are set for each of the processing performed by the logic unit 5 so as to be used for the corresponding processing. For example, setting values include a correction coefficient for color and luminance, a gain value, a compression rate, a frame rate, resolution, a processing target region, and a sampling rate. The logic unit 5 performs necessary processing using the parameters set for the corresponding processing. According to the present embodiment, the calculation unit 8 sets these parameters as described below in some cases.

Image signals processed by the logic unit 5 are stored in the memory 6.

The image signals stored in the memory 6 are transmitted and output to the processor 11 and others via the interface unit 7 at necessary timing.

Note that the memory 6 is assumed to be constituted by a DRAM, an SRAM (Static Random Access Memory), an MRAM (Magnetoresistive Random Access Memory), or the like.

Note that the MRAM is a memory which stores data using magnetism. An MRAM including a TMR element (Tunneling Magneto resistive) instead of a magnetic core is known. The TMR element includes a layer of a thin insulation layer having an extremely small thickness of several atoms, and sandwiched between magnetic bodies, and changes electric resistance according to magnetization directions of layers of the magnetic bodies. The magnetization directions of the TMR element do not change even after cutoff of power, thereby constituting a non-volatile memory. A writing current needs to be raised as miniaturization increases. Accordingly, for miniaturization of a memory cell, it has been known to adopt an STT-MRAM using spin injection magnetization inversion system (STT: spin torque transfer) which achieves writing using not a magnetic field but a flow of electrons each having equalized spin.

Needless to say, specific examples of the memory 6 include not only these examples but also other types of storage elements.

The processor 11 outside the sensor device 1 performs image analysis and image recognition processing for image signals transmitted form the sensor device 1 to execute necessary object detection and the like.

The processor 11 is also capable of referring to detection information obtained by the external sensor 12.

Note that it is adoptable to connect the processor 11 to the sensor device 1 by wire or wirelessly.

It is adoptable to provide the processor 11 described herein in the same housing as that of the sensor device 1. For example, it is assumed that the processor 11 is a processor included in an imaging device or a terminal apparatus incorporating the sensor device 1.

Alternatively, the processor 11 may be provided on a device separated from the sensor device 1. For example, the processor 11 may be a built-in device included in an information processing device, a terminal apparatus, an image editing device, a monitoring device, a communication device, or the like connected to an imaging device or a terminal apparatus incorporating the sensor device 1 via a cable, wireless communication, or the like.

Further, the processor 11 may be a processor included in a cloud computing system, for example, and may be configured to establish network communication with the sensor device 1 or an apparatus including the built-in sensor device 1.

For example, the calculation unit 8 is constituted by one AI processor, for example. In addition, as depicted in the figure, the calculation unit 8 includes a keyframe selection unit 81, an object region recognition unit 82, a class identification unit 83, and a parameter selection unit 84 each as an executable calculation function. Note that these calculation functions may be constituted by a plurality of processors.

The keyframe selection unit 81 performs a process for selecting a keyframe in a frame of image signals forming a video in accordance with a predetermined algorithm or instruction.

Further, the keyframe selection unit 81 also performs a process for switching a mode associated with a frame rate (an idling mode and a normal mode in the fifth embodiment) in some cases.

The object region recognition unit 82 performs a process of detecting a region of an object corresponding to a detection candidate from a frame of image signals photoelectrically converted by the array sensor 2 and read by the ADC/pixel selector 3, and a process of recognizing a region surrounding the object (bounding box) in an image (frame) for the object of the detection target.

The object detected from the image signals refers to an object which may become a detection target for a purpose of recognition from an image. Which object is to be designated as a detection target differs according to a purpose of detection, processing ability, an application type, or the like of the sensor device 1 or the processor 11. Any object may be designated as the object of the detection target referred to herein. Examples of the detection target object include an animal, a mobile body (e.g., car, bicycle, and aircraft), a natural object (e.g., vegetable and plant), an industrial product or part, a building, an institution, a mountain, a sea, a river, a star, the sun, and a cloud. These examples are only partial examples, and any object may correspond to the detection target object.

Further, as will be described in a second embodiment, the object region recognition unit 82 performs, on the basis of the bounding box, a process for calculating an ROI (Region of Interest), which is region information indicating a region (region of interest) to be designated as a processing target, control for the ADC/pixel selector 3 based on the ROI, and others in some cases.

The class identification unit 83 classifies an object detected by the object region recognition unit 82.

The class herein refers to a category of a recognized object using image recognition. For example, an object to be detected is separated into a class such as a "human," a "car," an "airplane," a "ship," a "truck," a "bird," a "cat," a "dog," a "deer," a "frog," and a "horse."

As will be described in a first embodiment, the parameter selection unit 84 stores parameters for signal processing for respective classes, and selects one or a plurality of corresponding parameters using a class, a bounding box, or the like of a detected object identified by the class identification unit 83. Thereafter, the parameter selection unit 84 sets the one or the plurality of parameters for the logic unit 5.

Further, as in a third embodiment, the parameter selection unit 84 stores a template of an advanced ROI (Advanced ROI: AROI) calculated beforehand for each of the classes on the basis of the class for which an ROI is calculated on the basis of the bounding box, and performs a process for selecting the template in some cases.

Further, the parameter selection unit 84 stores setting values of the idling mode and the normal mode in the fifth embodiment, and performs a process for selecting the setting values on the basis of object detection, and controls the signal processing unit 30 in some cases.

These functions performed by the calculation unit 8 are processes not ordinarily performed in the array sensor. According to the present embodiments, object detection, class recognition, and control based on these are executed within the array sensor. In this manner, image signals suited for a detection purpose are supplied to the processor 11, and data volume reduction not lowering detection performance are achieved.

Note that the interface unit 7 outputs image signals to the processor 11, and also is capable of outputting information associated with an object detected by the calculation unit 8, class information, the number of detected objects, information associated with selected parameters, and the like as metadata, for example, together with image signals, or outputting independently of image signals. Further, the interface unit 7 is also capable of outputting only class information, for example.

Further, for example, it is also adoptable that the processor 11 side gives an instruction of necessary information to the interface unit 7 to allow output of information corresponding to this instruction from the interface unit 7.

2. First Embodiment: Classified Image Adaptation

A process of classified image adaptation will be described as a process of the first embodiment executable by the sensor device 1 having the configuration of FIG. 1.

Accuracy of image recognition is changeable according to image quality adjustment. For example, accuracy of image recognition achieved by deep learning is raised by image quality control.

Further, it is known that image quality desirable for image recognition, i.e., image quality raising accuracy of object detection does not necessarily coincide with quality of a beautiful image for a viewer.

For example, FIG. 2A depicts an example of a high-quality image for a viewer, while FIG. 2B is assumed to be an image having slightly lower image quality for a sense of a viewer due to reduction of the number of gradations, for example.

However, according to an object detection result of analysis of the image in FIG. 2A using a neural network, a flower is erroneously determined as a fish (fish), while a flower in the image in FIG. 2B is correctly determined as a flower (flower).

As apparent from this example, it is preferable to make image quality adjustment different from image quality adjustment based on an aesthetic sense of a viewer so as to raise accuracy of image recognition.

Further, such image quality suited for object detection is not image quality adjusted by uniform parameters, but image quality different for each object corresponding to a detection target. For example, a desirable image quality adjusted state differs for each of detection of a human and detection of a car. In other words, values of desirable parameters for image quality adjustment differ for each detection target.

Accordingly, in the classified image adaptation process, appropriate parameters (image quality adjustment values) are stored for each class of objects which may be designated as targets. Subsequently, object detection and class identification of a detected object are performed for an image captured by the array sensor 2, and parameters are selected according to the identified class and set for the logic unit 5. Then, processing based on the selected parameters is performed by the logic unit 5 for the corresponding image.

Figure 3:
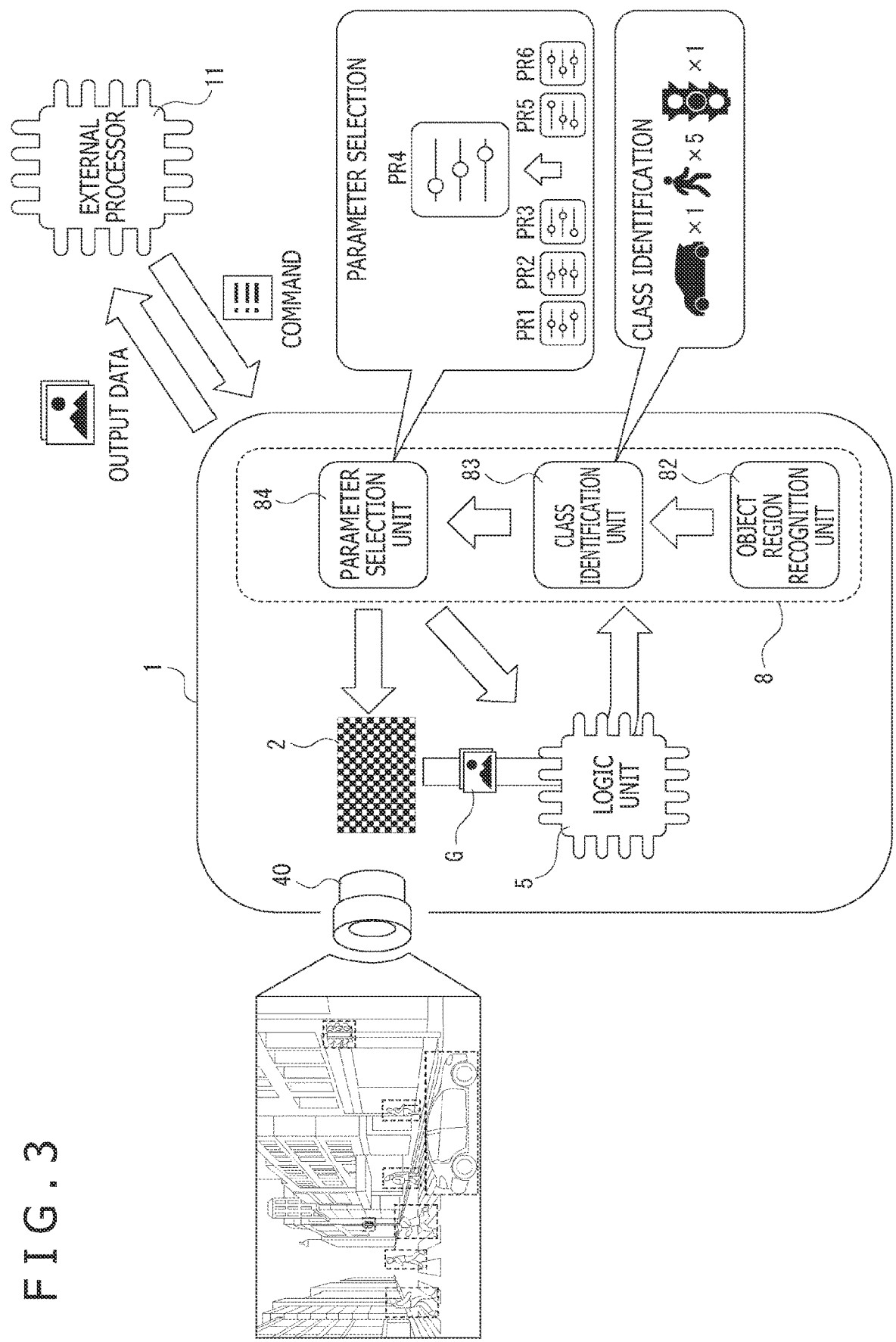
FIG. 3 is an explanatory diagram of an outline of a classified image adaptation process according to the first embodiment.

FIG. 3 depicts an outline of the classified image adaptation process described above. Note that FIG. 3 indicates a part extracted from the configuration of FIG. 1 for explanation of the outline.

According to the sensor device 1, imaged object light is focused on the array sensor 2 using an imaging optical system 40 to capture an image. Image signals G thus obtained are processed by the logic unit 5, and also supplied to the calculation unit 8.

The calculation unit 8 performs a process for detecting an object corresponding to a candidate, and recognizing a region of the object using the object region recognition unit 82. The object region recognition unit 82 also calculates a bounding box for a necessary object region.

Further, the calculation unit 8 performs class identification for the detected object using the class identification unit 83. In a case where a plurality of objects or a plurality of types of objects is detected, a class is identified for each of the objects and the types to separate the objects and the types into classes. In a case of the figure, for example, class identification and classification are performed in such a manner as to define one object in a class of "vehicle," five objects in a class of "human," and one object in a class of "traffic light."

Class information and bounding box information thus obtained are provided for the parameter selection unit 84. The parameter selection unit 84 selects one parameter set from stored parameter sets PR1, PR2, and others using the class information or the like. For example, the figure depicts a state where a parameter set PR4 has been selected.

Note that the parameter set refers to one set of a plurality of values of parameters stored and used for processing by the logic unit 5, such as a gain setting value, a color correction coefficient, the number of gradations, a compression rate, and a frame rate.

The selected parameter set PR4 is set for the logic unit 5. The logic unit 5 performs various types of signal processing for the image signals G using respective parameters indicated in the parameter set PR4.

The array sensor outputs all or any one of output data (e.g., the image signals, the class, the number of objects, and presence or absence of the target class) in response to a request from the processor 11.

Further, the processor 11 is capable of transmitting various types of instructions to the sensor device 1.

As described above, according to the sensor device 1, the calculation unit 8 has a function of class identification based on object detection (object categorization function), and performs classified image quality adaptation (parameter selection suited for a target category based on object detection) which adaptively sets parameters for the logic unit 5 according to output from the class identification unit.

For the parameter sets, appropriate parameters (image quality setting values) are generated beforehand by pre-learning and stored for each class using deep learning.

For example, for generating a parameter set of a class "human," deep learning is performed using a large number of images of a human as learning data SD to generate the parameter set PR1 having a highest image recognition rate in view of recognition of a human as depicted in FIG. 4A.

For other respective classes, the parameter sets PR2, PR3, and others each having a highest image recognition rate are similarly generated using deep learning.

Thereafter, the generated parameter sets PR1, PR2, PR3, and others corresponding to the respective classes are stored in such a manner as to be selectable by the parameter selection unit 84 as depicted in FIG. 4B.

Figure 5:
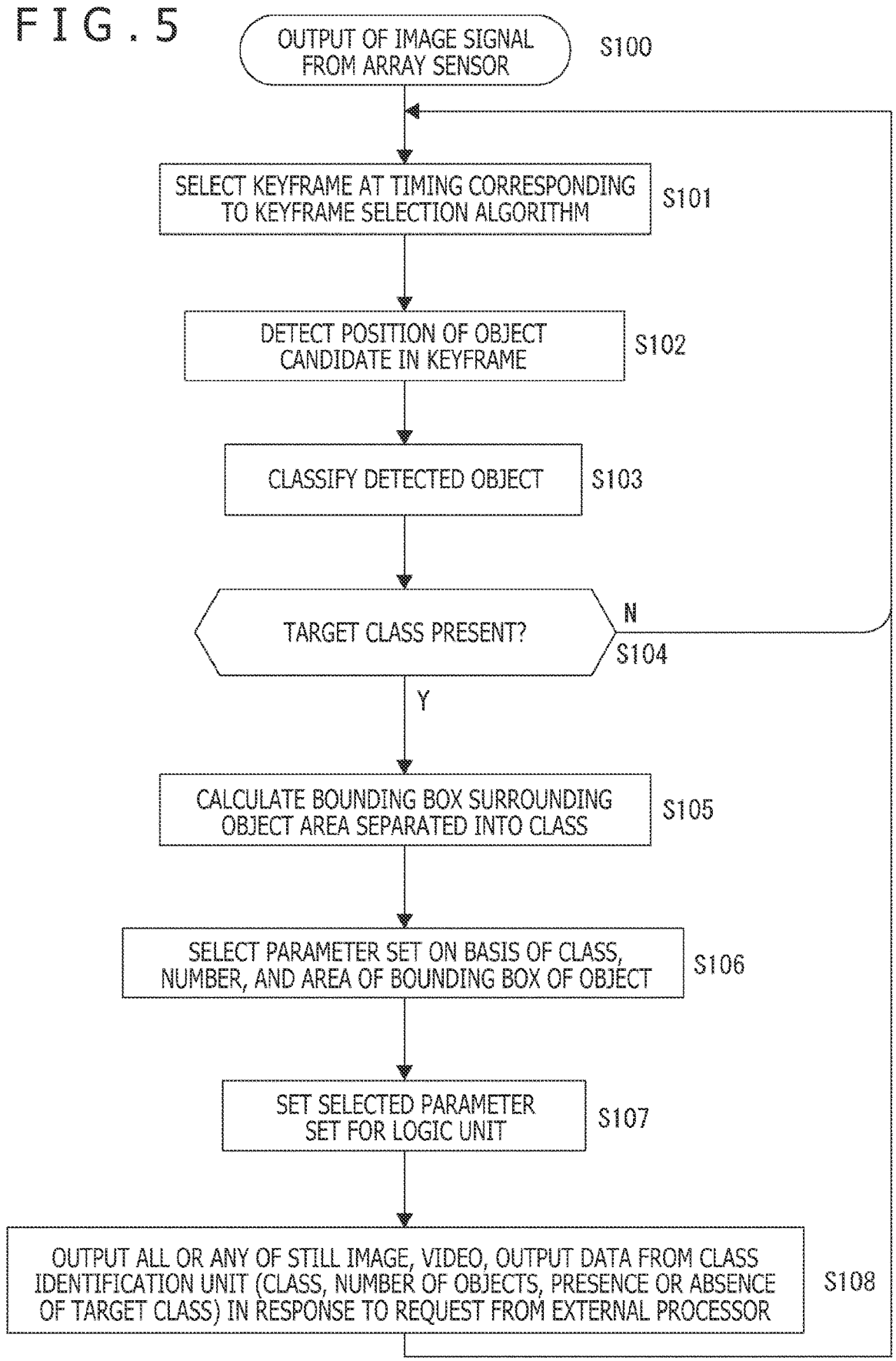
FIG. 5 is a flowchart of the classified image adaptation process according to the first embodiment.
Figure 6:
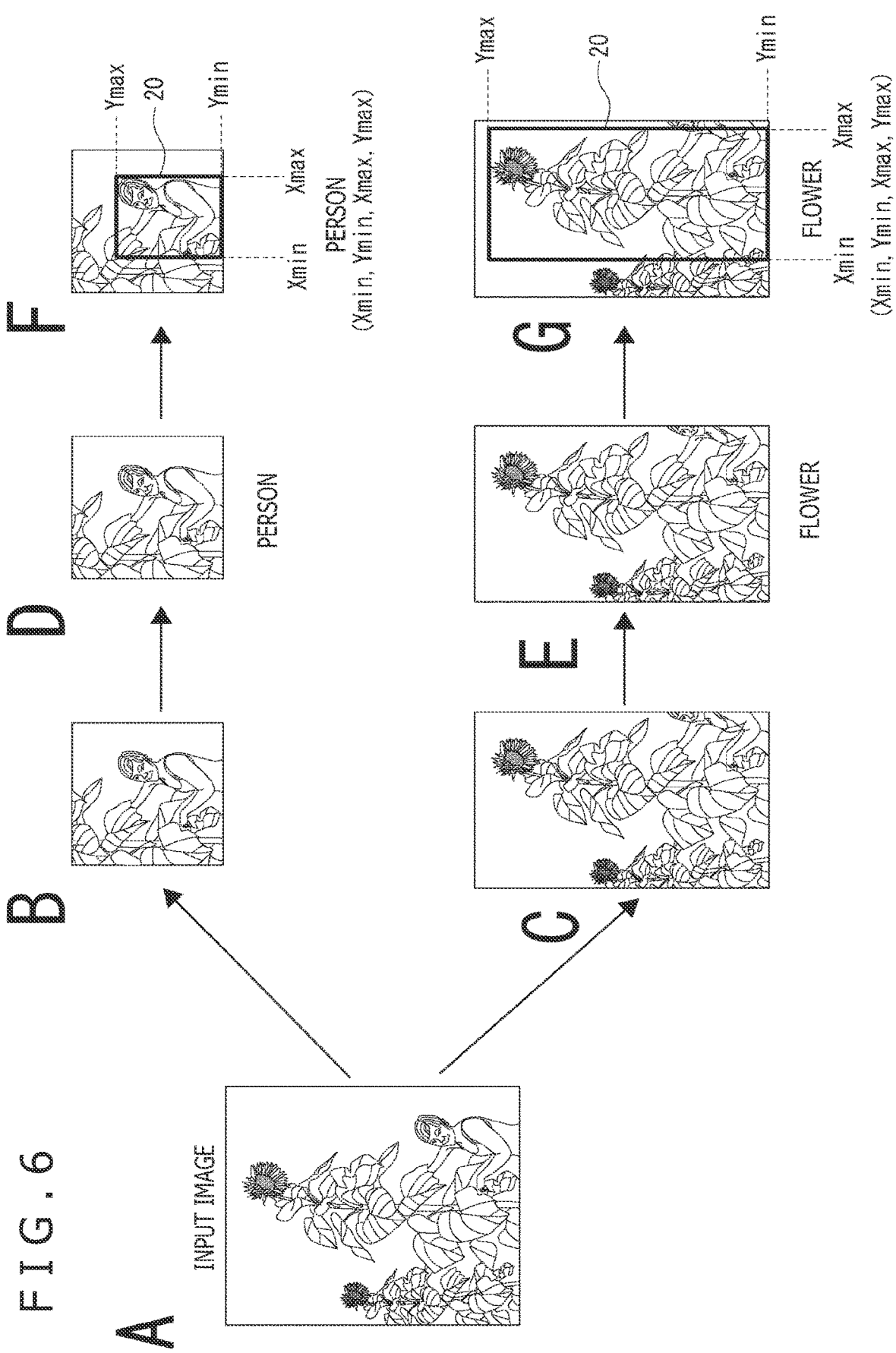
FIG. 6 is an explanatory diagram of a process of object detection according to the first embodiment.

FIG. 5 depicts a specific example of the classified image adaptation process performed by the sensor device 1. The description is made sequentially with reference to FIG. 6.

FIG. 5 presents a process executed by the sensor device 1 (mainly by the calculation unit 8) after a start of output of image signals in units of one frame from the array sensor 2 in step S100.

In FIG. 5, the process performed by the calculation unit 8 is a process executed by the respective functions of the keyframe selection unit 81, the object region recognition unit 82, the class identification unit 83, and the parameter selection unit 84 depicted in FIG. 1. Note that this definition is applicable to FIGS. 9, 14, 16, and 18 described below.

In step S101, the calculation unit 8 (keyframe selection unit 81) performs a process for selecting a keyframe at timing corresponding to a keyframe selection algorithm.

The sensor device 1 recognizes a class of an image capturing target by selecting a keyframe from image signals in units of frame, which are pixel array output signals of the array sensor 2, and then performing image recognition. Selection of the keyframe is achieved on the basis of a keyframe selection algorithm. In this manner, a still image (certain one frame) is selected.

An example of the keyframe selection algorithm will be presented herein.

Initially, adoptable is a method which selects one frame for each interval of a designated time. For example, one frame is designated as the keyframe at intervals of 30 seconds. Needless to say, the interval of 30 seconds is only an example.

Further, the keyframe may be also selected at timing designated by a command from the outside (e.g., processor 11) of the sensor device 1. For example, it is assumed that the keyframe is selected in accordance with an instruction from a device or an apparatus on which the sensor device 1 is mounted. For example, in a case where the sensor device 1 is mounted on a car, the keyframe is selected at timing of a start of traveling after a stop at a parking lot.

Further, the keyframe selection method may be varied according to circumstances. For example, in a case where the sensor device 1 is mounted on a car, the interval of the keyframe is varied for each of a stopping state, a normal traveling state, and a high-speed traveling state.

After selection of the keyframe, the calculation unit 8 (object region recognition unit 82) in step S102 detects a position of an object candidate in the keyframe.

Specifically, the calculation unit 8 searches for a candidate of the object to be detected in the image of the keyframe, and obtains one or a plurality of candidate positions (position coordinates in the image).

For example, suppose that an input image depicted in FIG. 6A is designated as the keyframe. The calculation unit 8 detects a portion which looks like an object to be detected in this image. For example, each of regions in FIGS. 6B and 6C is designated as a portion which looks like an object to the detected. These regions are candidates of the object.

In step S103 in FIG. 5, the calculation unit 8 (class identification unit 83) classifies the detected objects. Specifically, the calculation unit 8 identifies a class for each of the candidates of the object into classes for classification.

As described above, each of the classes herein refers to a category of a recognized object using image recognition.

For example, class identification such as a "human" and a "flower" is achieved as depicted in FIGS. 6D and 6E.

In step S104 in FIG. 5, the calculation unit 8 checks whether or not a target class is present in the class obtained as a result of the class identification.

The target class is a class specially selected from the classes and set by the processor 11. For example, in a case where the target class is set to a "human," it is assumed that the sensor device 1 starts a specified process when a human is recognized.

In addition, it is preferable that a plurality of the target classes is allowed to be designated.

For example, in a case where a "human" or a "flower" is present in the class identified in step S103 in a state where the "human" and the "flower" have been designated as the target classes, the calculation unit 8 advances the flow of the process from step S104 to step S105.

On the other hand, in a case where none of the target classes is present, the calculation unit 8 returns to step S101 to select a next keyframe.

In a case where the flow proceeds to step S105 by the presence of the target class, the calculation unit 8 (object region recognition unit 82) calculates correct position coordinates (bounding box) surrounding an object area separated into the class.

FIGS. 6F and 6G each depict a bounding box 20. The bounding box 20 is specified by a minimum coordinate value Xmin and a maximum coordinate value Xmax defining a region range on an X-axis, and a minimum coordinate value Ymin and a maximum coordinate value Ymax defining a region range on a Y-axis.

In step S106 in FIG. 5, the calculation unit 8 (parameter selection unit 84) selects a parameter set on the basis of the class and the number of the object, and the area of the bounding box 20.

For example, in a case where one target class is present, a parameter set corresponding to this class is selected.

In a case where objects in a plurality of types of target classes are present in a screen, following examples are adoptable.

For example, it is adoptable to select a parameter set corresponding to the class which contains the largest number of objects in the respective classes.

Alternatively, in a case where objects in a plurality of types of target classes are present in a screen, it is adoptable to select a parameter set corresponding to a class which contains an object having the largest area of the bounding box 20.

Alternatively, in a case where objects in a plurality of types of target classes are present in a screen, it is adoptable to select a parameter set corresponding to a class which contains an object having the largest total sum of the areas of the bounding boxes 20 calculated for each class.

Alternatively, in a case where objects in a plurality of types of target classes are present in a screen, it is adoptable to select a parameter set corresponding to a class with highest priority specified on the basis of the number of objects for each class and the sum total (or maximum value) of the areas of the respective bounding boxes 20.

Needless to say, other parameter set selection methods are adoptable. In any of the methods, it is sufficient if a dominant object in the screen, or a parameter set corresponding to a class of an object to be detected with priority is selected.

In step S107, the calculation unit 8 (parameter selection unit 84) performs a process for setting the selected parameter set for the logic unit 5.

By this process, the logic unit 5 is thereafter allowed to perform various types of image processing using the set parameter set for image signals of respective frames sequentially input.

The processed image signals, the set parameters, information associated with the identified class, and the like are temporarily stored in the DRAM 6.

In step S108, the sensor device 1 outputs all or at least any one of image signals (still image or dynamic image), class identification information (e.g., the class, the number of objects, and presence or absence of the target class), the used parameter set, and other information in response to a request from the processor 11.

Specifically, any one of information temporarily stored in the DRAM 6 is read and transmitted via the interface unit 7 according to the request from the processor 11.

Note that this processing in step S108 may be performed under control by the calculation unit 8, or may be executed in response to an access to the DRAM 6 by the processor 11 via the interface unit 7. In a case where the calculation unit 8 does not control the interface unit 7, the process performed by the calculation unit 8 returns to step S101 after completion of step S107.

By the foregoing processing, image signals for which the parameters are set are supplied to the processor 11 according to the presence of the target class as the object contained in the image. These image signals are image signals for which image processing suited for detection of the object of the corresponding target class has been performed.

Further, if information associated with the detected class (target class) or the number of objects is also supplied to the processor 11, this information is usable as effective information for the object detection process performed by the processor 11.

In these manners, object detection with high accuracy is achievable by the processor 11.

Note that also adoptable is such a use method which performs simplified class setting within the sensor device 1, and detailed recognition outside the sensor device 1. For example, also adoptable is such a process which executes processing up to facial recognition and number plate recognition not using the sensor device 1 but using the processor 11.

Further, while the processing example in FIG. 5 is assumed to detect the portions each looking like an object in step S102 (FIGS. 6B and 6C), and carries out class identification in step S103 (FIGS. 6D and 6E), and then sets the bounding boxes 20 in step S105 (FIGS. 6F and 6G). However, these procedures are not required to be adopted. For example, following procedures may be adopted. When the portions each looking like an object are detected in the stage of step S102, the bounding boxes 20 are set. Thereafter, class identification is carried out in step S103. If a target class is present, the flow proceeds from step S104 to step S106.

3. Second Embodiment: Area Clipping

Area clipping will be described as a process of the second embodiment allowed to be executed by the sensor device 1 having the configuration of FIG. 1.

For image signals detected by the array sensor 2, it is typically considered to transmit information associated with all pixels of each frame to the processor 11 and execute image recognition.

However, when information associated with all pixels of all frames is transferred to the processor 11 to perform object detection using the processor 11, a transfer information volume considerably increases particularly with an increase in definition of images captured by the array sensor 2. In this case, a transfer time is also required. Further, in a case of cloud transmission, an increase in a communication volume considerably influences a cost and a time for communication. Further, loads of a storage volume imposed on the processor 11 and a cloud also increase. Further, an analysis processing load and a processing time further increase. In addition, object detection performance may deteriorate.

Accordingly, the second embodiment attempts to increase processing efficiency in a following manner. When a necessary object is recognized in an image of a certain frame, image signals are acquired and transferred at a pixel level of an approximate region of the corresponding object in each of a next frame and frames following the next frame, and eliminates presence of information associated with pixels in other regions.

FIG. 7 depicts an outline.

FIG. 7A depicts an image of a certain frame F1. In a case where a "human" is set as an object to be detected, regions of humans are detected in the image of the frame F1. Subsequently, each of the regions where the human is detected is designated as an ROI (Region of Interest) 21 corresponding to a region of interest.

In frames F2, F3, and up to Fn following the frame F1, only pixels within the region designated as the ROI 21 are read from the array sensor 2. This image corresponds to an image containing only information associated with the portions of the ROI 21 as depicted in FIG. 7B.

Thereafter, analysis is performed by the calculation unit 8 on the basis of image signals containing the partial pixel information described above, or the image is transferred to the processor 11 and analyzed by the processor 11.

Specifically, as schematically depicted in FIG. 8A, the certain frame F1 present at a rate of one per N frames is designated as an image containing information associated with all effective pixels in image signals obtained by the array sensor 2. Subsequently, an entire screen is scanned using the calculation unit 8 to detect presence or absence and a position of a target object. Thereafter, the ROI 21 is set.

At the time of acquisition of a following frame F2, acquired are image signals where only pixels in the ROI 21 designated as the target area have been AD-converted as depicted in FIG. 8B. Note that each square separated by grids indicates a pixel.

As described above, for example, the target object is detected by scanning the entire screen in only one frame for every N frames, and image analysis is carried out in each of following frames F2, F3, F4, and others only for the detection area of the target object detected in the previous frame as depicted in FIG. 8C.

This process reduces an analysis data volume and a communication data volume without lowering accuracy of object detection as a target of an application, thereby reducing power consumption of the sensor device 1, and increasing a speed of image analysis associated with object detection of the entire system on which the sensor device 1 is mounted.

Figure 9:
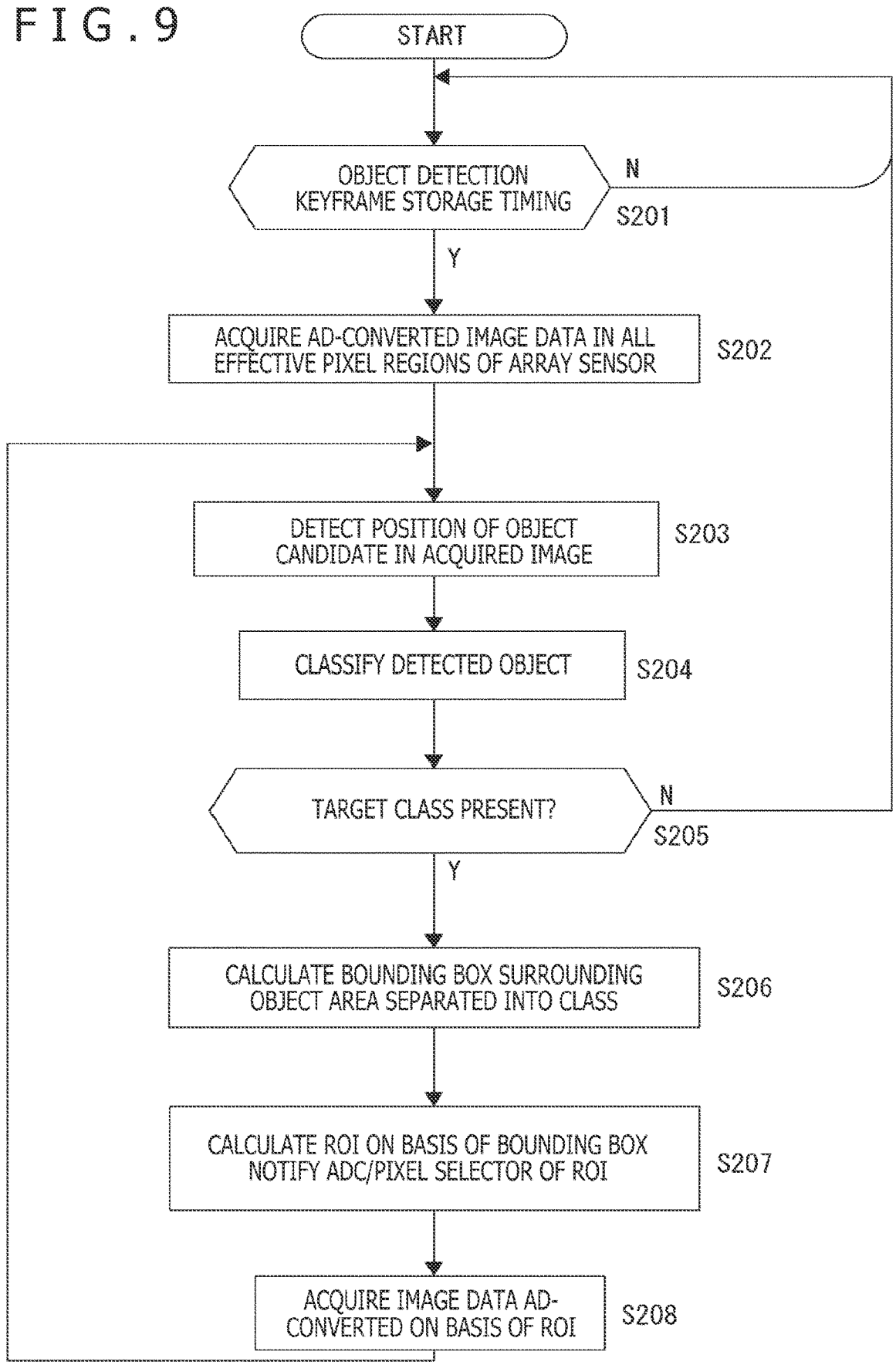
FIG. 9 is a flowchart of the area clipping analysis according to the second embodiment.
Figure 10:
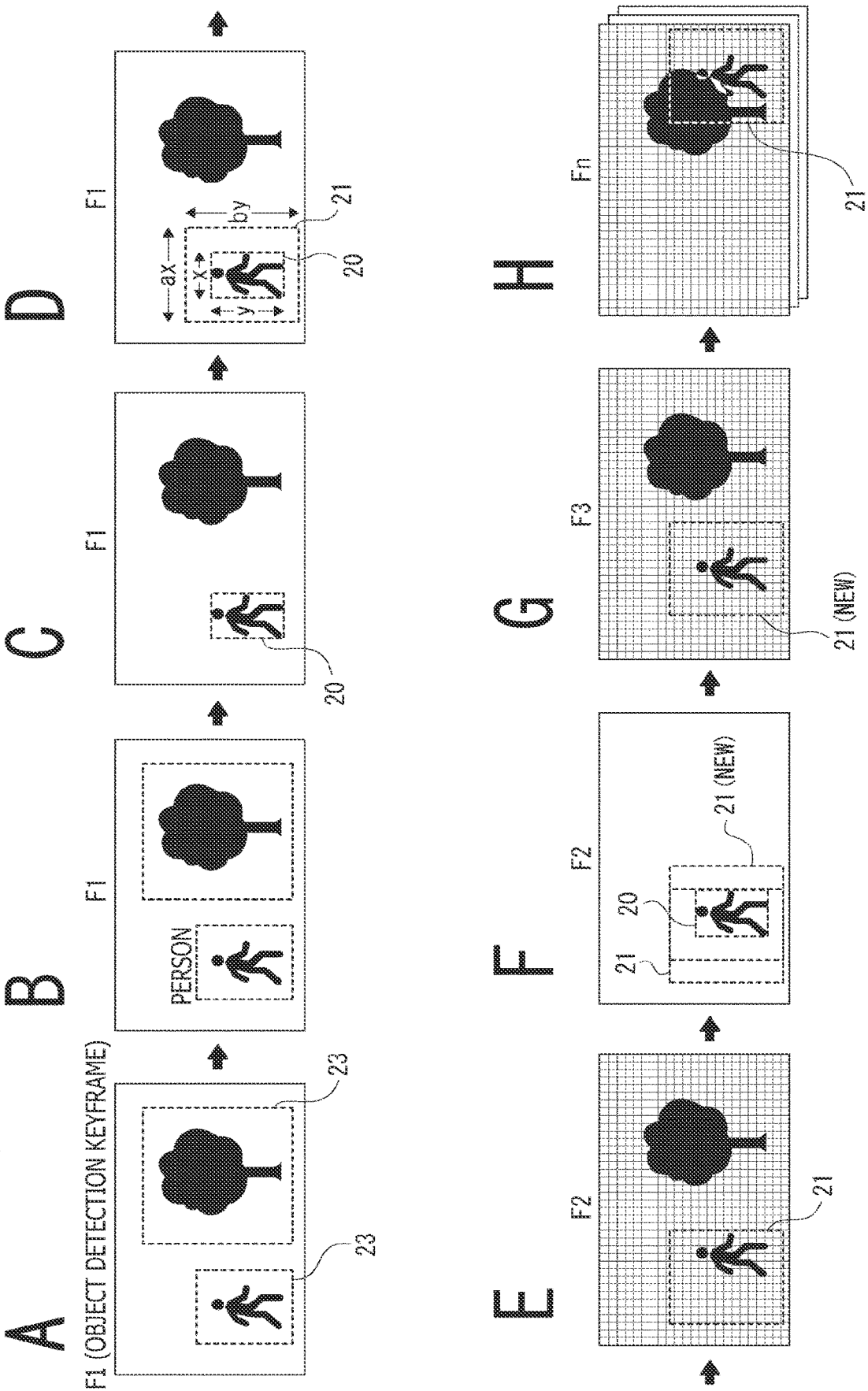
FIG. 10 is an explanatory diagram of calculation of an ROI (Region of Interest) from a bounding box according to the second embodiment.

FIG. 9 depicts a processing example of area clipping analysis performed by the calculation unit 8 of the sensor device 1. The description is made sequentially with reference to FIG. 10.

The calculation unit 8 (keyframe selection unit 81) in step S201 determines whether or not the current time is object detection keyframe recording timing.

The object detection keyframe recording timing herein refers to timing for acquiring information associated with an entire effective pixel region of the array sensor 2 for object detection.

The object detection keyframe recording timing may be determined according to a command issued from the outside of the sensor device 1, such as the processor 11. For example, it is assumed that the object detection keyframe recording timing is determined at intervals of 60 seconds according to an instruction of 60 seconds.

At the time of the object detection keyframe recording timing, the calculation unit 8 advances the flow to step S202 to acquire AD-converted image data of the entire effective pixel region of the array sensor 2. For example, the calculation unit 8 causes the ADC/pixel selector 3 to output image signals of the entire effective pixel region in one frame received from the array sensor 2.

The calculation unit 8 (object region recognition unit 82) in step S203 detects a position of an object candidate in the acquired image.

For example, when a frame F1 is designated as the object detection keyframe, candidate regions 23 of objects are detected within the image of the frame F1 as depicted in FIG. 10A. In this case, each of regions containing images of a "human" or a "tree" is designated as the candidate region 23.

In step S204 in FIG. 9, the calculation unit 8 (class identification unit 83) classifies the objects detected as candidates.

For example, the calculation unit 8 identifies each class of the objects in the candidate regions 23 as a "human," a "tree," or the like as depicted in FIG. 10B.

In step S205 in FIG. 9, the calculation unit 8 checks whether or not a target class is present in the classes obtained as a result of the class identification.

For example, in a case where a "human" is designated as the target class, it is considered that the target class is present as an identified class as depicted in FIG. 10B. In this case, the calculation unit 8 advances the flow from step S205 to step S206 in FIG. 9.

On the other hand, in a case where the target class is absent, the calculation unit 8 returns the flow to step S201 to standby for next object detection keyframe recording timing.

In step S206 in FIG. 9, the calculation unit 8 (object region recognition unit 82) calculates the bounding box 20 at correct position coordinates surrounding the area of the object separated into the class designated as the target class.

For example, FIG. 10C depicts an example of the bounding box 20 for an image of a human corresponding to the target class. Specifically, the bounding box 20 is calculated as a more accurate region of the object corresponding to the target class.

In step S207 in FIG. 9, the calculation unit 8 (object region recognition unit 82) calculates an ROI on the basis of the bounding box 20.

FIG. 10D depicts the ROI 21 and the bounding box 20. The ROI 21 is calculated after expanding a horizontal and vertical size (x×y) of the bounding box 20 (ax×by). The scales of expansion a and b may be set independently for the horizontal size and the vertical size. An expansion rate may be either fixed or designated by the outside of the sensor device 1 (e.g., processor 11).

The calculation unit 8 (object region recognition unit 82) notifies the ADC/pixel selector 3 of the ROI thus calculated.

In response to this notification, the ADC/pixel selector 3 performs AD conversion of only pixels corresponding to the ROI 21 in the array sensor 2, and outputs the converted pixels.

In step S208 in FIG. 9, the calculation unit 8 acquires image data of a next frame containing information associated with only the pixels in the ROI 21. Thereafter, the calculation unit 8 performs processing in steps S203 and S204 for the acquired frame.

FIG. 10E schematically depicts AD conversion of only pixels in the ROI 21 in the entire effective pixels (each square separated by grids in each figure indicates a pixel).

This AD conversion allows the calculation unit 8 to acquire an image of a frame F2 which has information associated with only the part corresponding to the ROI 21 as depicted in FIG. 10F.

Thereafter, the calculation unit 8 detects a position of an object candidate in the image of the frame F2, and classifies the object in steps S203 and S204 in FIG. 9. In the case of FIG. 10F, for example, a human is detected. Accordingly, the flow proceeds to steps S206 and S207 to calculate the new bounding box 20, and calculate the new ROI 21 on the basis of the bounding box 20. In FIG. 10F, the ROI newly obtained is expressed as an "ROI 21 (NEW)."

Note that the ROI 21 is generated by expansion of the bounding box 20 to handle movement of the object corresponding to an imaged object (or a change of an imaged object direction of the imaging device).

For example, the position of the human in the frame F2 in FIG. 10E changes rightward from the position of the human in the frame F1 in FIG. 10A. However, in the state where the ROI 21 is set to a wide area, a possibility of acquiring an image of the targeted human increases in the frame F2 even from only the pixels within the ROI 21.

While the ROI 21 is obtained by expanding the bounding box 20 to detect the target object also in the next frame as described above, it is also adoptable to set the expansion scales a and b at the time of expansion (ax×by) of the horizontal and vertical size (x×y) to scales corresponding to the frame rate.

For example, the time of the frame interval increases at a low frame rate. In this case, a movement amount of the object such as a human increases. Accordingly, it is adoptable to expand the size of the ROI 21 more than that in a case of a high frame rate.

Further, the ROI 21 is also re-calculated (the new ROI 21 (NEW) is generated) for each frame to handle movement of the object corresponding to the imaged object (or a change of the imaged object direction of the imaging device).

The human is detected at a position shifted rightward within the ROI 21 from the image of FIG. 10F as a result of movement of the human. Accordingly, the ROI 21 is obtained by calculating the new bounding box 20 surrounding the region of the human to update the ROI in such a manner as to follow the movement of the human as indicated by the ROI 21 (NEW).

In step S207, the calculation unit 8 notifies the ADC/pixel selector 3 of the new ROI 21 (NEW). As a consequence, only pixels within the new ROI 21 (NEW) of the next frame are AD-converted (see FIG. 10G).

In addition, the calculation unit 8 in step S208 similarly acquires image signals of only information associated with the pixels within the ROI 21 (NEW), and performs processing in step S203 and following steps.

This processing is repeatedly performed until absence of the target class is determined in step S205. Accordingly, even when the position of the human shifts as indicated in a frame Fn of a part H of FIG. 10, for example, image signals of the frame Fn which contains information associated with the region of the human can be acquired, on the basis of the ROI 21 calculated in a not-depicted previous frame F(n−1), by updating the position of the ROI 21 according to the human corresponding to the imaged object, for example.

If the detected human moves out of the frame and becomes difficult to detect, the target class is difficult to acquire. Accordingly, the calculation unit 8 returns the flow from step S205 to step S201 to standby for next object detection keyframe recording timing.

According to the area clipping analysis process executed as described above, data of all effective pixels is contained in image signals of a keyframe at object detection keyframe recording timing, but only pixels necessary for object detection are contained in a subsequent frame. In this manner, considerable reduction of the data volume of the image signals, and formation of an image suited for detection of a target object are both achievable. Further, reduction of power consumption is also achievable by reducing the number of pixels to be read by the array sensor 2.

In addition, in the case of the processing example of FIG. 9, the ROI 21 is set for each of the objects each corresponding to one target class, and the region of the ROI 21 corresponding to each of the objects is a target read from the array sensor 2. In this case, the target is limited to the object detected in the object detection keyframe. For example, even when a new object (e.g., a human) appears as an imaged object at timing of the frames F2 and F3, there is a possibility that an image of this human is not acquired.

This situation does not cause a problem when the use purpose is to track and analyze the object found in the object detection keyframe at certain time intervals, for example. However, in a case of application to a monitoring system or the like for monitoring all people appearing as imaged objects, it is preferable that an object appearing in a frame other than the object detection keyframe is also designated as a detection target.

Accordingly, for example, it is adoptable to always return the flow to step S202 at predetermined time intervals to acquire image signals of all effective pixels even when detection of the object of the target class continues (i.e., even in a case of continuation of determination as "YES" in step S205).

It is also preferable that the processor 11 or the like designates the time interval for acquiring image signals of all effective pixels.

Alternatively, it is also adoptable to constantly designate a peripheral portion of an image as a region of an AD conversion target separately from the ROI 21. In this case, a new object is detected and given the ROI 21 as well when this new object comes into the frame as an imaged object.

Described above is the case where the rectangular region of the ROI 21 is produced by expanding the bounding box 20. However, the ROI 21 is not limited to a rectangular region.

For example, the ROI 21 may be calculated from an area of the object of the target class using semantic segmentation, i.e., object area detection at a pixel level.

Figure 11:
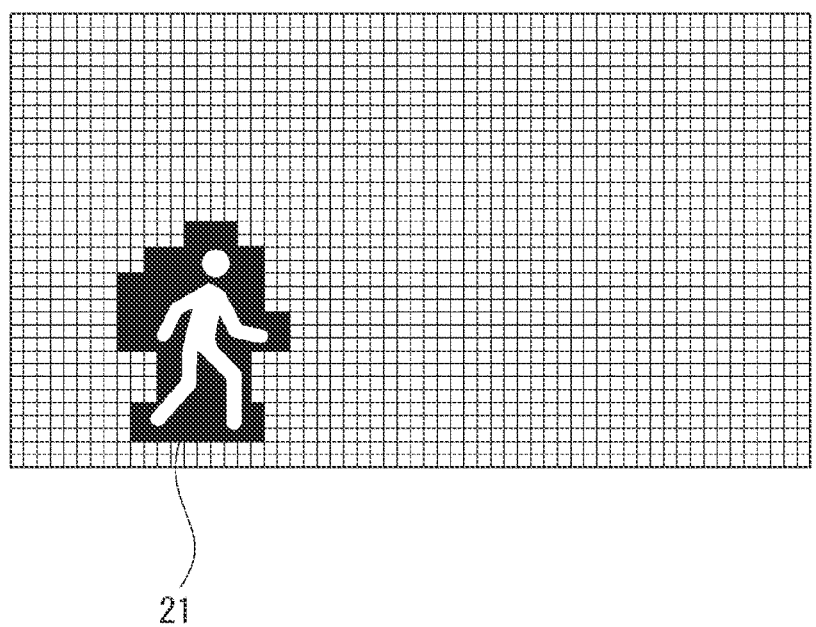
FIG. 11 is an explanatory diagram of another example of the ROI according to the second embodiment.

FIG. 11 depicts the ROI 21 based on semantic segmentation. This is an example where the ROI 21 having a non-rectangular shape is set by expanding a pixel region corresponding to an object (e.g., a person).

For example, there is a situation where the ROI 21 having a rectangular shape has a missing part or is excessively large, in such cases as a truck having a projection, and a person riding a bicycle. A possibility of producing the ROI 21 achieving both data volume reduction and acquisition of necessary information can be raised by forming the non-rectangular ROI 21 according to an object position at a pixel level.

Note that the effects of data volume reduction and detection accuracy improvement can be more effectively obtained by executing a combination of the area clipping of the second embodiment and the classified image adaptation process in the first embodiment described above.

4. Third Embodiment: Area Clipping Using AROI

Area clipping using an advanced ROI (also expressed as "AROI") will be described as a process of the third embodiment executable by the sensor device 1 having the configuration of FIG. 1.

The AROI is an ROI set using a template defined for each class.

The array sensor 2 (image sensor) consumes highest power by photoelectric conversion. Accordingly, it is preferable to reduce photoelectrically converted pixels as much as possible to achieve power consumption reduction.

Further, image signals obtained using the array sensor 2 are generated for a purpose of image analysis, and therefore are not viewed by a viewer. Accordingly, these image signals need not be recognizable or form a beautiful image for a viewer. In other words, it is important to form an image achieving accurate object detection.

For example, a class is identified for a detected object in the second embodiment described above. However, for this class identification, a minimum necessary area corresponding to the class is only required to be set as an ROI. Accordingly, an AROI 22 depicted in each of FIGS. 12 and 13 is set.

Figure 12:
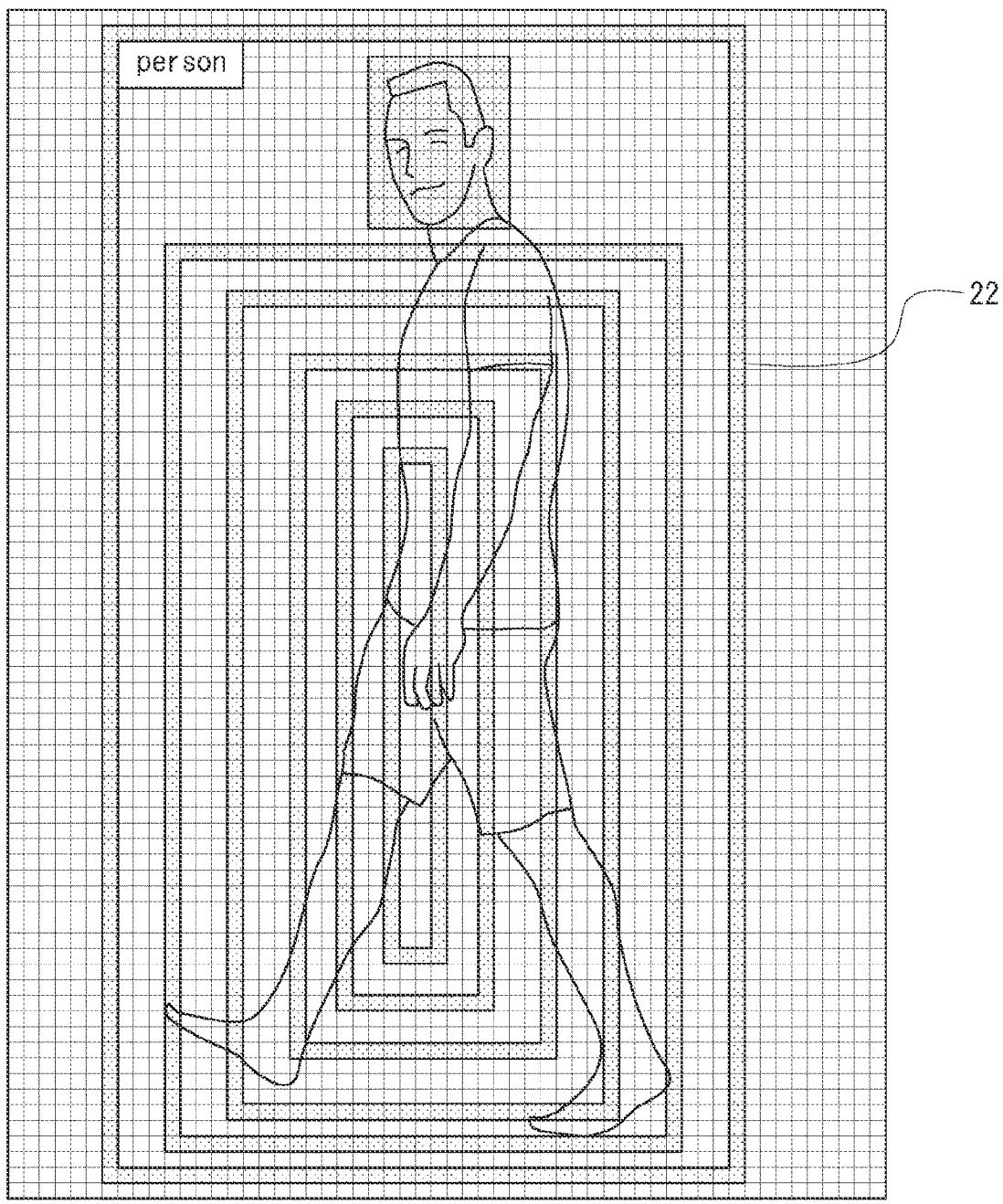
FIG. 12 is an explanatory diagram of an advanced ROI according to the third embodiment.

FIG. 12 depicts the AROI 22 generated using a template corresponding to a class "person" for an image region of a person. Each grid in the figure indicates a pixel (pixel). It is assumed that each dark pixel represents a pixel designated by the AROI.

For example, the template corresponding to the class "person" is a template which defines a face portion as a portion requiring high-density pixels, and a body portion as a portion requiring low-density pixels to cover the whole.

Figure 13:
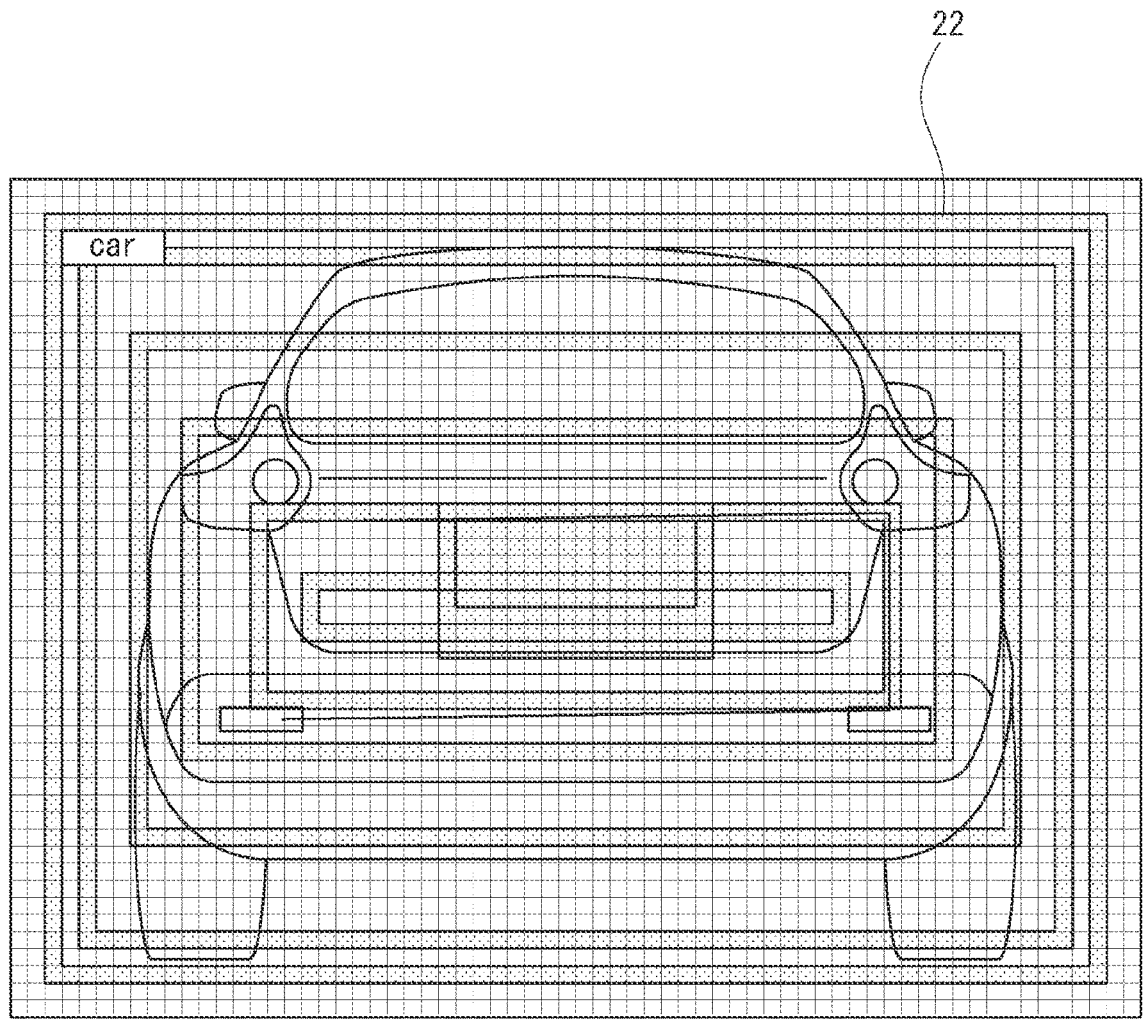
FIG. 13 is an explanatory diagram of the advanced ROI according to the third embodiment.

Further, FIG. 13 depicts the AROI 22 generated using a template corresponding to a class "car." This example is applicable to a rear image of a car. For example, a portion where a number plate is located is defined as a portion requiring high-density pixels, while the other portion is defined as a portion requiring low-density pixels to cover the whole.

In a practical situation, it is adoptable to divide the class "person" into a "person facing the side," a "person facing the front," a "sitting person," and the like to further divide the template, and divide the class "car" into a "side image," a "front image," a "rear image," and the like to further divide the template.

In such a manner, the template is selected according to the class, and the selected template is enlarged or contracted according to a region size within an actual frame to generate the AROI 22.

Figure 14:
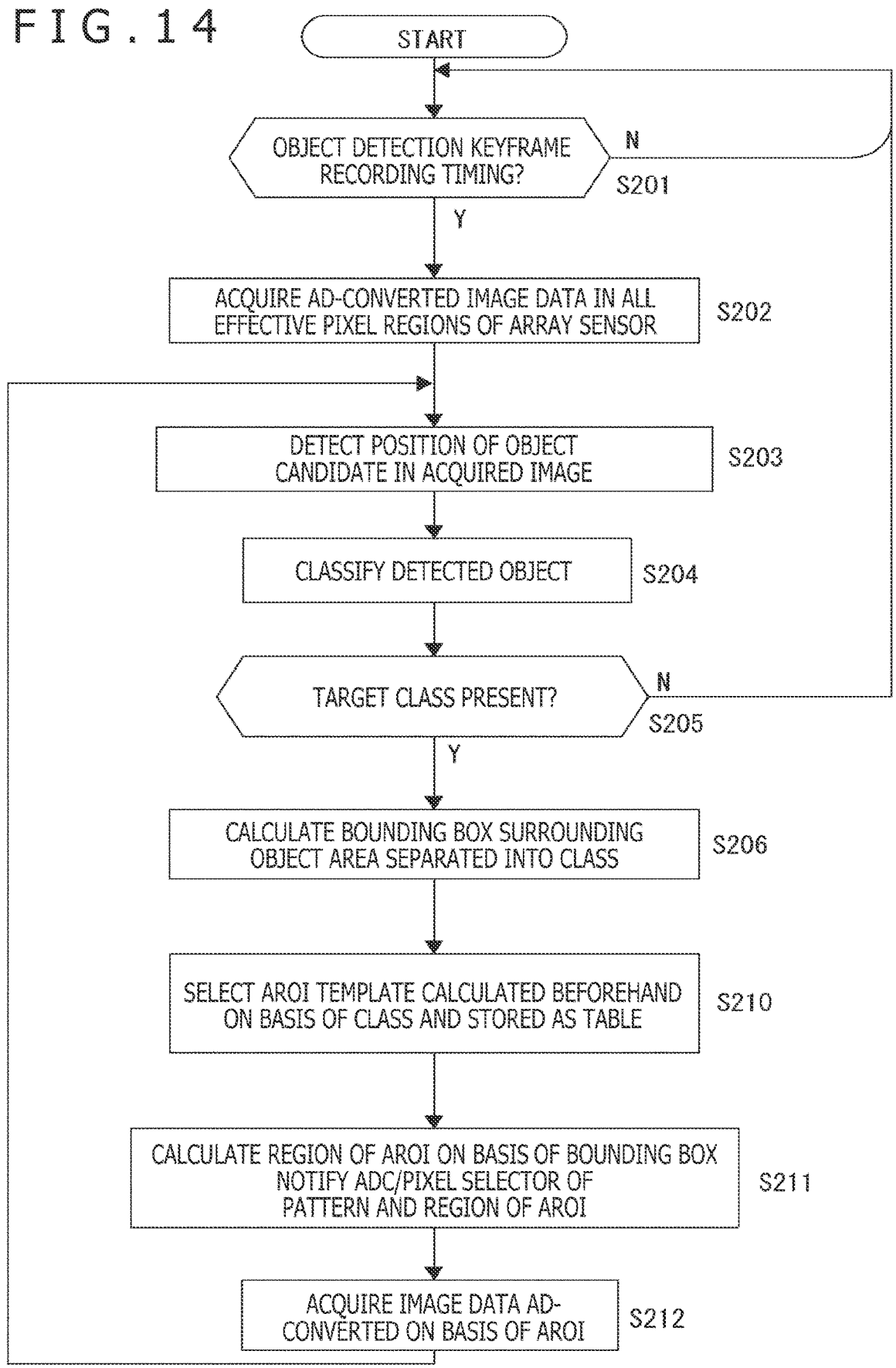
FIG. 14 is a flowchart of area clipping analysis using the advanced ROI according to the third embodiment.

FIG. 14 depicts a processing example using the AROI 22.

Note that processing from steps S201 to S206 is similar to the corresponding processing in FIG. 9, and therefore is not repeatedly explained.

In step S206, the calculation unit 8 (object region recognition unit 82) calculates the bounding box 20 in a case where an object of a target class is present in image signals of all effective pixels obtained at object detection keyframe recording timing.

Subsequently, the calculation unit 8 (parameter selection unit 84) in step S210 selects an AROI template calculated on the basis of classes and stored beforehand.

For example, in a case where a person is present within an image in a state where a "person" is a target class, a template for "person" is selected.

In step S211, the calculation unit 8 (object region recognition unit 82) calculates the AROI 22 on the basis of the bounding box 20.

For example, a template after size adjustment according to the size of the bounding box 20 is designated as the AROI 22.

Thereafter, the calculation unit 8 (object region recognition unit 82) notifies the ADC/pixel selector 3 of the AROI 22 (a pattern and a region of the AROI) thus calculated.

In response to this notification, the ADC/pixel selector 3 performs AD conversion of only pixels corresponding to the AROI 22 in the array sensor 2, and outputs the converted pixels.

In step S212, the calculation unit 8 acquires image data of a next frame containing information associated with only the pixels within the AROI 22. Thereafter, the calculation unit 8 performs processing in steps S203 and S204 for the acquired frame.

The flow of following processing is similar to the flow of the corresponding processing explained with reference to FIG. 9.

By generating the AROI 22 using the template set according to the class as described above, information achieving accurate object detection according to the class is acquirable even with considerable reduction of photoelectrically converted pixels.

Note that the point that object detection keyframe recording timing is constantly set at intervals of a certain time, and the point that a peripheral portion of an image is constantly designated as a region of an AD conversion target as described in the second embodiment are also applicable to the third embodiment.

Further, the effects of data volume reduction and detection accuracy improvement can be more effectively obtained by executing a combination of the area clipping of the third embodiment using the AROI 22 as described above, and the classified image adaptation process in the first embodiment.

5. Fourth Embodiment: Intelligent Compression

A process of intelligent compression will be described as a process of a fourth embodiment executable by the sensor device 1 having the configuration of FIG. 1.

Intelligent compression is a process which specifies a detection target object, and compresses the target object at a low compression rate and things other than the target object at a high compression rate.

FIG. 15 depicts a specific example.

FIG. 15A depicts a state where the ROI 21 is generated in correspondence with each of cars in a case where a class "car" is detected as a target class from an image of one certain frame.

FIG. 15B is a state where image signals are compressed in each of the regions of the ROI 21 at a low compression rate, and compressed in the other region at a high compression rate.

In such a manner, reduction of an analysis data volume and reduction of a communication data volume are achieved without lowering detection accuracy of the objects corresponding to targets of an object detection application.

Further, it is attempted to reduce power consumption of the sensor device 1, and increase an image analysis speed associated with object detection of the entire system where the sensor device 1 is mounted.

Figure 16:
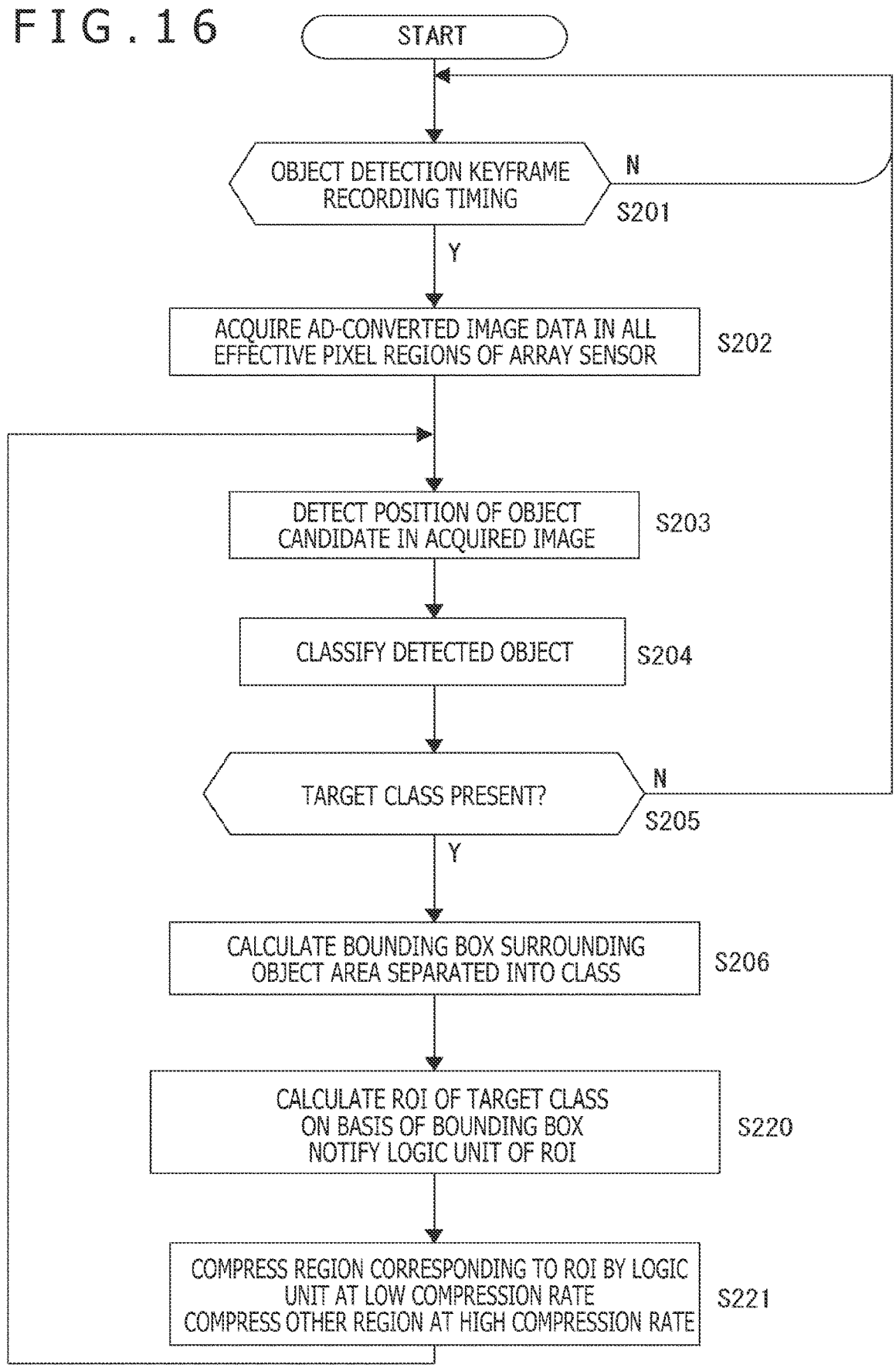
FIG. 16 is a flowchart of the intelligent compression according to the fourth embodiment.

FIG. 16 depicts a processing example of the intelligent compression.

Note that processing from steps S201 to S206 is similar to the corresponding processing in FIG. 9. However, there are some different points in comparison with the case of the area clipping described above. Accordingly, processing corresponding to these points will be also touched upon.

The calculation unit 8 (keyframe selection unit 81) in step S201 determines whether or not the current time is object detection keyframe recording timing.

At the time of the object detection keyframe recording timing, the calculation unit 8 advances the flow to step S202 to acquire AD-converted image data of the entire effective pixel region of the array sensor 2.

However, in the case of the intelligent compression, the ADC/pixel selector 3 reads (AD-converts) signals of all pixels from the array sensor 2 for each frame.

The calculation unit 8 (object region recognition unit 82) detects positions corresponding to object candidates in the image acquired in step S201. In subsequent step S204, the calculation unit 8 (class identification unit 83) classifies the objects detected as candidates.

In step S205, the calculation unit 8 checks whether or not a target class is present in classes obtained as a result of the class identification.

In step S206, the calculation unit 8 (object region recognition unit 82) calculates the bounding box 20 in a case where an object of the target class is present in image signals of all effective pixels obtained at object detection keyframe recording timing.

In step S220, the calculation unit 8 (object region recognition unit 82) calculates the ROI 21 on the basis of the bounding box 20. In this case, for example, it is also adoptable to define the ROI 21 by expanding the bounding box 20.

The calculation unit 8 (object region recognition unit 82) notifies the logic unit 5 of the ROI 21 thus calculated.

In response to this notification, the logic unit 5 in step S221 performs a compression process for the image signals read from the array sensor 2 at a low compression rate in the pixel region corresponding to the ROI 21, and at a high compression rate in the other pixel region.

The image signals subjected to the compression process are then written to the DRAM 6, and transferred to the processor 11 via the interface unit 7.

The necessary region designated by the ROI 21 has been compressed at the low compression rate on the processor 11 side. Accordingly, accurate object detection is achievable by the presence of sufficient information.

As for the processing performed by the calculation unit 8, the flow returns to step S203 after completion of step S220. Thereafter, the calculation unit 8 detects a position of an object candidate in a next frame, and identifies a class of the detected object in step S204.

According to the fourth embodiment herein, all effective pixels are read from the array sensor 2 in each of the frames. Accordingly, even in a case where the flow returns to step S203 after steps S220 and S211, the calculation unit 8 is allowed to scan the range of all effective pixels and detect an object candidate in step S203. Appearance of a new object of the target class during the keyframe recording timing can be constantly handled by scanning the range of all effective pixels and detecting an object candidate.

In this case, however, a processing load imposed on the calculation unit 8 can be reduced if the calculation unit 8 detects an object candidate only in the region within the ROI 22.

The calculation unit 8 updates the ROI 21 in steps S206 and S220 according to confirmation of the presence of the target class.

Accordingly, the region compressed at the low compression rate by the logic unit 5 is also updated according to the position of the object in each frame.

If absence of the target class is determined in step S205, the flow of the process performed by the calculation unit 8 returns to step S202 to standby for object detection keyframe recording timing.

The above process presented in FIG. 16 achieves the intelligent compression process which compresses at a low compression rate in portions necessary for analysis, i.e., within the ROIs 21 of the portions each containing the object of the target class, and compresses at a high compression rate in the other portion.

Note that the point that object detection keyframe recording timing is constantly set at intervals of a certain time, and the point that an ROI based on semantic segmentation is generated as described in the second embodiment are also applicable to the fourth embodiment described herein.

Further, the effects of data volume reduction and detection accuracy improvement can be more effectively obtained by executing a combination of the intelligent compression process of the fourth embodiment described above, and the classified image adaptation process in the first embodiment.

6. Fifth Embodiment: Active Sampling

Active sampling will be described as a process of the fifth embodiment executable by the sensor device 1 having the configuration of FIG. 1.

Active sampling refers to a process which dynamically changes a frame rate according to presence or absence of a target object. This process is considered to achieve compression of a data volume in a time axis direction according to presence or absence of the target object. Further, this process achieves reduction of power consumption of the sensor device 1.

Figure 17:
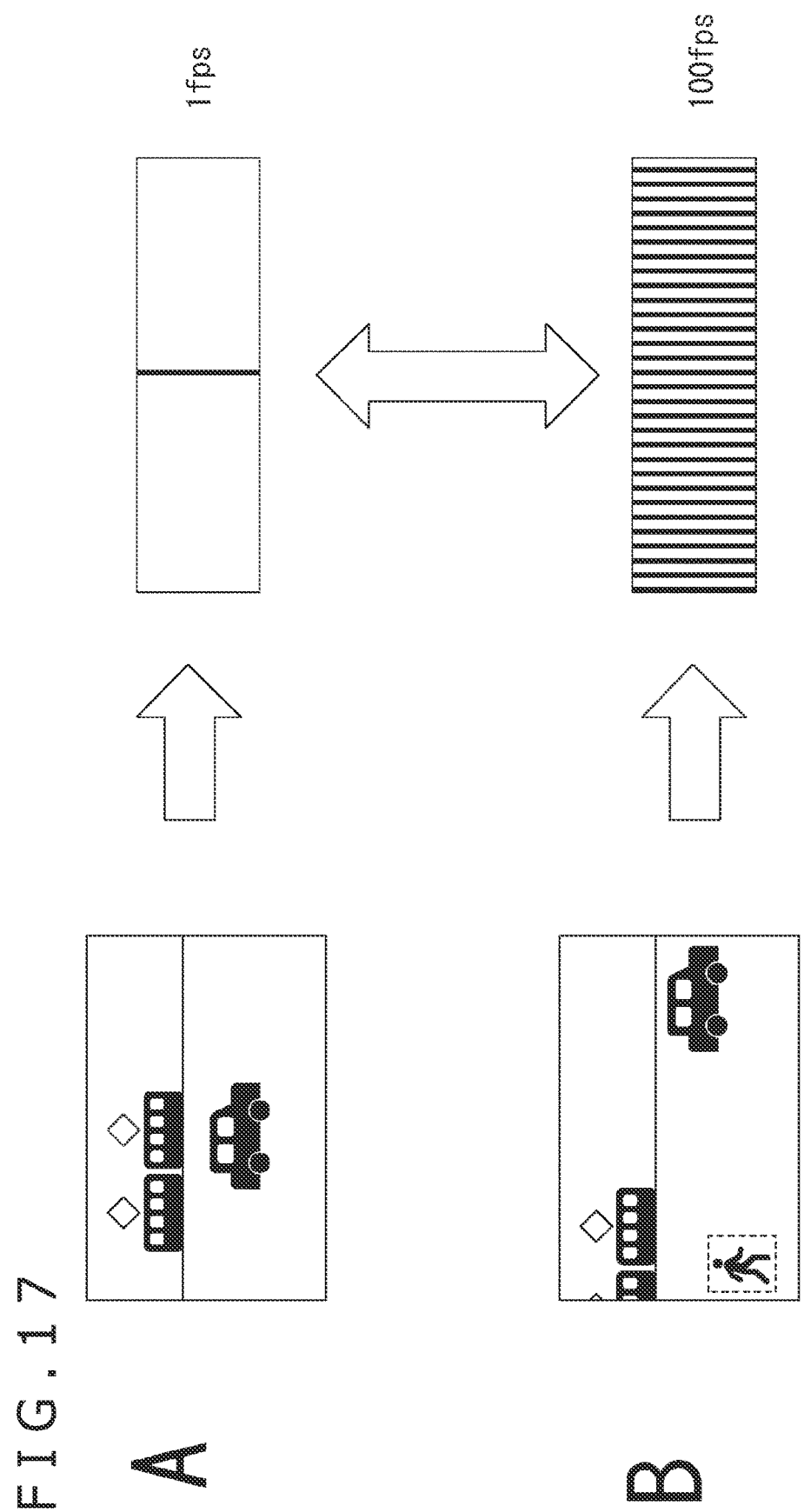
FIG. 17 is an explanatory diagram of active sampling according to the fifth embodiment.

An outline of the active sampling will be described with reference to FIG. 17.

Suppose herein that a human is detected from a captured image on an assumption that a "human" is designated as a target class. For example, assumed is a case where images of the outside are captured from the inside of a building through an entrance using a monitoring camera.

FIG. 17A depicts a state where the captured image does not contain a human. In this case, the frame rate is set to a low rate, such as 1 fps.

FIG. 17B depicts a state where a human is detected in the captured image. In this case, the frame rate is set to a high rate, such as 100 fps.

In other words, the frame rate is dynamically changed with limitation to a particular detection target so as to lower the frame rate at the time of absence of necessity (at the time when no human is detected), and raise the frame rate to obtain a large information volume at the time of presence of necessity (at the time when a human is detected).

Figure 18:
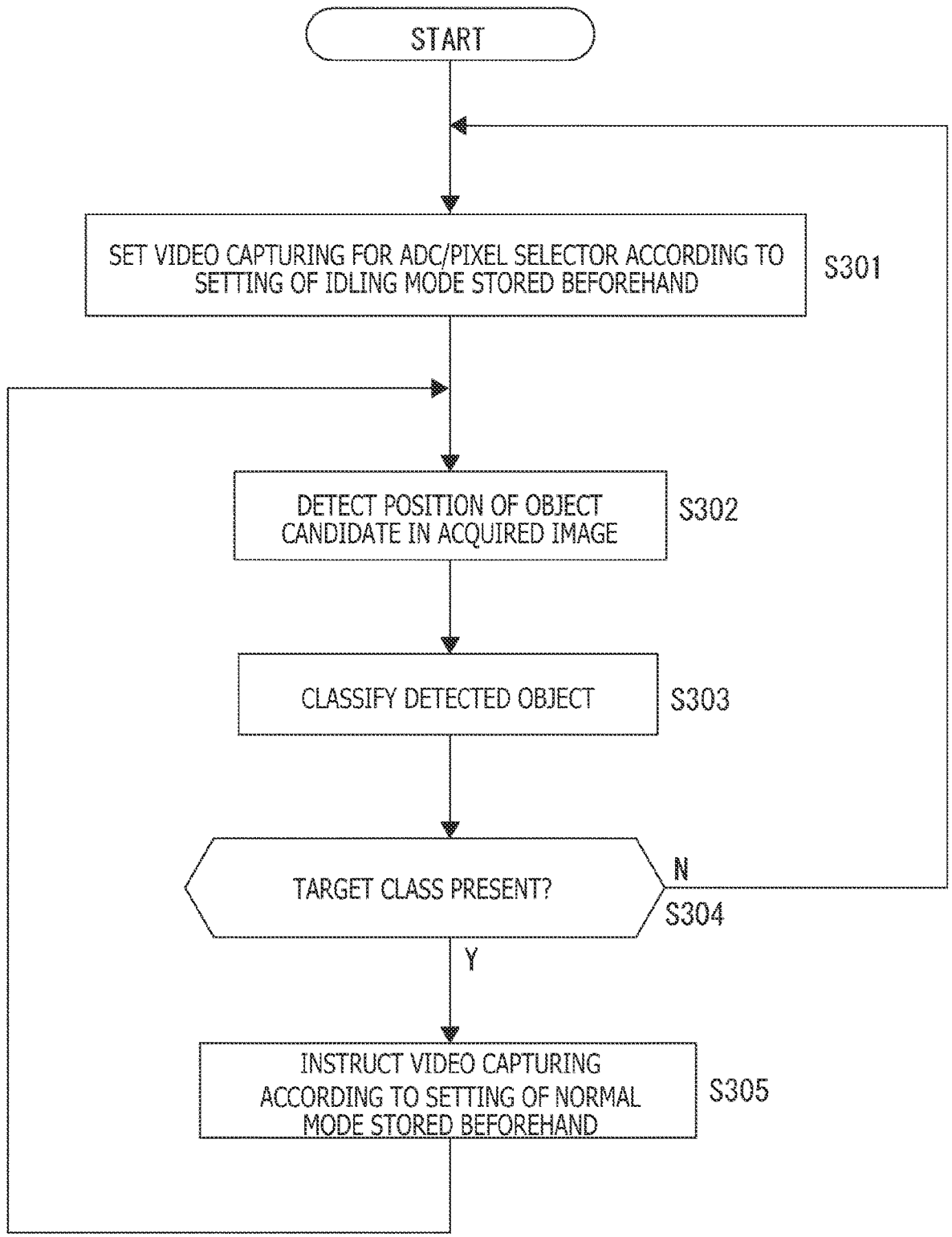
FIG. 18 is a flowchart of the active sampling according to the fifth embodiment.

FIG. 18 depicts a processing example of the active sampling.

In step S301, the calculation unit 8 (keyframe selection unit 81) sets video capturing for the ADC/pixel selector 3 according to the setting of the idling mode stored in the calculation unit 8 beforehand, for example.

The parameter selection unit 84 in the calculation unit 8 is configured to store the setting of the idling mode, and the setting of the normal mode, for example.

The active sampling includes the setting of the idling mode and the setting of the normal mode. The idling mode is a mode selected before a decision that a captured screen contains an object of a target class.

In this idling mode, video capturing is performed at a frame rate lower than that of the normal mode.

It is adoptable that the idling mode starts in response to a command from the outside of the sensor device 1. Alternatively, the idling mode may respond to a command of intervals of idling mode data acquisition timing issued from the outside of the sensor device 1. For example, in a case of an instruction of 60 seconds, object detection keyframe recording timing is set at intervals of 60 seconds.

The normal mode is a normal video capturing mode. For example, the normal mode responds to a command of intervals of normal mode data acquisition timing issued from the outside of the sensor device 1.

Video capturing is generally performed at a frame rate higher than that of the idling mode. In a case of an instruction of 0.01 seconds, for example, the normal mode becomes a mode for image capturing at intervals of 0.01 seconds (100 fps).

Accordingly, if the idling mode is set to 1 fsp, video capturing is performed at intervals of 1 second in response to an instruction of the idling mode issued from the calculation unit 8 to the ADC/pixel selector 3 in step S301.

Note that the settings of the idling mode and the normal mode are not necessarily required to be stored in the calculation unit 8, but may be stored in an external memory of the calculation unit 8.

Needless to say, frame rates of the idling mode and the normal mode are only examples.

Further, it is preferable that setting values of the idling mode and the normal mode are rewritable from an external device such as the processor 11.

The calculation unit 8 (object region recognition unit 82) in step S302 detects positions of object candidates in the acquired image.

In step S303, the calculation unit 8 (class identification unit 83) classifies the objects detected as candidates.

In step S304, the calculation unit 8 checks whether or not a target class is present in classes obtained as a result of the class identification.

If the target class is not present, the calculation unit 8 performs processing in steps S301, S302, and S303. Specifically, an image of a next frame in the idling mode is acquired, and detection of positions of candidate objects, and class identification are similarly performed. In this case, these processes are carried out for an image after one second on an assumption that image capturing is achieved by 1 fps, for example.

For example, in a case where a "human" is present as the identified class in a state where the "human" has been designated as the target class, the calculation unit 8 advances the flow of the process from step S304 to step S305.

The calculation unit 8 (keyframe selection unit 81) sets video capturing for the ADC/pixel selector 3 according to the stored setting of the normal mode, and gives an instruction of image capturing in the normal mode.

Accordingly, if the normal mode is set to 100 fsp, video capturing is performed at intervals of 0.01 seconds, for example.

In such a manner, the calculation unit 8 performs processing in steps S302 and S303 in a state where the mode has been switched to the normal mode.

The normal mode then continues as long as the target class is present in the captured image. However, when no target class is present anymore, the flow returns to step S301 to switch to the idling mode.

The above processing is performed as the active sampling. In this manner, data volume compression is achieved by lowering the frame rate particularly in the period of absence of the target class, and power consumption is thus reduced.

According to this example, the calculation unit 8 instructs the ADC/pixel selector 3 to change the frame rate to achieve a frame rate change. However, the calculation unit 8 may instruct the logic unit 5 to change the frame rate.

For example, readout from the array sensor 2 is always performed at 100 fps. In the case of the idling mode, the calculation unit 8 instructs the logic unit 5 to carry out frame thinning. In this manner, reduction of a data volume associated with transfer to the processor 11 is achievable.

Note that a more effective data volume reduction effect can be produced without lowering detection accuracy by combining the foregoing active sampling process with the second, the third, and the fourth embodiments.

Further, improvement of detection accuracy is achievable as well as effective data volume reduction by combining the active sampling process and the classified image adaptation process of the first embodiment.

7. Sixth Embodiment: Image Adaptation by Threshold Setting

A process of image adaptation will be described as a process of a sixth embodiment. The example described herein is an example which further adds an idea of a parameter change corresponding to threshold setting to the process of classified image adaptation of the first embodiment.

Examples of parameters referred to herein are assumed to be parameters used for image processing by the logic unit 5. For example, the parameters used for the image processing by the logic unit 5 are set (adjusted or changed) such that thresholds set for the sensor device 1 can be met.

Further, the parameters are also assumed to be parameters used for image capturing processing, such as signal readout by the ADC/pixel selector 3, and an exposure operation performed by the array sensor 2. For example, control parameters and the like for an operation of image capturing processing performed by the ADC/pixel selector 3 or the array sensor 2 are set (adjusted or changed) such that thresholds input to the sensor device 1 can be met.

According to the first embodiment described above, the parameters used by the logic unit 5 are selected according to class identification. However, the selected parameters may be set (adjusted or changed) on the basis of the thresholds.

Alternatively, the parameters are not limited to parameters selected on the class identification. It is adoptable to set parameters on the basis of the thresholds as long as the parameters are used by the logic unit 5, the ADC/pixel selector 3, or the array sensor 2.

Presented below is a specific example of parameters associated with image capturing processing and image processing, and automatically set on the basis of the thresholds as described above.

For example, the parameters associated with image processing are parameters presented hereinafter by way of example.
 aspect ratio of image
 resolution
 number of color gradations (number of colors or number of bits)
 contrast adjustment value
 sharpness adjustment value
 gray level adjustment value
 gamma correction value
 sampling rate conversion ratio The parameters of the aspect ratio of the image and the resolution are also reflected in the ROI 21.

The number of color gradations, the contrast adjustment value, the sharpness adjustment value, the gray level adjustment value, the gamma correction value, and the resolution are parameters associated with image quality.

The sampling rate conversion ratio is a parameter of time resolution.

Further, the parameters associated with image capturing processing include followings.
 sampling rate
 resolution (e.g., resolution set during reading by ADC/pixel selector 3)
 shutter speed (exposure time) of array sensor 2

Needless to say, the parameters automatically set on the basis of the thresholds include parameters other than the above example.

These parameters according to the thresholds are set for purposes of data volume reduction, processing speed increase, power consumption reduction, and others while securing practical accuracy of output of object detection in a case where the object detection is performed by the processor 11 on the basis of learning using a deep neural network (DNN: Deep Neural Network), for example.

Accordingly, the parameters are set such that a necessary level of accuracy of object detection is maintained even after reduction of an image capturing data volume achieved by a change of the parameters such as the resolution and the number of colors.

The idea of parameter setting based on the thresholds will be described with reference to FIG. 19.

For example, it is assumed that an image output by image capturing of a human using the sensor device 1 is full-color image data containing information associated with all pixels (all effective pixels) of the array sensor 2, and output at a frame rate of 60 fps (frames per second), for example.

In addition, it is assumed that correct detection of a human is achieved at a rate of 98% with a confidence rate CR of 0.98 by object detection using the processor 11 or the like from this image data. The confidence rate is a rate of confidence of correct determination and detection of an object.

On the other hand, by output of image data with slightly lowered resolution, a slightly decreased number of color gradations, and a frame rate of 30 fps, it is assumed that detection is achieved at a confidence rate CR of 0.92.

Further, by output of image data with further lowered resolution, a further decreased number of color gradations, and a frame rate of 15 fps, it is assumed that detection is achieved at a confidence rate CR of 0.81.

Further, by output of image data with considerably lowered resolution, a considerably decreased number of color gradations, and a frame rate of 10 fps, it is assumed that detection is achieved at a confidence rate CR of 0.58.

These are only examples presented for explanation. In this manner, the confidence rate changes according to a change of parameters associated with image capturing or image quality, such as resolution, the number of colors, and time resolution image data corresponding to an analysis target. In other words, accuracy of image analysis and object detection changes.

Meanwhile, it is preferable that the confidence rate of object detection is a highest possible rate. However, the highest rate is not necessarily obtainable in actual situations.

For example, suppose that a rough number of persons is to be detected from a bird's eye view image captured in a park as depicted in FIG. 7A. In this case, such high accuracy is unnecessary. For example, in a case where a rough result of detection of several persons, approximately 10 persons, approximately 20 persons, or the like is desired, only a confidence rate CR of approximately 0.6 may be sufficient.

On the other hand, in a case where accurate monitoring of entrance or the like of a person is desired using a crime prevention camera or the like, a confidence rate CR of approximately 0.95 may be required.

Further, a confidence rate CR of 0.70 may be sufficient during the daytime, but a confidence rate of approximately 0.9 may be required during the nighttime.

Accordingly, the confidence rate CR required as accuracy of object detection differs for each of various factors, such as a purpose, a target, a type of device/application program, a season, and a district of the detection.

Further, the confidence rate changes according to analysis ability and a learning level of the processor 11, and also changes according to a detection target and a class.

Considering these, image signals matching a request such as object detection can be output by determining thresholds on the basis of a required appropriate confidence rate, and changing parameters according to the thresholds, for example.

Figure 19:
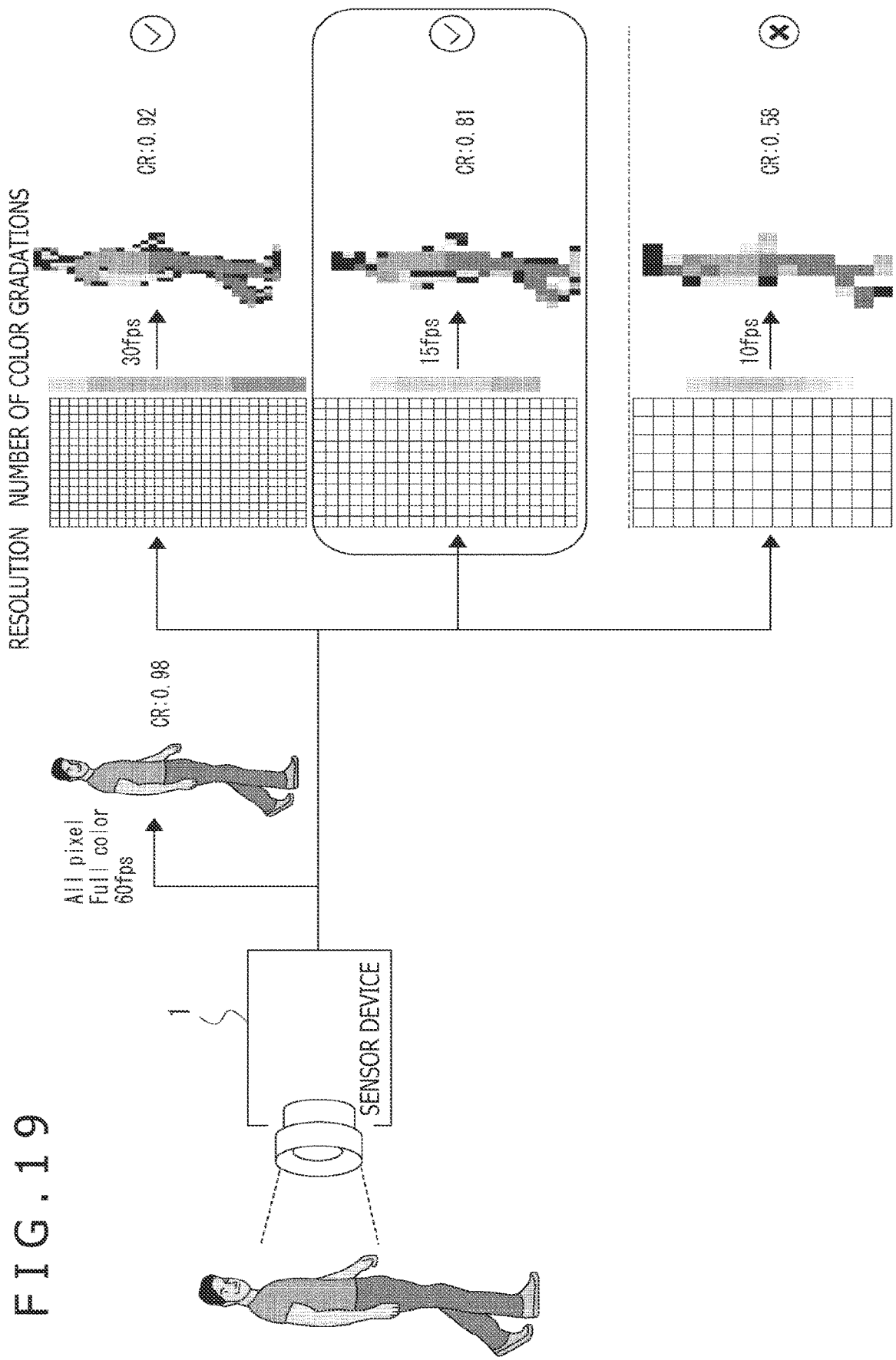
FIG. 19 is an explanatory diagram of threshold setting for an image adaptation process according to a sixth embodiment.

Suppose herein that a confidence rate of 0.80 or higher is required in the example of FIG. 19.

In this case, parameters achieving a threshold of 0.80 as the confidence rate CR or higher are calculated and set as parameters used by the logic unit 5 and the like. Particularly, such parameters higher than thresholds but reducing a data volume to a relatively small volume are set.

For example, parameters such as resolution, the number of color gradations, and a frame rate achieving a confidence rate CR of 0.81 are set as depicted in the figure.

In this case, considerable reduction of the data volume can be achieved, and necessary object detection accuracy can be maintained in comparison with a case which sets parameters achieving a confidence rate CR of 0.98 and outputting image signals.

Note that the "thresholds" may be considered as a value required for a desired confidence rate. However, from a viewpoint of thresholds calculated for parameter adjustment, the "thresholds" may be values of parameters for obtaining a confidence rate for a required "threshold."

Specifically, from a technical viewpoint, following processing methods [1] and [2] are assumed as a process for "setting thresholds of parameters, and performing processing using the parameters set on the basis of the thresholds."

[1] A threshold of an index value such as a confidence rate suited for a use mode or a use environment is calculated, and parameters actually used as parameter values for obtaining an index value excessing the threshold of the index value are set. In other words, thresholds of parameters are set from a viewpoint of an index value for object detection.

[2] Thresholds of parameters for obtaining a value required for an index values such as a confidence rate are calculated, and parameters actually used are calculated on the basis of the thresholds. In other words, thresholds of parameters are set from a viewpoint of values of parameters themselves.

According to the present embodiment, parameters adapted such that an image data volume decreases to a smallest possible volume are practically used by setting thresholds in the manner described in above [1] or [2] on the basis of a confidence rate, for example. These parameters are calculated in real time (e.g., regularly during image capturing) to dynamically change parameters.

For example, appropriate thresholds or parameters corresponding to these thresholds are calculated using DNN processing according to a use application, a target class, and an image capturing environment of the sensor device 1, and a parameter change is made. In this manner, speed increase, power consumption reduction, and accuracy increase suited for an application or the like are achieved.

Particularly, according to parameter adjustment in an example explained in the sixth embodiment, thresholds corresponding to a confidence rate of object detection are defined, and setting values of parameters closest possible to but not lower than the thresholds are calculated.

Further, it is appropriate that the thresholds and the parameters corresponding to the thresholds are set for each class.

FIG. 20A depicts an image classified into a "human face" class, while FIG. 20B depicts an image classified into a "road sign (road sign)" class.

FIG. 20A depicts followings for the human face. In a case of image signals indicating 8-bit RGB data 16777216 colors, and a data volume of 1.5 MB, a confidence rate CR of 0.99 is obtained. In a case of image signals indicating 8-bit gray tone 256 colors and a data volume of 540 KB, a confidence rate CR of 0.75 is obtained. In a case of image signals indicating white-black two colors, and a data volume of 180 KB, a confidence rate CR of 0.58 is obtained.

In this case, for example, assuming that a threshold of a confidence rate CR for the human face is set to 0.74, a right image is not appropriate. Accordingly, parameters in a center image are suited for parameter setting.

FIG. 20B depicts followings for the road sign. In a case of image signals indicating 8-bit RGB data 16777216 colors, and a data volume of 1.4 MB, a confidence rate CR of 0.99 is obtained. In a case of image signals indicating 8-bit gray tone 256 colors and a data volume of 520 KB, a confidence rate CR of 0.95 is obtained. In a case of image signals indicating white-black two colors, and a data volume of 110 KB, a confidence rate CR of 0.88 is obtained.

In this case, for example, assuming that a threshold of a confidence rate CR for the road sign is set to 0.85, all the images are suitable. Parameters of the right image are suited for parameter setting.

As described above, for example, detection accuracy and required accuracy of image signal quality differ for each object class. Accordingly, it is appropriate to perform threshold setting and parameter change according to classes.

A specific example of the sixth embodiment will be hereinafter described.

Figure 21:
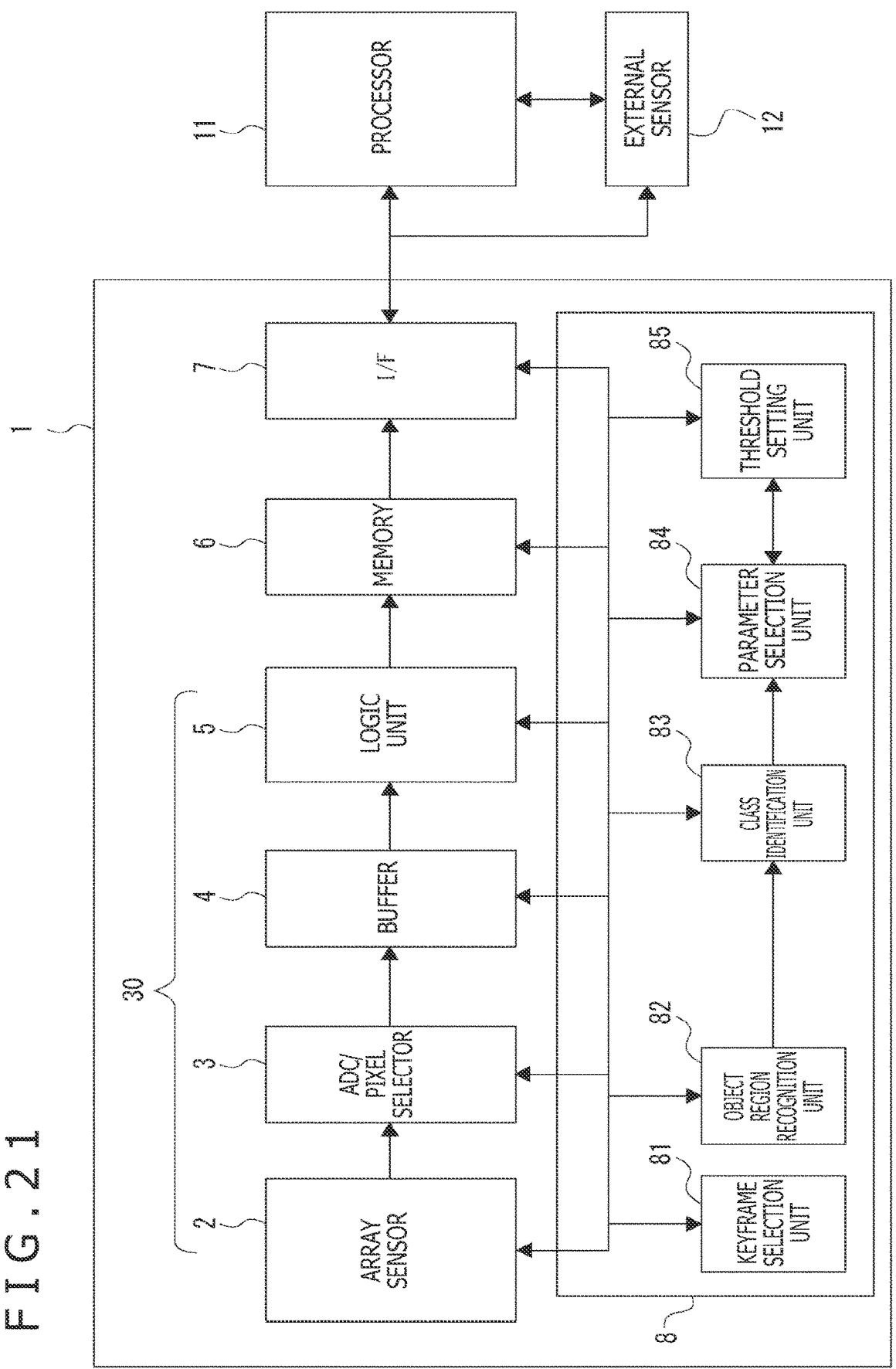
FIG. 21 is a block diagram of a sensor device applicable to the sixth to a ninth embodiments.

Initially, FIG. 21 depicts a configuration example of the sensor device 1. Note that constituent elements identical to the corresponding constituent elements in FIG. 1 are given identical reference numbers, and the same explanation is not repeated.

The configuration in FIG. 21 is different from the configuration in FIG. 1 in that a threshold setting unit 85 is provided as a calculation function incorporated in the calculation unit 8 constituted by an AI processor, for example.

The threshold setting unit 85 functions as a DNN engine, and performs a process for setting thresholds of all or some of parameters used for the image processing performed by the logic unit 5, and the image capturing processing associated with image capturing performed by the array sensor 2 (processing performed by the array sensor 2 and the ADC/pixel selector 3).

Further, the threshold setting unit 85 enables all or some of the logic unit 5, the array sensor 2, and the ADC/pixel selector 3 to perform processing using parameters changed on the basis of the thresholds.

Specifically, for example, the threshold setting unit 85 changes, on the basis of the thresholds, the parameters used for the image processing by the logic unit 5, and sets the changed parameters for the logic unit 5.

Alternatively, for example, the threshold setting unit 85 changes, on the basis of the thresholds, the parameters used for image capturing processing such as the exposure operation performed by the array sensor 2, the readout process performed by the ADC/pixel selector 3, and the AD conversion process, and sets the changed parameters for the array sensor 2 and the ADC/pixel selector 3.

Figure 22:
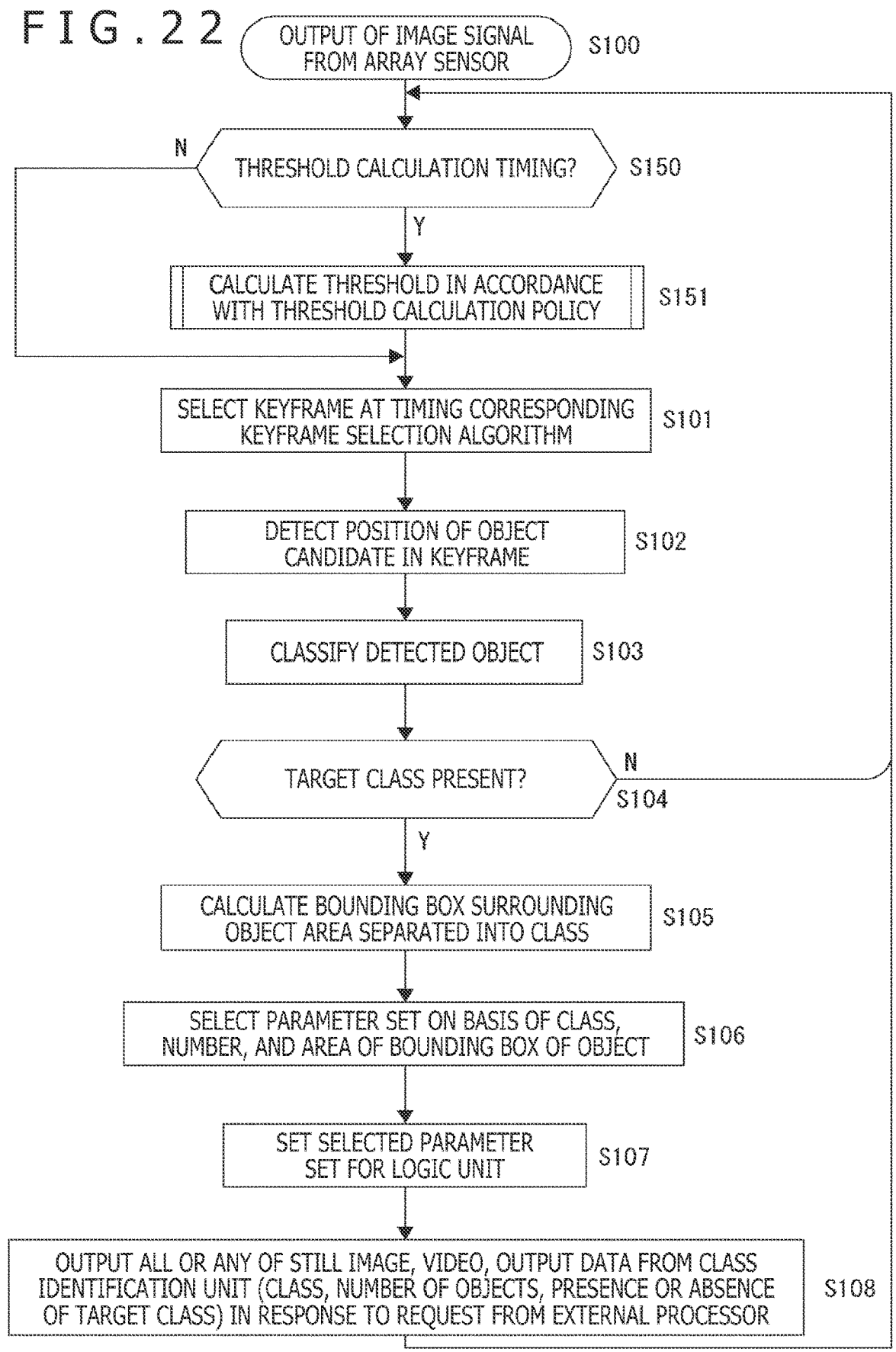
FIG. 22 is a flowchart of a process for parameter setting according to a threshold according to the sixth embodiment.

FIG. 22 presents a processing example performed by the calculation unit 8 of the sensor device 1 thus configured. FIG. 22 presents an example which adds the foregoing processing performed by the threshold setting unit 85 to the process of classified image adaptation of FIG. 5. Processing in FIG. 22 identical to the corresponding processing in FIG. 5 is given identical step numbers, and repetitive explanation is omitted.

In FIG. 22 herein, steps S150 and S151 as processing performed by the threshold setting unit 85 are added to the process of FIG. 5.

In step S150, the calculation unit 8 determines whether or not the current time is threshold calculation timing. If the current time is the threshold calculation timing, the flow proceeds to step S151. If the current time is not the threshold calculation timing, the flow proceeds to step S101.

Examples of the threshold calculation timing include followings.
a. Every predetermined time interval: for example, at intervals of one hour from image capturing start
b. Every predetermined set time: for example, at 0:00 am every day
c. Every predetermined number of times of appearance of target class: for example, every 1000 times of appearance of target class
d. Every predetermined period of image capturing of target class: for example, every elapse of five hours for image capturing of target class
e. Timing commanded from outside: for example, instruction from device/apparatus incorporating sensor device 1, such as processor 11

For example, these types of timing and the like are determined in step S150. When the current time is determined to be the threshold calculation timing, the calculation unit 8 in step S151 calculates thresholds in accordance with a threshold calculation policy. Specifically, thresholds are determined, and parameters corresponding to the threshold are set.

The threshold calculation policy (thresholds) is divided into several policies according to types or manners of understanding of parameters associated with image capturing processing and image processing and to be noted at the time of calculation of the thresholds, and differs for each application. Followings are examples of the threshold calculation policy.

Use Inflection Point of Down Curve of Confidence Rate

A data size decreases as resolution lowers. In this case, an advantage of calculation cost reduction is also achievable. On the contrary, however, the confidence rate decreases.

In FIG. 23A, a horizontal axis represents resolution, while a vertical axis represents a confidence rate.

As depicted in the figure, the confidence rate considerably lowers at low resolution equivalent to or lower than certain resolution (inflection point). Accordingly, an inflection point of a curve which represents a relation between the confidence rate and the resolution is obtained while changing the resolution, for example. Parameters lowering resolution are set considering the inflection point or a point near the inflection point as a threshold.

Use Maximum Value of Confidence Rate

Depending on classes of object detection classification, a confidence rate does not necessarily increase as the number of colors becomes larger. There exists an optimum number of colors achieving the highest confidence rate for each target class.

In FIG. 23B, a horizontal axis represents the number of color gradations, while a vertical axis represents a confidence rate.

In a case where a peak of the confidence rate is observed as depicted in the figure, a threshold is calculated on the basis of this maximum value. For example, the maximum value (a peak of a curve of a relation between the confidence rate and the number of color gradations) is considered as a threshold, or a predetermined range near the maximum value (e.g., a value obtained by lowering the confidence rate by a predetermined percentage) is considered as a threshold. Subsequently, a parameter of the number of color gradations is set according to the threshold.

Use Battery Residual Quantity

Parameter settings enabling image capturing for a period of N time are obtained on the basis of a battery residual quantity, and parameters producing a confidence rate which becomes the highest (or becomes equal to or higher than a predetermined rate) are selected from the obtained settings and set.

For example, it is adoptable to lower the threshold such as a confidence rate according to the battery residual quantity so as to obtain a longest possible image capturing time, and set parameters according to the confidence rate.

Use Time Resolution Maintaining Object Tracking

Object tracking herein refers to tracking and recognizing a particular detection object (object) in successive frames of image signals in a forward direction of the frames.

Generally, a calculation cost required for object tracking rises as time resolution of image signals lowers.

Time resolution and other parameters are determined with priority given to calculation cost reduction of this object tracking on the basis of thresholds indicating parameters maintaining the object tracking.

Figure 24:
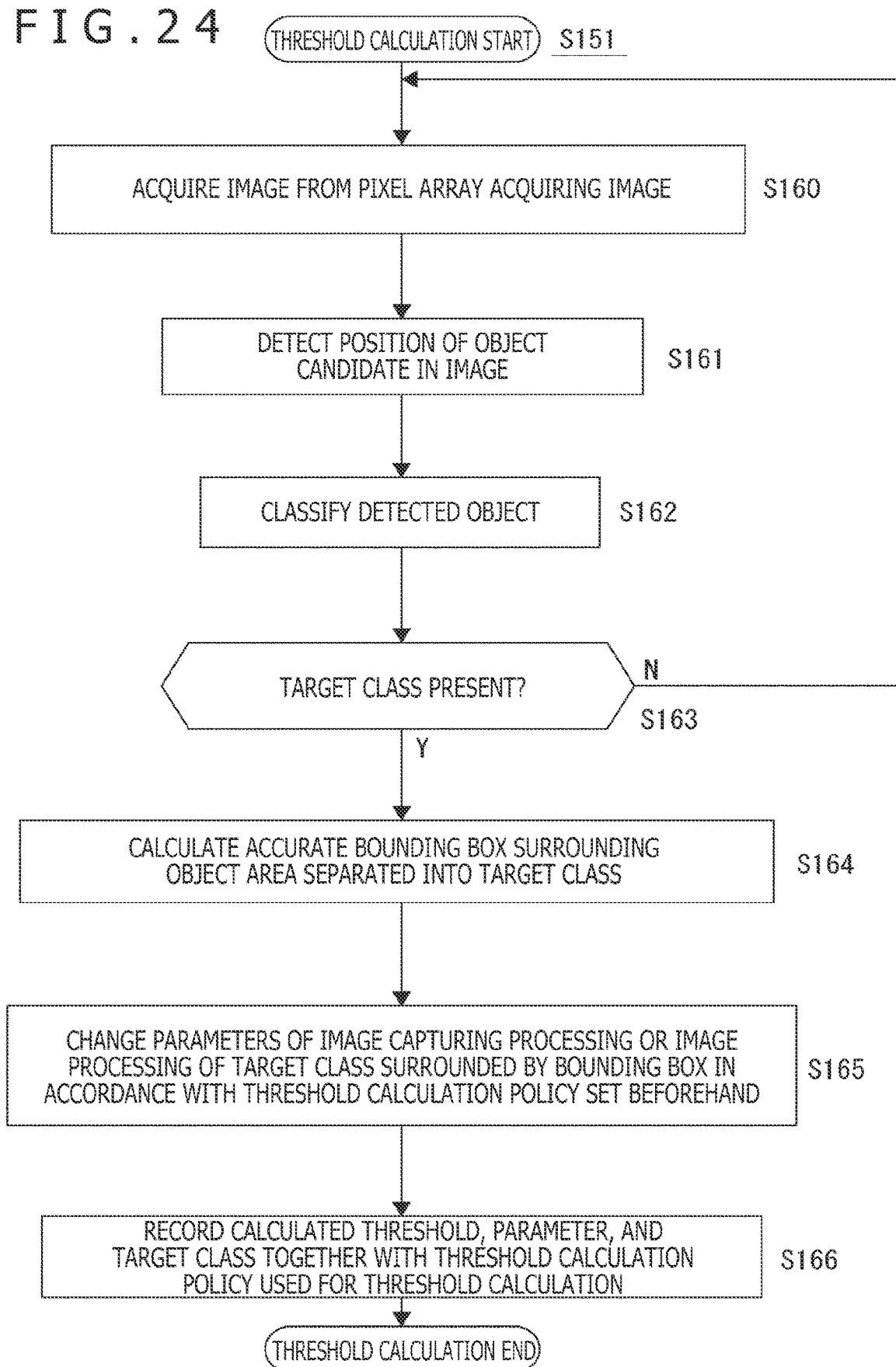
FIG. 24 is a flowchart of threshold calculation according to the sixth embodiment.

For example, any one of the policies of the above examples is adopted, and the thresholds are calculated using a predetermined algorithm. FIG. 24 depicts an example of a threshold calculation process performed by the calculation unit 8.

This process performed by the calculation unit 8 in FIG. 24 is a process executed by respective functions of the object region recognition unit 82, the class identification unit 83, and the threshold setting unit 85 depicted in FIG. 21.

In step S160, the calculation unit 8 acquires image signals in units of one frame from the array sensor 2.

In step S161, the calculation unit 8 (object region recognition unit 82) detects positions of candidate objects in the acquired frame.

Specifically, the calculation unit 8 searches for candidates of an object to be detected in the image of the frame to obtain one or a plurality of candidate positions (position coordinates in the image).

In step S162, the calculation unit 8 (class identification unit 83) classifies the detected objects. Specifically, the calculation unit 8 identifies a class for each of the candidates of the object for classification.

In step S163, the calculation unit 8 checks whether or not a target class is present in the classes obtained as a result of the class identification.

The target class is a class set by the processor 11, for example, as described above. Specifically, a class designated as a target of object detection by the processor 11 is assumed as the target class.

If no target class is present, the calculation unit 8 returns the flow to step S160 to acquire image data of a next frame.

In a case where a target class is present, the calculation unit 8 advances the process from step S163 to S164.

In a case where the flow proceeds to step S164, the calculation unit 8 (object region recognition unit 82) calculates correct position coordinates (bounding box 20) surrounding an object area separated into the class. The description concerning the bounding box 20 with reference to FIGS. 6F and 6G, and others is applicable to the bounding box 20 herein.

In step S165, the calculation unit 8 (threshold setting unit 85) calculates thresholds and parameters while changing parameters used for image capturing processing or image processing for the target class surrounded by the bounding box 20 in accordance with a threshold calculation policy set beforehand.

In step S166, the calculation unit 8 (threshold setting unit 85) records information indicating the thresholds, the parameters, the target class, and the threshold calculation policy calculated in step S165 in association with each other.

For example, the calculation unit 8 records the information in a recording area within the calculation unit 8, records the information in a predetermined area of the memory 6, or transfers the information to the processor 11 and records the information in the processor 11.

In this manner, the thresholds and the parameters corresponding to the target class are set.

In step S151 in FIG. 22, the thresholds and the parameters are set in the manner described above, for example. Accordingly, a parameter set associated with a certain target class changes for every threshold calculation timing.

When the target class is a human, for example, all or a part of a parameter set corresponding to a human change according to the thresholds.

Steps S101 to S107 in FIG. 22 are similar to the corresponding steps in FIG. 5. Accordingly, in this case, a parameter set corresponding to the target class is selected. In subsequent step 3107, the parameter set is set for the logic unit 5.

The parameter set having been set for the logic unit 5 at this time is a parameter set applicable to the target class, and is a parameter set changed on the basis of the threshold calculated by the foregoing processing in step S151.

As apparent from above, the calculation unit 8 (threshold setting unit 85) gives an instruction of necessary processing, such as an instruction for transferring the parameters to the logic unit 5 and an instruction for changing the parameters, so as to change the parameters used by the logic unit 5.

In this manner, the parameters associated with image processing or image capturing processing are changed to values reducing an image data volume to a smallest possible volume on the basis of the thresholds.

Accordingly, image signals output from the interface unit 7 have image quality or the like for maintaining necessary accuracy of object detection required by the processor 11, and also have a small data volume.

While the processing example of FIG. 22 is an example which adds the idea of a parameter change based on threshold setting to the process of classified image adaptation of FIG. 5, the processing example of FIG. 22 is not required to be combined with the process of classified image adaptation.

For example, a processing example including only steps S150, S151, S107, and S108 (a processing example in FIG. 22 from which steps S101 to S107 are eliminated) is also adoptable.

Specifically, the parameters used for image processing by the logic unit 5, or parameters used for image capturing processing by the array sensor 2 or the ADC/pixel selector 3 are set on the basis of threshold calculation in step S151.

Further, at the time of step S107, the parameters set according to the thresholds are set for the logic unit 5, the array sensor 2, or the ADC/pixel selector 3.

In other words, the calculation unit 8 (threshold setting unit 85) transfers the parameters set according to the thresholds to a part or all of the logic unit 5, the array sensor 2, and the ADC/pixel selector 3, or gives a parameter change instruction to a part or all of these units.

In this case, such a process which sequentially changes parameters set as default, for example, for the logic unit 5, the array sensor 2, and the ADC/pixel selector 3 on the basis of threshold calculation is achieved, for example, rather than on the basis of an idea of using parameters set corresponding to each class.

Figure 25:
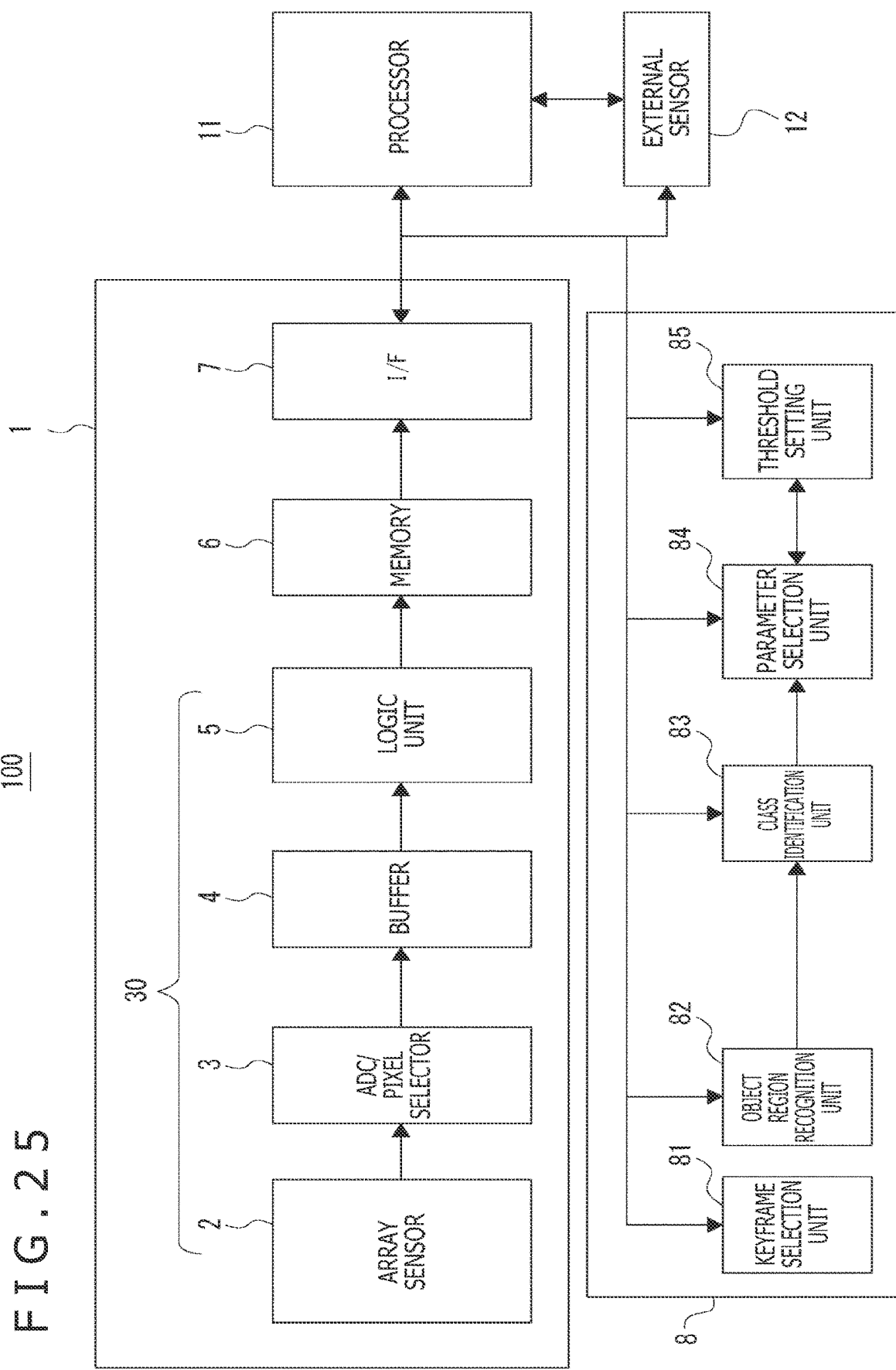
FIG. 25 is a block diagram of another configuration applicable to the sixth to the ninth embodiments.
Figure 26:
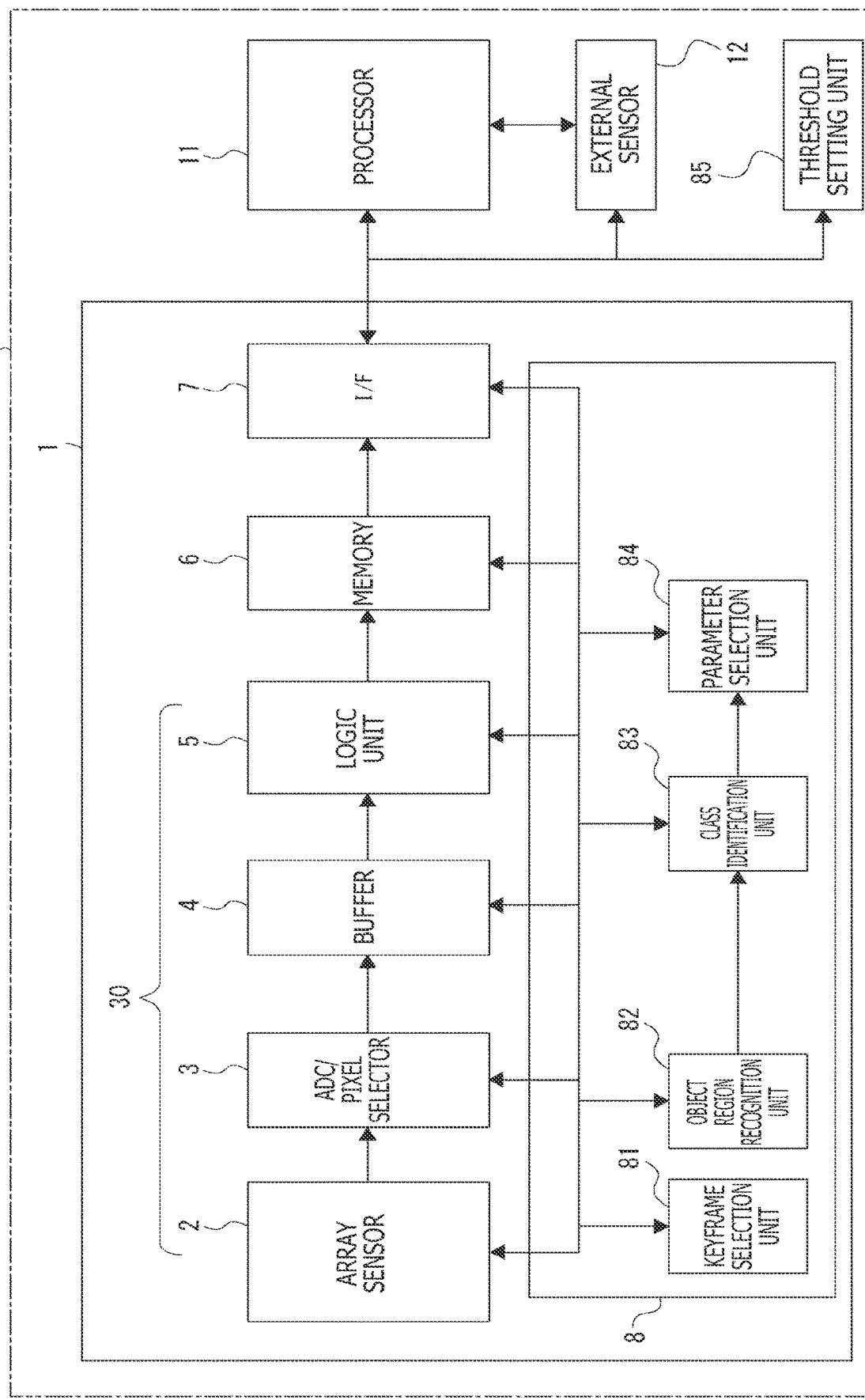
FIG. 26 is a block diagram of a further configuration applicable to the sixth to the ninth embodiments.

The configuration including the threshold setting unit 85 is not limited to the configuration in FIG. 21, but may be configuration examples depicted in FIGS. 25 and 26, for example.

FIG. 25 depicts a configuration example of a terminal apparatus 100 where the calculation unit 8 is provided separately from the sensor device 1. Note that various types of devices such as an information processing terminal and an imaging device terminal are applicable to the terminal apparatus 100.

The calculation unit 8 is provided in the terminal apparatus 100 as a chip separated from the sensor device 1, and is communicable with the sensor device 1 via the interface unit 7.

Further, the calculation unit 8 includes the threshold setting unit 85 constituting a DNN engine for threshold setting.

In this case, the calculation unit 8 of FIG. 25 is also capable of performing processing similar to that of the above case in FIG. 22.

Note that the configuration example depicted in FIG. 25 is also applicable to the configuration example of FIG. 1 corresponding to the first to fifth embodiments. The calculation unit 8 may be a unit separated from the sensor device 1.

The configuration example of FIG. 26 is an example in a case where the threshold calculation unit 85 constituting the DNN engine for threshold setting is constituted by a processor or the like provided independently of the sensor device 1 and the calculation unit 8.

For example, the terminal apparatus 100 has a configuration including the sensor device 1 (containing the calculation unit 8), the processor 11, the external sensor 12, and the threshold setting unit 85.

In this case, the threshold setting unit 85 is similarly communicable with the sensor device 1 via the interface unit 7, and is capable of performing a process similar to the process of FIG. 22 in cooperation with the calculation unit 8.

Further, while not depicted in the figures, the threshold setting unit 85 may be also constituted by a separate processor or the like in the configuration where the sensor device 1 and the calculation unit 8 are separated from each other as in FIG. 25.

Note that adoptable is a configuration where the keyframe selection unit 81, the object region recognition unit 82, the class identification unit 83, the parameter selection unit 84, and the like are disposed outside the sensor device 1 or the calculation unit 8 similarly to the threshold setting unit 85. This point is applicable to a modification of the configuration depicted in FIG. 1.

8. Seventh Embodiment: Active Area Clipping

Described in a seventh embodiment will be an example which achieves further efficient processing using the ROI of the above second embodiment.

Note that the processing of the seventh embodiment described hereinafter is applicable to any one of the configurations depicted in FIGS. 1, 21, 25, and 26.

Figure 8:
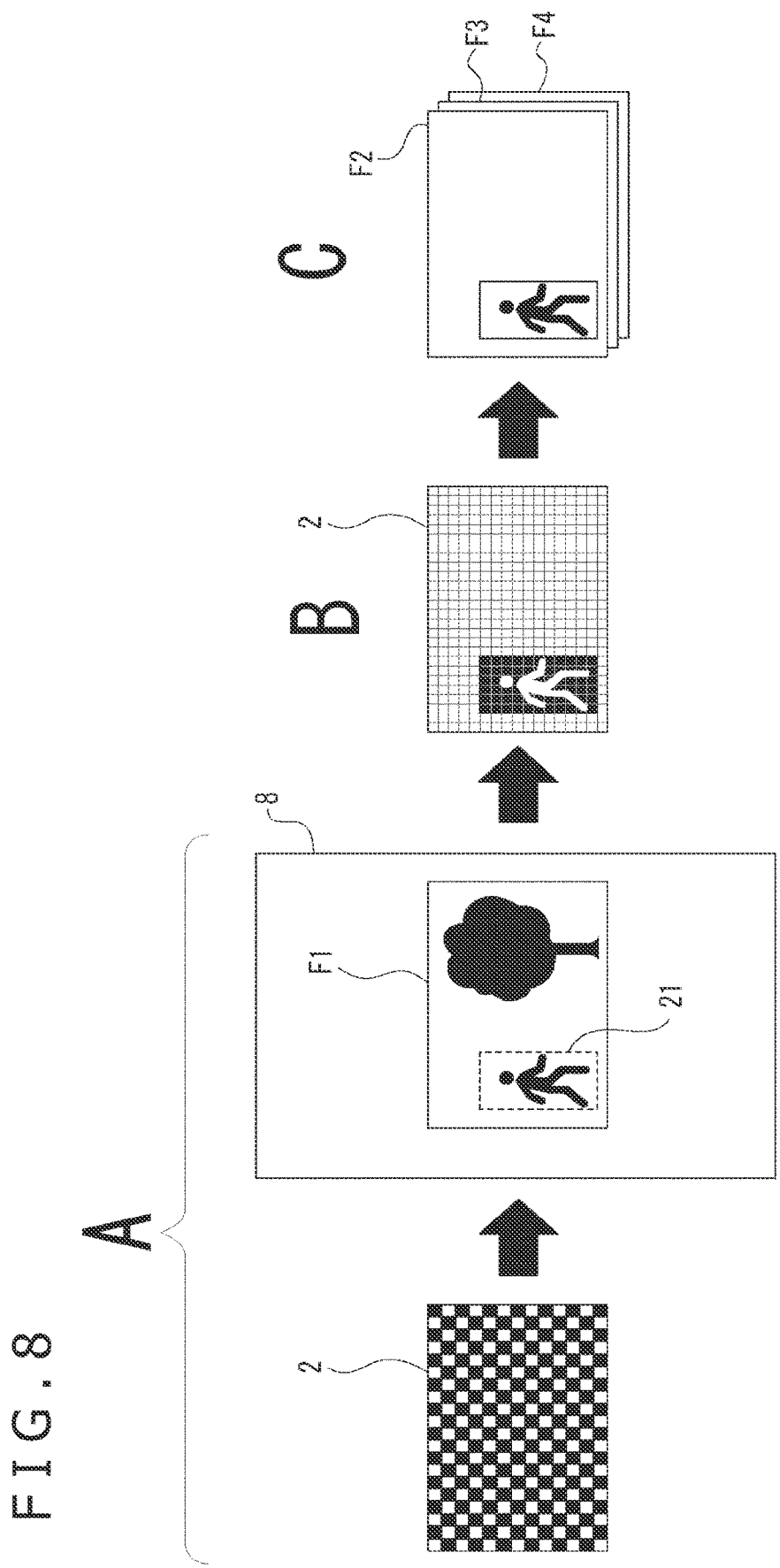
FIG. 8 is an explanatory diagram of an outline of area clipping analysis according to the second embodiment.

According to the example described in the above second embodiment, the ROI 21 is set for an object corresponding to a detection target as depicted in FIGS. 7 and 8, and only pixels within the region designated as the ROI 21 are read from the array sensor 2.

Attention is paid herein to a point that a region designated as the ROI 21 concentrates on a particular region within an image in some cases.

Figure 27:
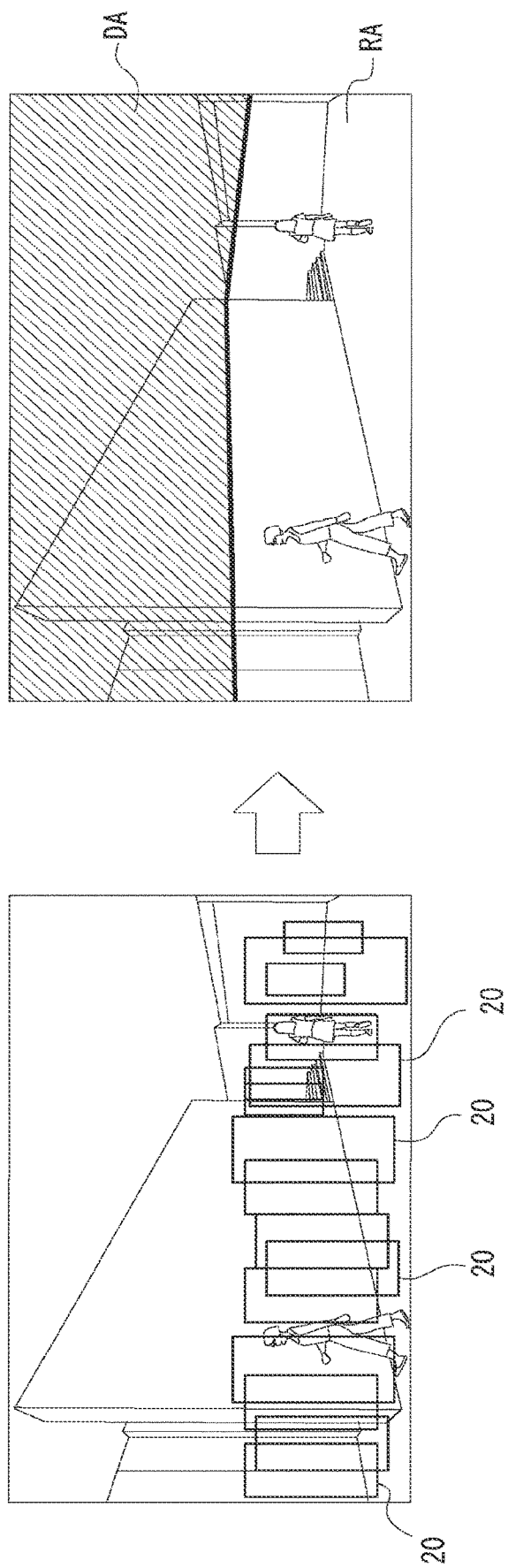
FIG. 27 is an explanatory diagram of active area clipping according to the seventh embodiment.

FIG. 27A depicts an example of an image captured by a monitoring camera provided inside a building, for example. Suppose that the ROI 21 is set for a human as a detection target. The figure indicates positions of the bounding boxes 20 in the image. The ROIs 21 are designated on the basis of the bounding boxes 20 previously set within a predetermined period.

In this case, for example, the set positions of the bounding boxes 20 (and ROIs 20) within the previous predetermined period are located in a region near a floor in the image.

In other words, a detection process for detecting a human in an image region around a ceiling is unnecessary because a human does not appear in a region near the ceiling in the image.

Accordingly, for example, as depicted in FIG. 27B, a region where a "human" corresponding to the detection target appears, i.e., a region where the bounding boxes 20 have been previously set in the predetermined period is designated as an active area RA, while a region where a "human" corresponding to the detection target does not appear, i.e., the bounding box 20 has not been previously set in the predetermined period, is designated as a non-active area DA.

Figure 28:
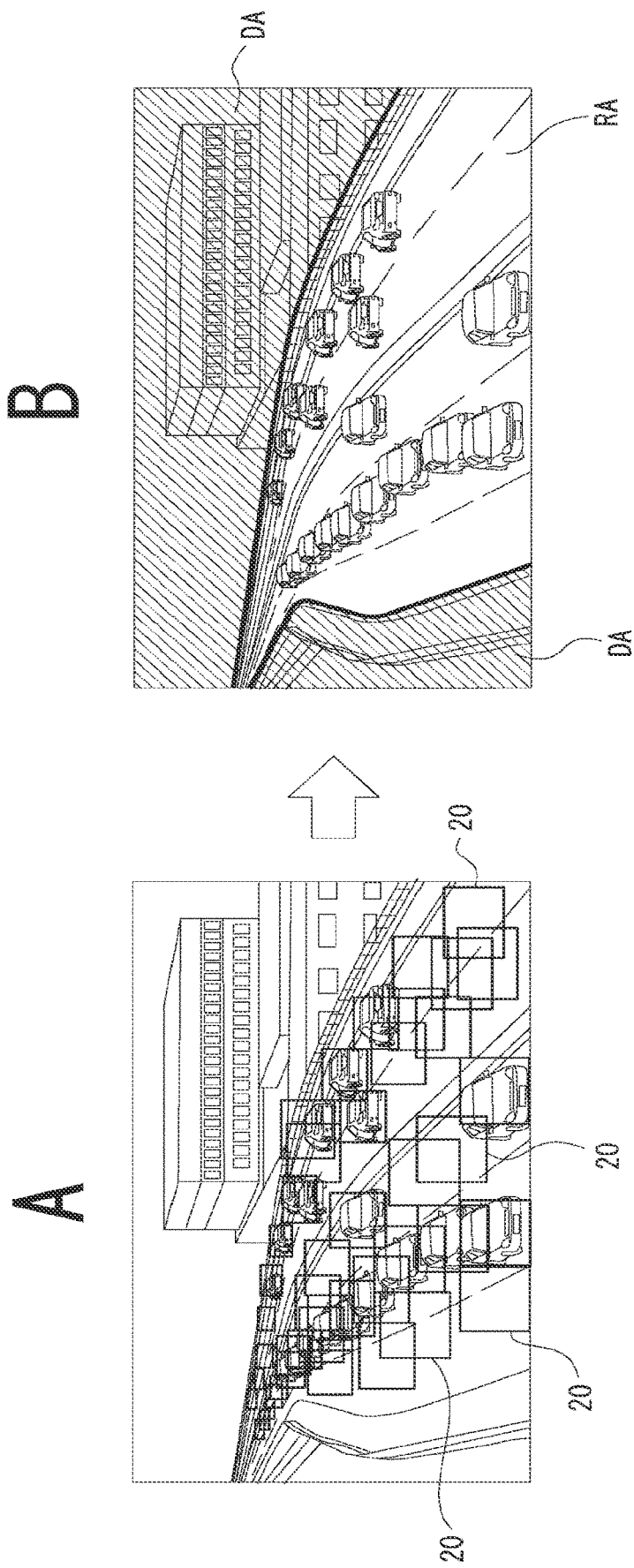
FIG. 28 is another explanatory diagram of the active area clipping according to the seventh embodiment.

FIG. 28A depicts an example of an image captured by a monitoring camera which monitors cars as detection targets on a highway, for example, and indicates positions of the bounding boxes 20 previously set in a predetermined period.

In this case, cars appear near a road surface. Accordingly, the active area RA and the non-active area DA can be set similarly to those in FIG. 27B.

As in the examples depicted in FIG. 27B and FIG. 28B, the active area RA is set, and objects are detected from detection signals of the active area RA in pixels captured by the array sensor 2. Thereafter, an instruction designating the ROIs 21 generated on the basis of detection of the objects as regions associated with acquisition of the detection signals or signal processing of the detection signals is given to the signal processing unit 30 similarly to the second embodiment.

Specifically, the objects are detected from an object detection keyframe by partial photoelectric conversion executed not by full-screen scanning, but on the basis of history information associated with object detection.

Note that the object detection keyframe herein refers to a frame where information is acquired from all effective pixel regions of the array sensor 2 for object detection in the second embodiment. The process in the seventh embodiment is a process for acquiring information from only a pixel region of the active area RA in the keyframe.

Figure 29:
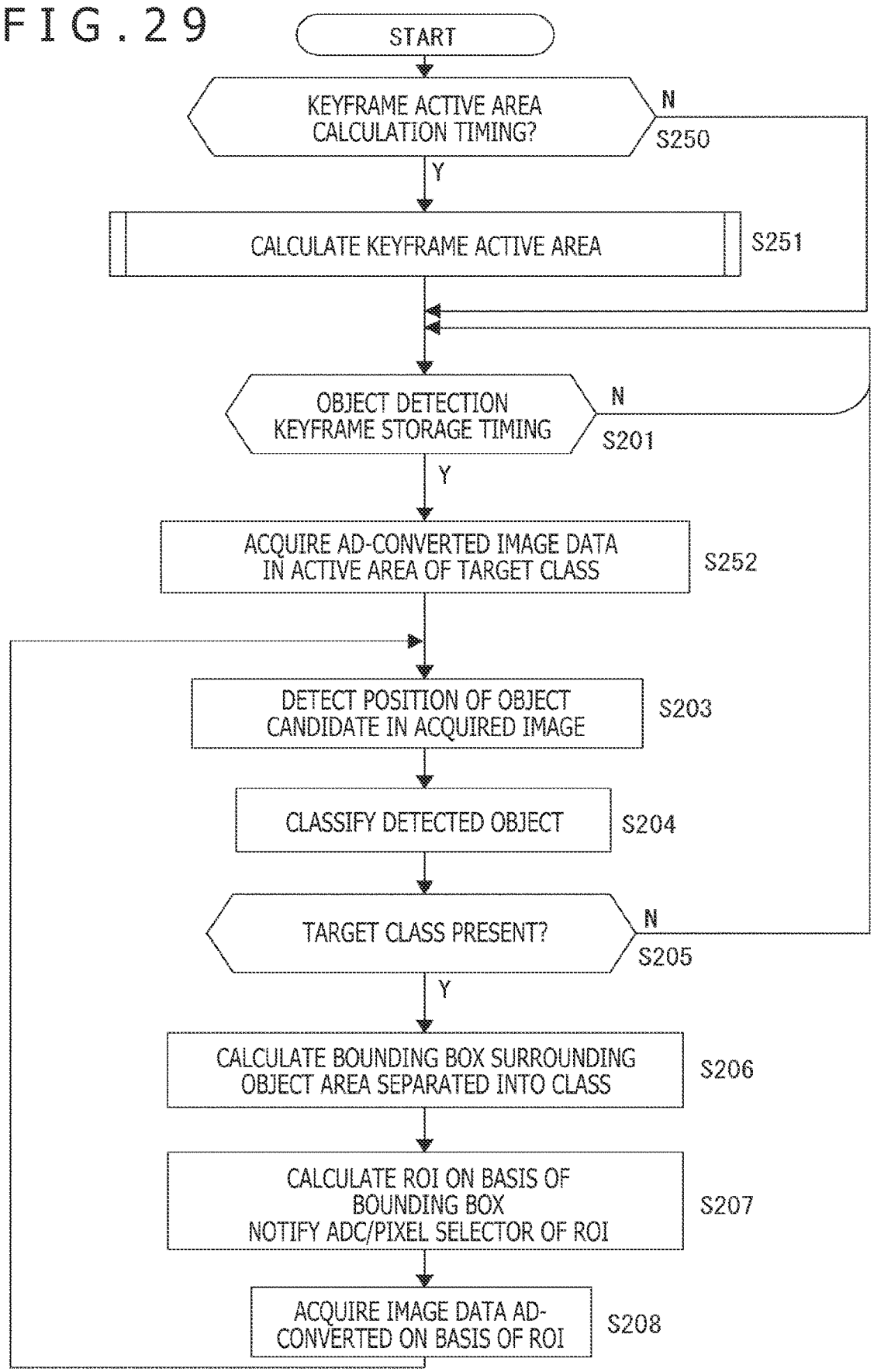
FIG. 29 is a flowchart of the active area clipping according to the seventh embodiment.

FIG. 29 depicts a processing example performed by the calculation unit 8. Note that processes identical to the corresponding processes in FIG. 9 are given identical step numbers.

In step S250, the calculation unit 8 determines whether or not the current time is active area calculation timing for a keyframe. If the current time is the calculation timing, the flow proceeds to step S161. If the current time is not the calculation timing, the flow proceeds to step S201.

Followings are adoptable as calculation timing of the active area RA for the keyframe, for example.

a. Every predetermined time interval: for example, every one hour from image capturing start b. Every predetermined set time: for example, at 0:00 am every day c. Every predetermined number of times of appearance of target class: for example, every 1000 times of appearance of target class d. Every predetermined period of image capturing of target class: for example, every elapse of five hours for image capturing of target class e. Timing commanded from outside: for example, instruction from device/apparatus incorporating sensor device 1, such as processor 11

In a case where the flow proceeds to step S161 on the basis of determination that the current time is calculation timing, the calculation unit 8 calculates the active area RA for the keyframe.

Figure 30:
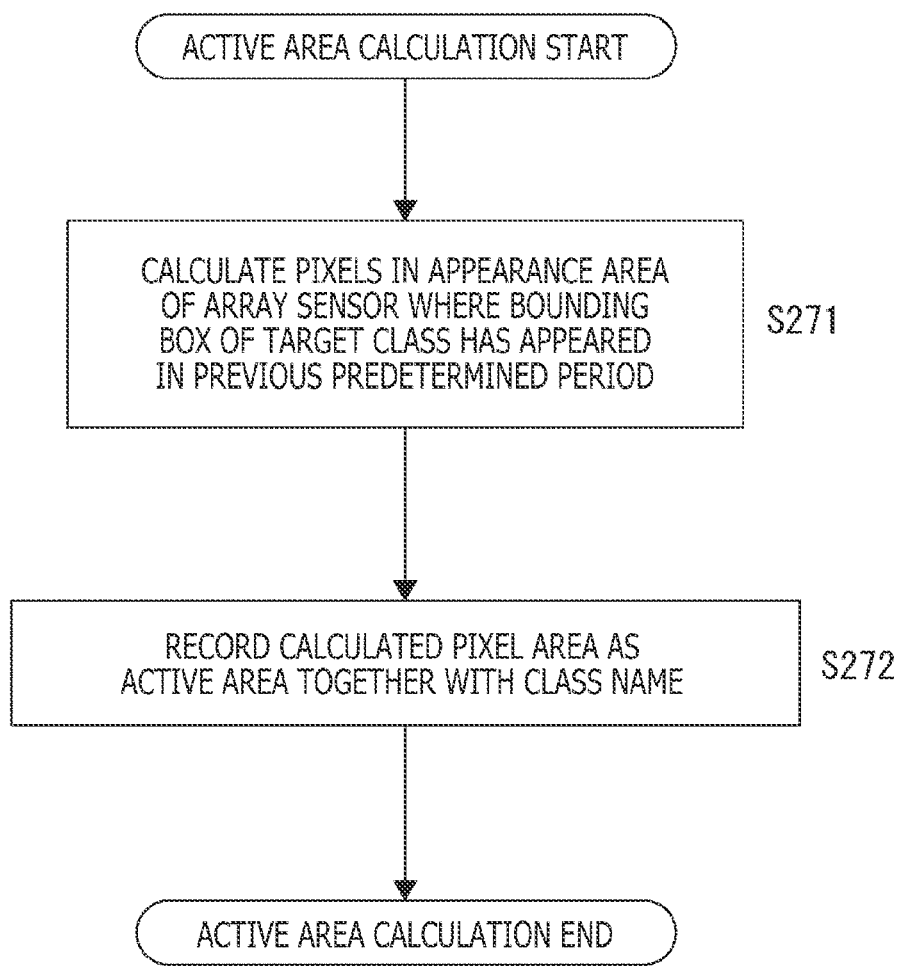
FIG. 30 is a flowchart of keyframe active area calculation according to the seventh embodiment.

FIG. 30 depicts a calculation process example of calculating the active area RA of the keyframe.

In step S271, the calculation unit 8 (object region recognition unit 82) calculates pixels in appearance areas of the array sensor 2 where the bounding boxes 20 of a target class appear in a previous predetermined period.

In this case, all the pixels in each of the bounding boxes 20 having appeared correspond to pixels in the corresponding appearance area. It is preferable to set a range inclusively surrounding all the bounding boxes 20 having appeared, and designate all pixels in this range as pixels of the appearance areas.

Alternatively, the range inclusively surrounding all the bounding boxes 20 having appeared may be expanded in a peripheral direction, and all pixels in the expanded range may be designated as pixels of the appearance areas.

A pixel range containing all of the appearance areas of the bounding boxes 20 thus calculated is designated as the active area RA.

In step S272, the calculation unit 8 (object region recognition unit 82) records the calculated pixel area as the active area RA of the keyframe together with a class name. For example, the calculation unit 8 records the pixel area in a recording area within the calculation unit 8, records the pixel area in a predetermined area in the memory 6, or transfers the pixel area to the processor 11 and records the pixel area in the processor 11.

In this manner, the active area RA corresponding to the target class is set.

In step S201 in FIG. 29, the calculation unit 8 (keyframe selection unit 81) in step S201 determines whether or not the current time is object detection keyframe recording timing.

Similarly to the second embodiment (FIG. 9), the object detection keyframe recording timing herein refers to timing for acquiring information from the array sensor 2 for object detection.

The object detection keyframe recording timing may be determined according to a command issued from the outside of the sensor device 1, such as the processor 11. For example, it is assumed that the object detection keyframe recording timing is determined at intervals of 60 seconds according to an instruction of 60 seconds.

At the time of the object detection keyframe recording timing, the calculation unit 8 advances the flow to step S252 to acquire AD-converted image data of pixels in the active area RA of the array sensor 2. For example, the calculation unit 8 causes the ADC/pixel selector 3 to output image signals of the active area RA in one frame received from the array sensor 2.

The calculation unit 8 (object region recognition unit 82) in step S203 detects positions of candidate objects in the acquired image. Processing from this step S203 to step S208 is similar to the corresponding processing in FIG. 9.

According to the process in FIG. 29 described above, object detection in step S203 can be performed not in the entire effective pixel region of one frame, but only in the active area RA. In addition, the active area RA is an area where the object of the target class may be detected. In other words, the region other than the active area PA is an area where substantially no object of the target class is detectable.

Accordingly, processing efficiency increase, power consumption reduction, and the like are achievable by reduction of the number of pixels read from the object detection keyframe, and reduction of the detection range.

While the active area RA is set on the basis of a history of the bounding box 20 in the above example, the active area RA may be set on the basis of a history of the ROI 21. In this case, it is also adoptable to add a history of pixel positions of an ROI movable for each frame (ROI 21 (NEW) explained with reference to FIG. 10).

9. Eighth Embodiment: Area Clipping Using Threshold Setting and AROI

Described in the eighth embodiment will be a processing example which further improves efficiency of area clipping using the AROI 22 in the third embodiment. Note that the processing of the eighth embodiment described herein is applicable to any one of the configurations depicted in FIGS. 21, 25, and 26.

The eighth embodiment sets parameters of an object (class) or a portion corresponding to a target to be detected on the basis of set thresholds in a case of use of the AROI 22 using a template. Specifically, the idea of thresholds in the sixth embodiment is adopted. Thresholds are determined on the basis of an object detection accuracy rate calculated by the DNN to set parameters.

For example, a distribution of resolution of a region of interest within the AROI 22 is determined according to a threshold set on the basis of a confidence rate.

Figure 31:
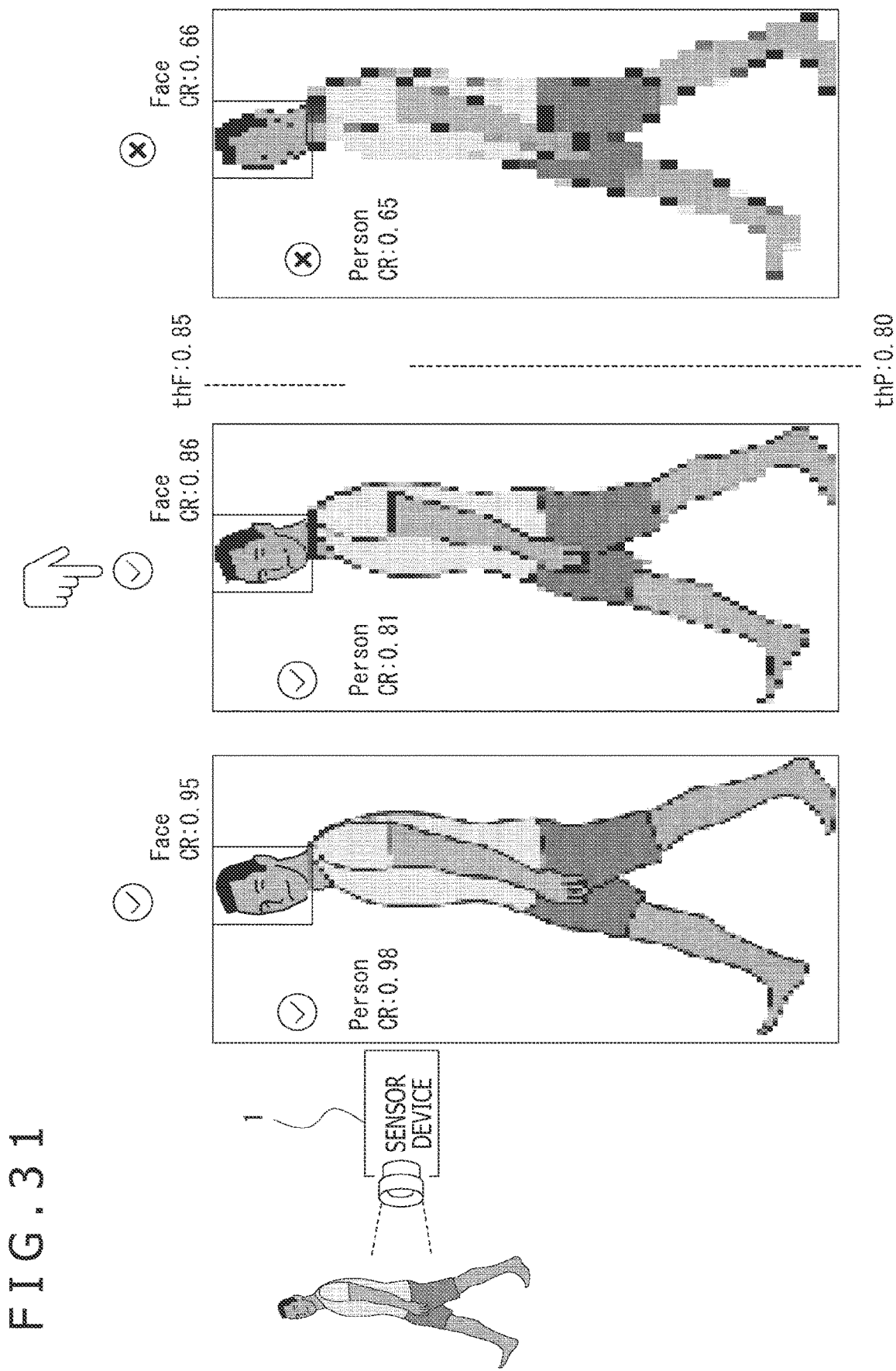
FIG. 31 is an explanatory diagram of threshold setting for an advanced ROI (Advanced ROI: AROI) according to the eighth embodiment.

FIG. 31 schematically depicts an example. Considered herein will be a case where a human is designated as a target class, and a case where a face is designated as a target class.

It is assumed that a relation (first resolution)>(second resolution)>(third resolution) holds.

It is assumed that a confidence rate CR for face detection is 0.95 at the first resolution, 0.86 at the second resolution, and 0.66 at the third resolution.

It is assumed that a confidence rate CR for human (body) detection is 0.98 at the first resolution, 0.81 at the second resolution, and 0.65 at the third resolution.

In a case where a threshold thF for face detection is 0.85, the second resolution is selected as a parameter so adapted as to reduce an image data volume to a smallest possible volume, and image processing is performed for pixels within a template.

Further, in a case where a threshold thP for human detection is 0.80, the second resolution is selected as a parameter so adapted as to reduce an image data volume to a smallest possible volume, and performs image processing for pixels within a template.

In these cases, the second resolution is suited for both. However, depending on cases, it is assumed that the first resolution is set under the threshold thF set to 0.94 in the case of face detection, or that the third resolution is set under the threshold thP set to 0.60 for human detection.

In other words, in the case of use of the AROI 22, the threshold is set for each target class to set parameters for image processing, reading processing, and the like for pixels within the AROI 22.

Figure 32:
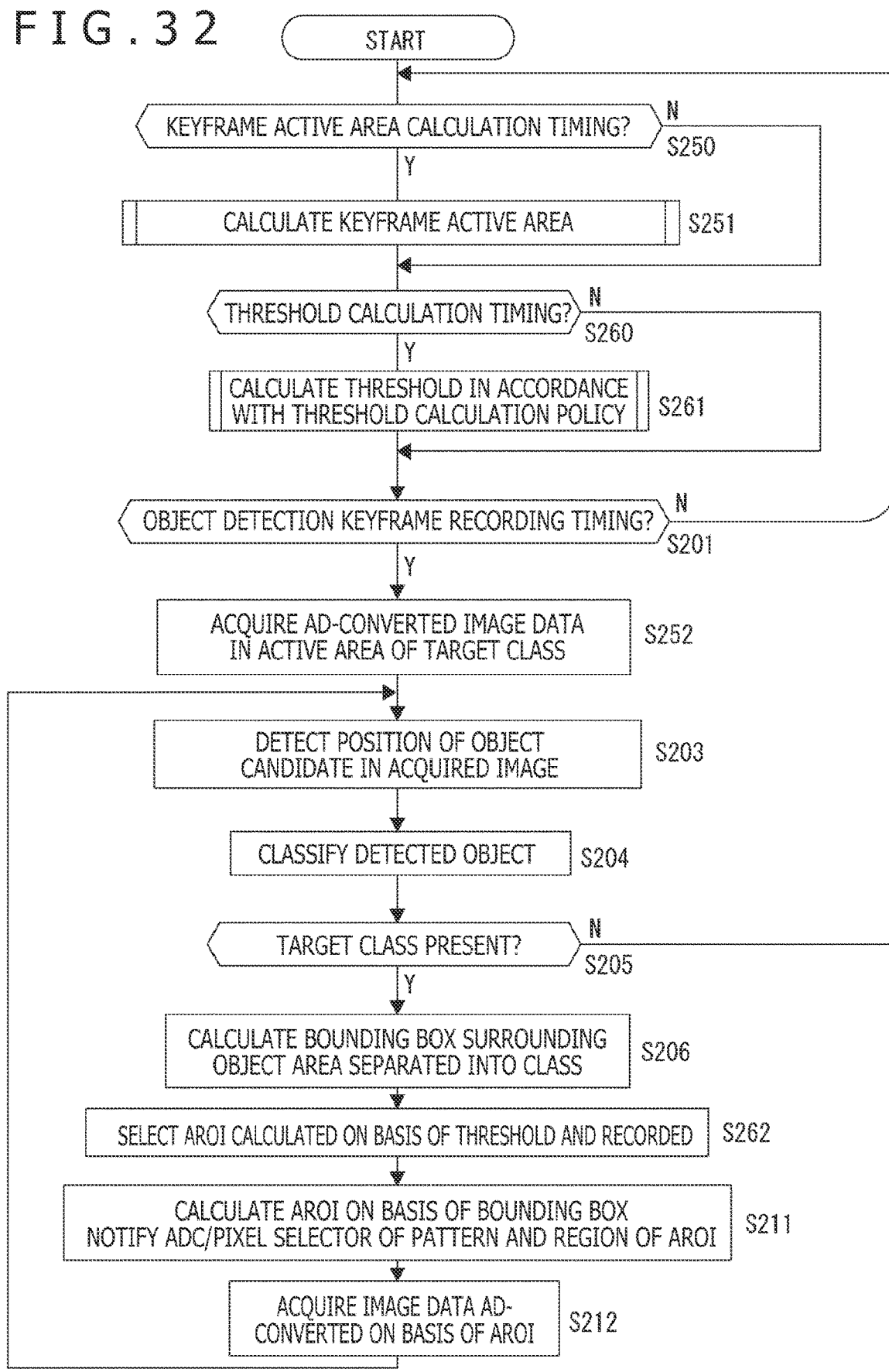
FIG. 32 is a flowchart of area clipping analysis using the advanced ROI according to the eighth embodiment.

FIG. 32 depicts a processing example performed by the calculation unit 8.

Steps S250 and S251 in FIG. 32 are similar to steps S250 and S251 in FIG. 29. The calculation unit 8 calculates the active area RA (processing in FIG. 30) at detection timing of the active area RA of the keyframe.

Steps S260 and S261 are similar to steps S150 and S151 in FIG. 22. Specifically, in step S260, the calculation unit 8 (threshold setting unit 85) determines whether or not the current time is threshold calculation timing. If the current time is the threshold calculation timing, the calculation unit 8 (threshold setting unit 85) calculates thresholds (process in FIG. 24) in step S261.

In this case, the calculation unit 8 (object region recognition unit 82) performs processing in steps S160 to S164 as the threshold calculation process in FIG. 24 similarly to above. Thereafter, the calculation unit 8 (threshold setting unit 85) in step S165 calculates thresholds on the basis of a confidence rate obtained from data of a pixel region corresponding to an AROI pattern as a template while changing resolution of a target class surrounded by the bounding box 20, and set parameters on the basis of the calculated thresholds.

In this case, parameters for the AROI pattern as the template corresponding to the class are set according to the thresholds. For example, resolution of a region of the AROI pattern is set.

In step S166, the calculation unit 8 (threshold setting unit 85) records information indicating the thresholds, the target class, the AROI pattern and necessary parameters, and a threshold policy in association with each other. For example, the calculation unit 8 records the information in a recording area within the calculation unit 8, records the information in a predetermined area of the memory 6, or transfers the information to the processor 11 and records the information in the processor 11.

In step S201 in FIG. 32, the calculation unit 8 determines whether or not the current time is object detection keyframe recording time. When it is determined that the current time is the object detection keyframe recording timing, the calculation unit 8 advances the flow to step S252 to acquire AD-converted image data of pixels in the active area RA of the array sensor 2. For example, the calculation unit 8 causes the ADC/pixel selector 3 to output image signals of the active area RA in one frame received from the array sensor 2.

The calculation unit 8 (object region recognition unit 82) in step S203 detects positions of candidate objects in the acquired image. Steps S203 to S206 herein are similar to the corresponding steps in FIG. 9.

After the bounding boxes 20 are calculated in step S206, the calculation unit 8 (parameter selection unit 84) in step S262 selects the AROI pattern calculated on the basis of the thresholds and recorded.

In step S211, the calculation unit 8 (object region recognition unit 82) calculates the actual AROI 22 on the basis of the bounding box 20. Specifically, an actual pixel region corresponding to the selected AROI pattern is obtained. For example, a template size-adjusted according to the size of the bounding box 20 is designated as the AROI 22.

Thereafter, the calculation unit 8 (object region recognition unit 82) notifies the ADC/pixel selector 3 of the AROI 22 (a pattern and a region of the AROI) thus calculated.

In response to this notification, the ADC/pixel selector 3 performs AD conversion of only pixels corresponding to the AROI 22 in the array sensor 2, and outputs the converted pixels.

In step S212, the calculation unit 8 acquires image data of a next frame containing information associated with only the pixels within the AROI 22. Thereafter, the calculation unit 8 performs processing in steps S203 and S204 for the acquired frame.

As described above, parameters corresponding to the confidence rate, for example, are also set for the AROI 22 to set parameters such as resolution. In this manner, efficiency of image capturing processing and image processing can improve while maintaining object detection accuracy.

10. Ninth Embodiment: Active Sampling by Threshold Setting

Described in a ninth embodiment will be an example which adds a method for determining time resolution on the basis of an object detection accuracy rate calculated by the DNN to the active sampling method explained in the fifth embodiment.

Specifically, performed will be a process of dynamically changing a frame rate on the basis of an average movement amount of a target class per unit time.

Note that the processing of the ninth embodiment described herein is applicable to any one of the configurations depicted in FIGS. 21, 25, and 26.

In the fifth embodiment described above, the normal mode and the idling mode are prepared, and the idling mode is selected to set a low frame rate during a period in which presence of a target class is not detected in a captured image. In addition, when presence of the target class is confirmed, the normal mode is selected to raise the frame rate and increase an information volume.

The ninth embodiment sets the frame rate in the normal mode according to the target class in addition to the foregoing processing.

FIG. 32A depicts an example of an image in a case where the sensor device 1 is incorporated in a monitoring camera which captures images of a highway. This figure contains cars designated as target classes, and the bounding boxes 20. A broken-line arrow indicates a moving direction of a certain car.

FIG. 32B presents a movement amount of an image-captured car as a change of a position (pixel position) of the bounding box 20 in the images of successive frames. This movement amount is considered for each of many cars. It is assumed that an average movement amount is 1152 pixels/second.

In this case, it is assumed that a calculated sampling rate for maintaining object tracking (tracking of the target object in the successive frame images) is 46 fps.

Figure 33:
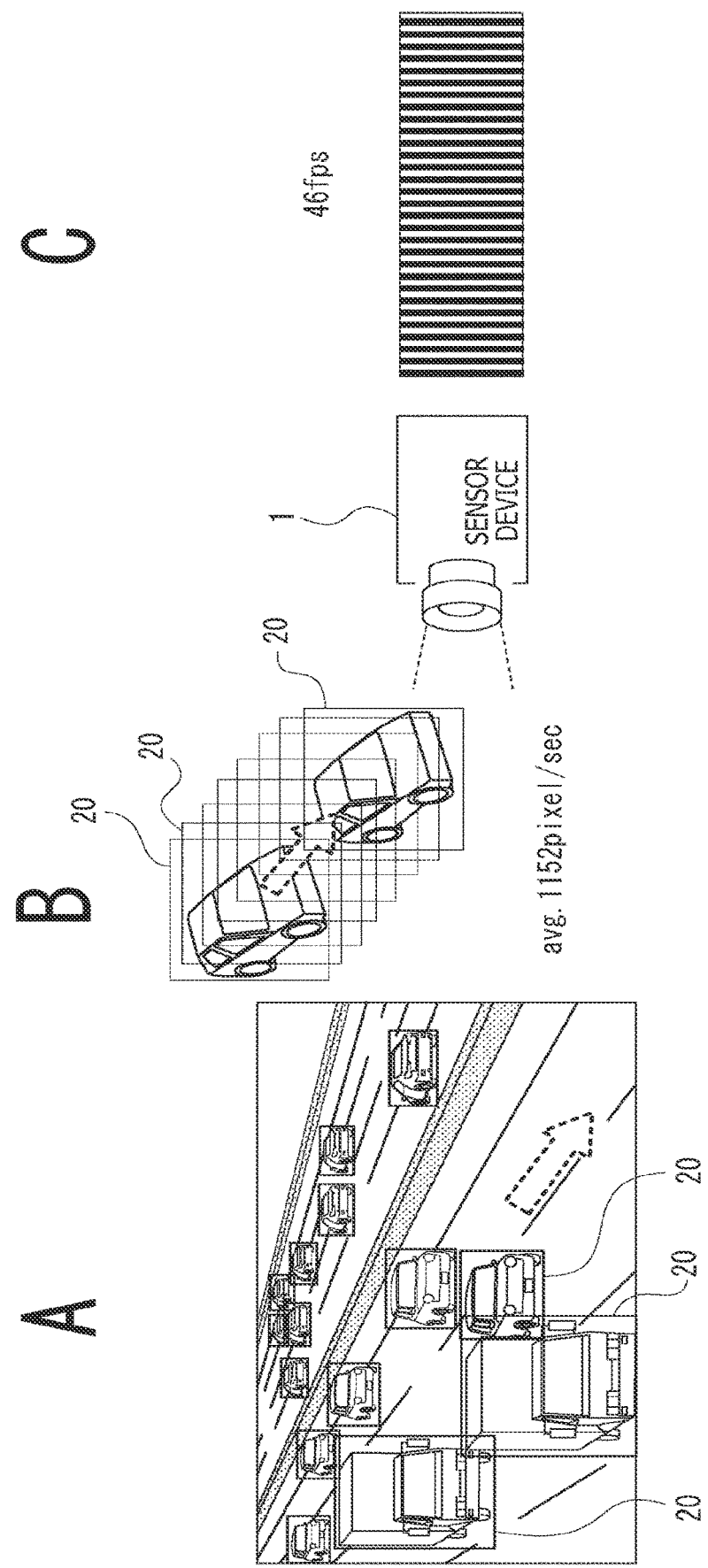
FIG. 33 is an explanatory diagram of active sampling according to the ninth embodiment.

FIG. 33A referred to next depicts an example of an image where the sensor device 1 is incorporated in a monitoring camera provided inside a building. This figure contains humans each designated as a target class, and the bounding boxes 20 for the corresponding humans. A broken-line arrow indicates a moving direction of a certain human.

FIG. 32B presents a movement amount of an image-captured human as a change of a position (pixel position) of the bounding box 20 in the images of successive frames. This movement amount is examined for each of many humans. It is assumed that an average movement amount is 192 pixels/second.

In this case, it is assumed that a calculated frame rate for maintaining object tracking is 5 fps.

For example, the frame rate for maintaining object tracking in the case of the car designated as the target class is different from the frame rate for maintaining object tracking in the case of the human designated as the target class.

Accordingly, by obtaining a frame rate for maintaining object tracking using DNN according to a target class, and then obtaining a threshold for the frame rate (allowable frame rate lower limit), accuracy of object detection for detecting a target object along with tracking of the target object can be maintained while reducing a data volume to a smallest possible volume.

Note that the frame rate is determined according to setting of readout timing of the array sensor 2, and setting of a sampling rate of the ADC/pixel selector 3.

Figure 35:
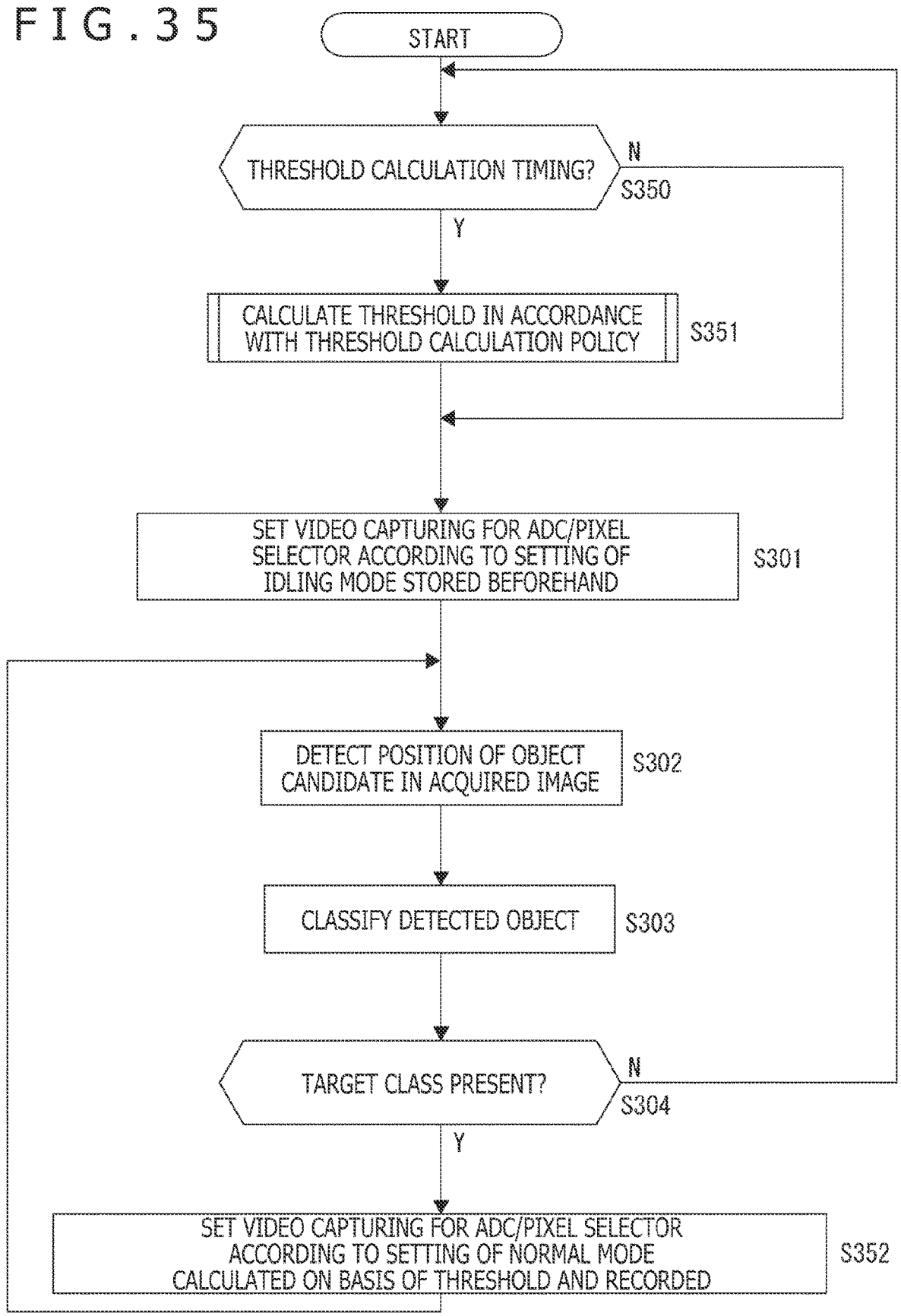
FIG. 35 is a flowchart of the active sampling according to the ninth embodiment.

FIG. 35 depicts a processing example performed by the calculation unit 8.

Steps S350 and S351 are similar to steps S150 and S151 in FIG. 22. Specifically, in step S350, the calculation unit 8 (threshold setting unit 85) determines whether or not the current time is threshold calculation timing. If the current time is the threshold calculation timing, the calculation unit 8 (threshold setting unit 85) calculates thresholds (process in FIG. 24) in step S351.

As the threshold calculation process in FIG. 24 in this case, the calculation unit 8 (object region recognition unit 82) performs processing in steps S160 to S164 similarly to above. Subsequently, the calculation unit 8 (threshold setting unit 85) in step S165 calculates a threshold (frame rate as threshold) for maintaining object tracking while changing the frame rate of the target class surrounded by the bounding box 20.

Thereafter, the calculation unit 8 (threshold setting unit 85) in step S166 records information indicating the threshold calculated in step S165, the target class, and a threshold calculation policy used for threshold calculation in association with each other. For example, the calculation unit 8 records the information in a recording area within the calculation unit 8, records the information in a predetermined region of the memory 6, or transfers the information to the processor 11 and records the information in the processor 11.

In this manner, for example, a parameter based on the threshold corresponding to the target class, i.e., a lowest possible value of the frame rate for maintaining object tracking is set.

Steps S301 to S106 in FIG. 35 are similar to the corresponding steps in FIG. 18.

In step S301, the calculation unit 8 (keyframe selection unit 81) inputs video capturing setting to the ADC/pixel selector 3 according to the setting of the idling mode stored in the calculation unit 8 beforehand, for example.

Accordingly, if the idling mode is set to 1 fsp, video capturing is performed at intervals of 1 second, for example.

The calculation unit 8 (object region recognition unit 82) in step S302 detects positions of object candidates in the acquired image.

In step S303, the calculation unit 8 (class identification unit 83) classifies the objects detected as candidates.

In step S304, the calculation unit 8 checks whether or not a target class is present in classes obtained as a result of the class identification.

If the target class is not present, the calculation unit 8 repeats processing in steps S301, S302, and S303 together with steps S350 and S351.

When threshold calculation timing comes during this period, the processing in step S351 is carried out.

In a case where a target class is present in step S304, the calculation unit 8 advances the process from step S304 to S352.

The calculation unit 8 (keyframe selection unit 81) designates parameters stored in the processing in step S351 as parameters in the setting of the normal mode, sets video capturing for the ADC/pixel selector 3, and gives an instruction of image capturing in the normal mode.

Figure 34:
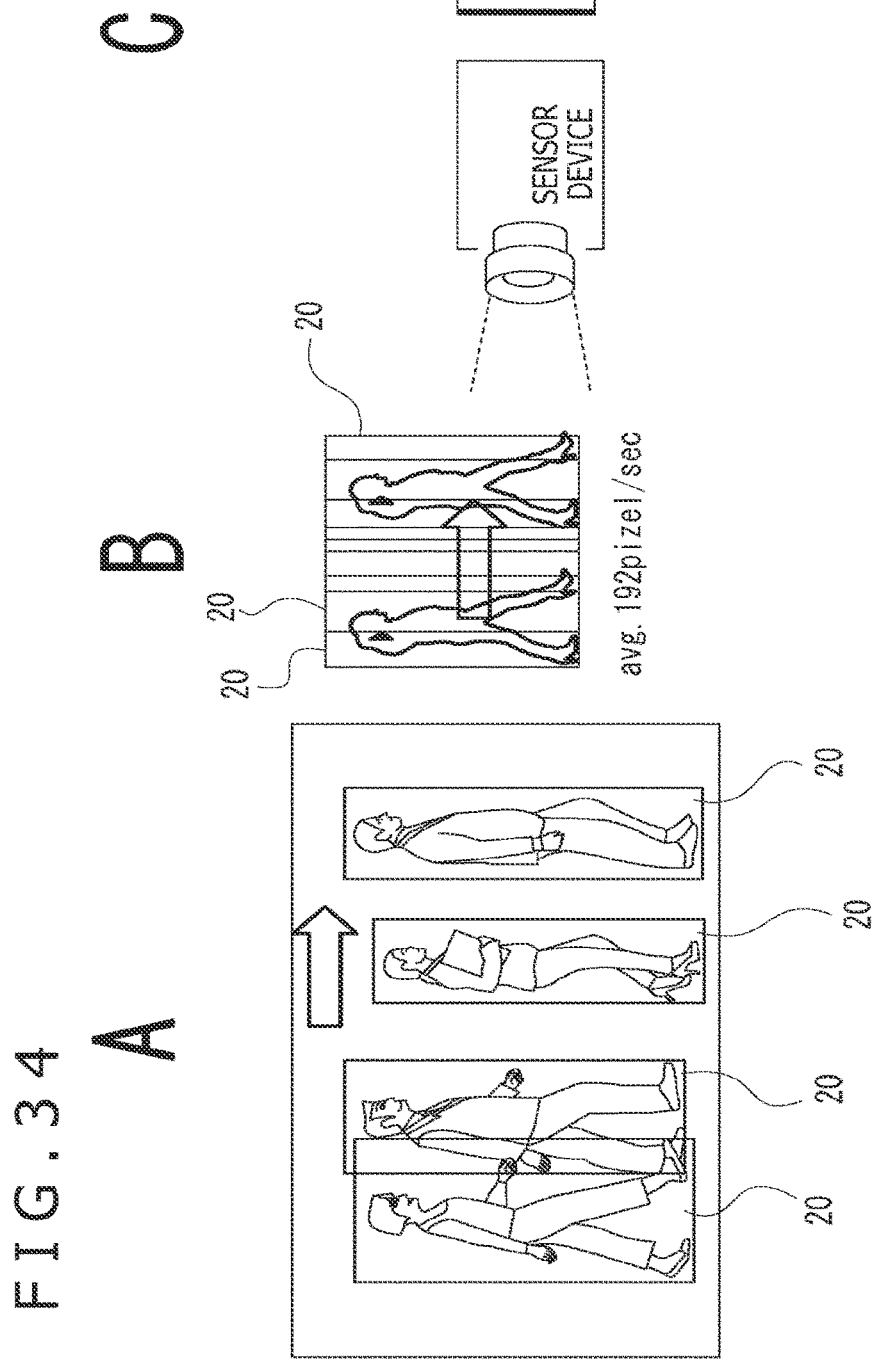
FIG. 34 is another explanatory diagram of the active sampling according to the ninth embodiment.

For example, in a case where the frame rate is set to 5 fps in a state where object tracking is maintained at 5 fps as depicted in FIG. 34C under designation of a human as the target class, the frame rate in the normal mode is set to 5 fsp.

In such a manner, the calculation unit 8 performs processing in steps S302 and S303 in a state where the mode has been switched to the normal mode.

The normal mode then continues as long as the target class is present in the captured image. However, when no target class is present anymore, the flow returns to step S301 after steps S350 and S351 to switch to the idling mode.

The processing described above is performed as the active sampling. In this manner, data volume compression is achieved by lowering the frame rate particularly in the period of absence of the target class, and power consumption is thus reduced.

Further, even in the normal mode, the process is performed at a frame rate adapted according to the target class. Accordingly, the frame rate is reduced to a considerably low frame rate (e.g., 5 fps a described above) depending on classes. Accordingly, data volume compression and power consumption reduction are achieved even in the normal mode.

According to this example, the calculation unit 8 instructs the ADC/pixel selector 3 to change the frame rate to achieve a frame rate change. However, the calculation unit 8 may instruct the logic unit 5 to change the frame rate.

For example, readout from the array sensor 2 is constantly performed at 100 fps. However, the logic unit 5 is instructed to carry out frame thinning according to parameters set in the idling mode or the normal mode. In this manner, reduction of a data volume associated with transfer to the processor 11 is achievable.

11. Application Example to Mobile Body

The technology according to the present disclosure is applicable to various types of products. For example, the technology according to the present disclosure may be implemented in the form of a device mounted on any type of mobile body, such as a car, an electric car, a hybrid electric car, a motorcycle, a bicycle, a personal mobility, an airplane, a drone, a vessel, and a robot.

FIG. 36 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 36, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 36, an audio speaker 12061, a display section 12062, and an instrument panel 12063 are illustrated as the output device. The display section 12062 may, for example, include at least one of an on-board display and a head-up display.

Figure 37:
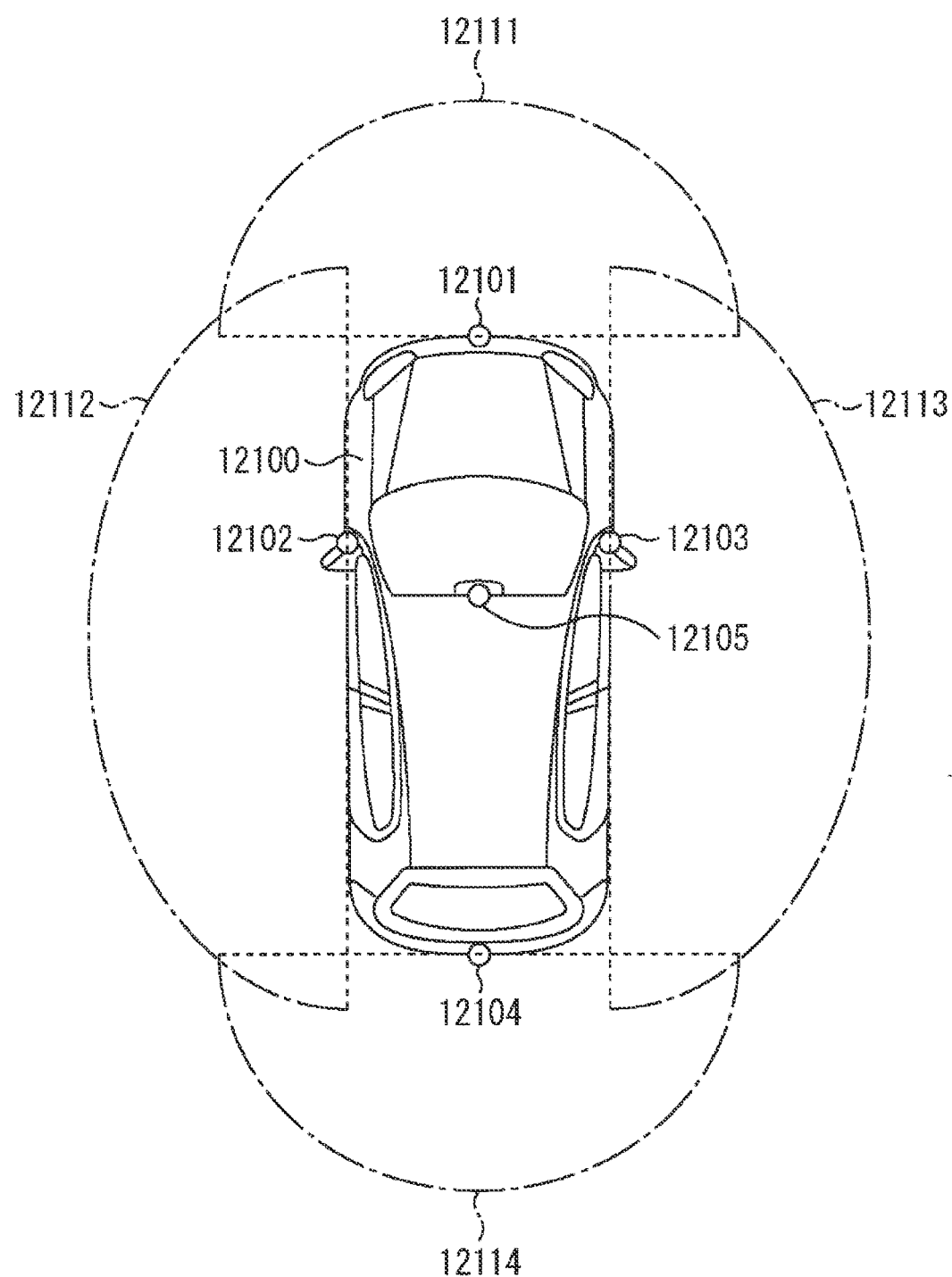
FIG. 37 is a diagram of assistance in explaining an example of installation positions of an outside-vehicle information detecting section and an imaging section.

FIG. 37 is a diagram depicting an example of the installation position of the imaging section 12031.

In FIG. 37, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 37 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

One example of the vehicle control system to which the technology according to the present disclosure is applicable has been described above. For example, the technology according to the present disclosure is applicable to the imaging section 12031 in the configuration described above. Specifically, the sensor device 1 of the present disclosure is applied to an image sensor mounted on the imaging section 12031 to execute a part or all of divided image adaptation, area clipping, intelligent compression, and active sampling. In this manner, image processing adapted to information detection outside the vehicle, reduction of a processing load without lowering of detection accuracy by appropriate reduction of an information volume, and the like are achievable.

12. Summary and Modifications

According to the embodiments described above, following advantageous effects are produced.

As described in the first and sixth embodiments, the sensor device 1 includes: the array sensor 2 that includes a plurality of visible light or invisible light imaging elements arranged one-dimensionally or two-dimensionally; the logic unit 5 (image processing unit) that performs image processing using parameters corresponding to an instruction for image signals obtained by image capturing using the array sensor 2; and the calculation unit 8. The calculation unit 8 identifies a class of an object detected from the image signals obtained by image capturing using the array sensor 2, selects parameters used for image processing on the basis of the identified class, and performs process setting of the logic unit 5 using the selected parameters.

Specifically, the logic unit 5 performs image processing for the image signals obtained by the array sensor 2. In this case, parameters for the image processing are set on the basis of class identification of the detected object in the image signals.

In a case of object detection from an image, an image having high quality for a viewer is not necessarily an image having high recognition accuracy. Further, preferable image quality differs for each class of an object to be recognized. Specifically, an image subjected to image processing based on normal parameter setting achieving high image quality in view of visual recognition does not necessarily have image quality suited for object detection. Further, preferable image processing parameters differ for each class of an object to be recognized.

Accordingly, a parameter set is retained for each class beforehand, and a parameter set to be used is selected according to class identification of a detected object in a captured image. In this manner, image processing suited for detection of a targeted object is achieved. The image subjected to image processing in this manner achieves improvement of object detection accuracy.

In addition, image quality adjustment suited for object detection is different from image quality adjustment for producing a beautiful image for a viewer. Accordingly, a diffusion filter or the like used for producing a beautiful image with priority is not used, for example. The parameters to be set are therefore often parameters reducing a processing load.

Further, a data volume often decreases depending on the parameters corresponding to the class (e.g., parameter associated with gradation change or compression). In this case, a delay of processing caused by a heavy load of calculation on the processor 11 side, and a power consumption increase of the entire system are avoidable.

The sensor device 1 of the respective embodiments includes the interface unit 7 (output unit) that outputs image signals subjected to image processing using the logic unit 5 (image processing unit) to an external device.

The sensor device 1 performs image processing corresponding to the class of the object using the logic unit 5 provided inside, and transmits and outputs the processed image to the processor 11 (step S108 in FIG. 5). In this manner, the necessity of image quality adjustment for improving object detection by the processor 11 is eliminated. Accordingly, highly accurate object detection is achievable while reducing a processing load of the processor 11.

Further, the parameter set selected on the basis of class identification is not necessarily a parameter set for obtaining maximum image quality in view of visual recognition for a viewer. The data volume of the processed image decreases depending on cases. Specifically, an image not necessarily having maximum image quality for a viewer, but having image quality suited for the object to be recognized by the processor is output. Reduction of the data volume of the image signals to be transmitted is thus achievable in some cases.

Accordingly, communication costs can be reduced without lowering accuracy of object detection. A delay of transfer caused in a case of calculation performed in a cloud can also improve.

According to the above description, the interface unit 7 (output unit) of the embodiments also transmits information associated with class identification of the image signals to be output (step S108 in FIG. 5).

In this manner, the processor 11, an AI processor in a cloud, or the like corresponding to a destination of output is capable of detecting an object after recognition of a class, and therefore achieves more accurate object detection.

According to the above description in the first and sixth embodiments, the calculation unit 8 performs, in one frame of image signals, the object region recognition process for detecting an object region corresponding to a candidate of an object as a detection target, the class identification process for identifying a class of the object in the object region detected by the object region recognition process, and the parameter selection process for selecting parameters on the basis of an identification result of the class identification process and inputting process setting to the logic unit 5 (see FIGS. 1 and 5).

Specifically, the calculation unit 8 includes the object region recognition unit 82 for performing the object region recognition process, the class identification unit 83 for performing the class identification process, and the parameter selection unit 84 for performing the parameter selection process. This configuration achieves detection of the object candidate from one frame of the image signals, class identification, and parameter selection based on the class identification.

According to the above description in the first and sixth embodiments, the calculation unit 8 performs, in one frame of the image signals, the object region recognition process for detecting an object region corresponding to a candidate of an object as a detection target, the class identification process for identifying a class of the object in the object region detected by the object region recognition process, the process for determining whether or not a target class is present in the class identified by the class identification process, and the parameter selection process for selecting parameters on the basis of an identification result of the target class and inputting process setting to the logic unit 5 in a case where the target class is present (see FIGS. 1, 5, and 22).

Parameter selection based on the class of the object as an image recognition target is efficiently executable by determining the presence of the target class. In other words, by eliminating parameter selection based on detection of a not-targeted object, processing efficiency increases, and inappropriate parameters are not set without execution of useless parameter selection. Accordingly, image recognition accuracy of the targeted object improves.

According to the first and sixth embodiments, a plurality of the target classes may be set. In a case where objects in a plurality of target classes are present in one frame, the parameter selection process is performed on the basis of the selected one target class (see step S106 in FIGS. 5 and 22).

By allowing setting of a plurality of the target classes, image recognition for a target object corresponding to a plurality of classes can be handled.

Further, in a case where objects in a plurality of target classes are present in one frame, a dominant or predominant target class is selected, for example. In this manner, an appropriate parameter set is provided by selecting parameters on the basis of one target class.

Further, according to the first and sixth embodiments described above (steps S105 and S106 in FIGS. 5 and 22), the bounding box 20 surrounding the object is calculated for the object region corresponding to the target class. In a case where a plurality of target classes is present, one target class is selected on the basis of areas of the bounding boxes 20.

In the case where objects in a plurality of target classes are present, regions of the respective objects are specified using the bounding boxes 20, and a dominant area of the objects in the respective target classes in one frame is obtained to determine a target class to be handled with priority. In this manner, more appropriate parameter selection is achievable.

According to the first and sixth embodiments described above, the calculation unit 8 selects a parameter set including a plurality of parameters and set for each class on the basis of an identified class. Specifically, a set of parameters for various types of processes performed by the logic unit is stored. This parameter set is selected and set for the logic unit (see step S107 in FIGS. 4, 5, and 22).

In this manner, a plurality of parameters suited for a targeted class (target class) is settable as parameters suited for various types of processes performed by the logic unit 5.

According to the first embodiment presented above, the parameter set is a set of a plurality of parameters obtained by deep learning using an image of a corresponding object for each class.

For example, image processing parameters for achieving a high image recognition rate for human recognition are obtained by deep learning using a human image as learning data, and the obtained set of parameters are designated as a parameter set corresponding to a class called "human" (see FIG. 4).

In this manner, an appropriate parameter set can be prepared for each class, and parameter selection suited for target image recognition is achievable by selecting the appropriate parameter set.

According to the first and sixth embodiments described above, the calculation unit 8 identifies a class of a frame designated as a keyframe in image signals obtained by image capturing using the array sensor 2, and parameters used for image processing are selected on the basis of the identified class (see steps S101 and S102 in FIGS. 5 and 22).

This class identification is performed not for all frames but only the keyframe. Accordingly, a processing load imposed on the calculation unit 8 does not excessively increase. Further, a state of appropriate parameter selection can be maintained by selecting the keyframe on the basis of an appropriate selection algorithm.

According to the first and sixth embodiments described above, the keyframe is a frame obtained at predetermined time intervals.

In this manner, parameter selection is regularly made. For example, one frame for every thirty seconds is designated as the keyframe. In this case, processing performed by the calculation unit 8 does not become excessively heavy, and appropriate parameter setting can be maintained.

In addition, it is preferable that the interval of the keyframe is set according to various types of situations, such as a target object of image recognition, a use environment of the sensor device 1, a use purpose, and an apparatus type incorporating the sensor device 1.

Further, also described has been the example which designates a frame obtained at timing based on a command from an external apparatus.

For example, the keyframe is set in response to an instruction from the processor 11 or the like corresponding to an image output destination. In this manner, keyframe selection and parameter selection are achievable according to a purpose or the like of a recognition process performed by an apparatus corresponding to a destination of output of information associated with the image signals or class identification. For example, the keyframe is set according to a type, a purpose, or the like of the apparatus incorporating the sensor device 1.

In this case, assuming that the apparatus incorporating the sensor device 1 is an in-vehicle apparatus, for example, the interval of the keyframe may be reduced at the timing of a start of traveling of the car.

The logic unit 5 of the respective embodiments performs, as image processing for the image signals, processing such as color correction, gamma correction, color gradation processing, gain processing, contour emphasis processing, data compression processing, frame rate conversion, resolution conversion, aspect ratio conversion, contrast adjustment processing, sharpness adjustment processing, gray level adjustment processing, or sampling rate change processing.

In this manner, image quality adjustment and data volume conversion are achieved. In this case, image quality adjustment and data size adjustment (e.g., resolution and frame rate) suited for a class of an object to be recognized are executed by setting parameters for the foregoing processes. As a result, an image and a data size suited for object detection of a target class are obtained, and an unnecessary increase in image quality and a data volume are reduced. These contribute to reduction of communication costs, improvement of a processing speed, improvement of object detection accuracy, and the like.

According to the respective embodiments described above, the interface unit 7 (output unit) outputs any or all of items of information indicating image signals subjected to image processing by the logic unit 5, identified class information, the number of detected objects, and presence or absence of a target class in response to a request from an external apparatus. This is a common operation performed in the first to fifth embodiments.

Specifically, the interface unit 7 outputs information required by the processor 11 in the items of information indicating the image signals subjected to image processing by the logic unit 5, the information indicating the class identified by the calculation unit 8, the number of objects, and the presence or absence of the target class in response to a request from the processor 11, a processor in a cloud, or the like. In this manner, unnecessary information transfer is avoided. Accordingly, reduction of a communication volume and reduction of power consumption are also achieved.

Further, information corresponding to processes performed by the processor 11 or the like is providable.

While the image signals are targeted in the respective embodiments, it is assumed that the array sensor 2 is constituted by a sound wave detection element array or a haptic senser element array. In this case, the interface unit 7 outputs detection signals of these (detection signals after processed by the logic unit 5) in response to a request from an external apparatus.

As described in the second, the third, the fourth, the seventh, and the eighth embodiments, the sensor device 1 includes the array sensor 2 including a plurality of detection elements arranged one-dimensionally or two-dimensionally, and the signal processing unit 30 that acquires the detection signals obtained by the array sensor 2, and performs signal processing for the detection signals. The calculation unit 8 detects an object from the detection signals obtained by the array sensor 2, and gives, to the signal processing unit 30, an instruction of region information (ROI 21 or AROI 22) generated on the basis of detection of the object as region information associated with acquisition of the detection signals obtained from the array sensor 2 or associated with signal processing for the detection signals.

Specifically, signal processing is performed by the signal processing unit 30 for the detection signals obtained by the array sensor 2, and the processed detection signals are output from the interface unit 7. In this case, region information associated with acquisition of the detection signals from the array sensor 2 or signal processing, both achieved by the signal processing unit 30, is set on the basis of object detection.

For object detection from an image as in the embodiments, information associated with all pixels of respective frames is not always required. For example, in a case of detection of a human, only detection information indicating a region which contains a human within a frame is required. Accordingly, the calculation unit 8 generates the ROI 21 or the AROI 22 on the basis of object detection to achieve processing performed by the signal processing unit 30, i.e., acquisition of the detection signals from the array sensor 2 using the ADC/pixel selector 3, and a compression process performed by the logic unit 5 on the basis of the ROI 21 or the AROI 22.

In this manner, reduction of a data volume of a processing target, and improvement of a processing speed are achievable, and also image signals not lowering detection accuracy are obtainable.

Note that object detection may be performed for not only image signals but also detection signals obtained from the array sensor in a form of sound wave detection signals or haptic sense detection signals to give, to the signal processing unit, an instruction of region information generated on the basis of detection of an object as region information associated with acquisition of the detection signals obtained from the array sensor or associated with signal processing for the detection signals.

In this manner, reduction of a data volume of a processing target, and improvement of a processing speed are achievable, and also an effect of acquiring detection signals not lowering detection accuracy is obtainable even in a case of use of a sound wave sensor array or a contact sensor array.

In the cases of the second, the third, the fourth, the seventh, and the eighth embodiments, the interface unit 7 (output unit) outputs detection signals subjected to signal processing by the signal processing unit 30 to an external device.

Image signals obtained by AD-converting only partial pixels using the ROI 21 or the AROI 22, or image signals compressed at a compression rate changed for each region using the ROI 21 are output to the processor 11 or the like. Accordingly, a data volume to be transferred considerably decreases. As a result, reduction of communication costs and reduction of a transfer time are achieved. In addition, information necessary for object detection is contained. Accordingly, object detection accuracy of the processor 11 or the like does not lower. Further, a processing load imposed on the processor 11 is reduced by reduction of the data volume.

Further, a delay of processing caused by a heavy load of calculation on the processor 11 side, and a power consumption increase of the entire system are avoidable.

According to the respective embodiments, the signal processing unit 30 includes the ADC/pixel selector 3 (acquisition unit) that selectively acquires detection signals from the detection elements of the array sensor 2.

Further, according to the second, the third, the seventh, and the eighth embodiments, the ADC/pixel selector 3 acquires, as one frame of the detection signals, the detection signals of the detection elements selected on the basis of the ROI 21 or the AROI 22 received from the calculation unit 8 (see FIGS. 9, 14, 29, and 32).

The ADC/pixel selector 3 AD-converts and acquires photoelectrically converted signals in only a range designated by the ROI 21 or the AROI 22 in a next frame where an object has been detected. In this manner, a data volume of one frame can be considerably reduced. In addition, information associated with pixels necessary for object detection can be appropriately obtained by setting the ROI 21 or the AROI 22 on the basis of object detection.

According to the second, the third, the seventh, and the eighth embodiments described above, the calculation unit 8 detects an object from detection signals acquired from the array sensor 2 in a state where the ADC/pixel selector 3 (acquisition unit) does not select detection elements using region information (ROI 21 or AROI 22), and gives, to the signal processing unit 30, an instruction of designation of the ROI 21 or the AROI 22 generated on the basis of detection of the object as region information used for acquisition of detection signals in a following frame from the array sensor 2 using the ADC/pixel selector 3 (see FIGS. 9, 14, 29, and 32).

An object to be detected can be accurately detected in a captured image by detecting the object from image signals containing all effective pixels in one frame. In addition, information associated with only pixels necessary for object detection can be acquired from the next frame by generating the ROI 21 or the AROI 22 based on the detected object, and supplying the ROI 21 or the AROI 22 to the ADC/pixel selector 3. Accordingly, appropriate detection information (information associated with necessary pixels) is acquirable while reducing the data volume.

According to the second, the third, the seventh, and the eighth embodiments described above, the calculation unit 8 detects an object from detection signals acquired from the array sensor 2 in a state where the ADC/pixel selector 3 has selected detection elements using the ROI 21 or the AROI 22, and gives, to the signal processing unit 30, an instruction of region information re-generated on the basis of detection of the object as region information used for acquisition of detection signals in a following frame from the array sensor 2 using the ADC/pixel selector 3 (see step S203 in FIGS. 9, 14, 29, and 32, and FIG. 10).

The ROI 21 or the AROI 22 is correctable according to a change of the position of the object by detecting the object also from a frame of image signals which contain information associated with only partial pixels. In this manner, a region acquired by the ADC/pixel selector 3 changes according to movement of the object (e.g., human) within the image in the following frame. In other words, even the position of the target object changes within the image for each frame, pixels can be selected and read at a position following the change for each frame. Accordingly, a state for achieving appropriate detection information (pixel information) while reducing the data volume can be continued even with progress of the frame.

According to the second, the third, the seventh, and the eighth embodiments, the calculation unit 8 detects an object from detection signals acquired from the array sensor 2 in a state where the ADC/pixel selector 3 has selected detection elements using the ROI 21 or the AROI 22. In a case where a target object is not detected, the calculation unit 8 gives an instruction of acquiring detection signals in a following frame from the array sensor 2 in a state where detection elements are not selected by the ADC/pixel selector 3 using the ROI 21 or the AROI 22 (see steps S205, S201, and S202 in FIGS. 9, 14, 29, and 32).

Specifically, the calculation unit 8 returns acquisition of detection signals by the acquisition unit to a normal state when a target object is not detected any more in a frame containing only information associated with partial detection elements from the array sensor 2.

In this manner, the state returns to a state where the object is detected from image signals containing all effective pixels in one frame, and detection of the target object is again achievable for the entire captured image. In other words, a state for monitoring the entire image is achievable.

According to the second, the third, the fourth, the seventh, and the eighth embodiments described above, the calculation unit 8 calculates the bounding box 20 surrounding a region of an object detected from detection signals using the array sensor 2, and generates the ROI 21 or the AROI 22 as region information on the basis of the bounding box 20 (see FIGS. 9, 14, 16, 29, and 32).

The ROI 21 or the AROI 22 corresponding to the position of the targeted object in the image can be produced by generating the bounding box 20 using object detection, and generating the ROI 21 or the AROI 22 on the basis of the generated bounding box 20. In this manner, appropriate readout pixels in a next frame can be selected.

According to the second, the fourth, the seventh, and the eighth embodiments, the calculation unit 8 generates the ROI 21 by expanding the bounding box 20 (see FIGS. 9, 16, 29, and 32).

The bounding box 20 surrounds a region of an object in a current frame. However, the position of the object may change in a following frame. Accordingly, the ROI 21 is generated by expanding the bounding box 20.

In this manner, information acquired from the next frame (signals of AD-converted pixels) is made more likely to contain the object. In other words, readout of pixels containing necessary information can be made to continue as long as possible.

According to the description of the second embodiment presented above, the calculation unit 8 determines a region of a detected object in units of detection element, and generates region information on the basis of this determination (see FIG. 11).

Specifically, the ROI 21 is generated on the basis of semantic segmentation. In this case, the ROI 21 having a shape other than a rectangular shape is also generated.

Information may be lost by rectangular clipping depending on objects. For example, a truck having a projection, a person riding a bicycle, or the like may have a protruded portion when clipping is rectangular. If the ROI 21 is shaped to cover the protruded portion, the size of the ROI 21 uselessly increases. As a result, a data reduction effect decreases. Accordingly, a necessary region is made selectable at a pixel level. In this manner, necessary information is acquirable by a minimum data volume.

The ROI 21 based on semantic segmentation described herein is also useful in a case of setting a region of a low compression rate in the fourth embodiment.

According to the second, the third, the fourth, the seventh, and the eighth embodiments, the calculation unit 8 detects an object in a frame (keyframe) at the object detection keyframe recording timing in the detection signals obtained from the array sensor 2, and generates region information on the basis of object detection (see step S201 in FIGS. 9, 14, 16, 29, and 32).

This object detection is performed not for all frames but only the keyframe. Accordingly, a processing load imposed on the calculation unit 8 does not excessively increase. Further, a state for achieving appropriate object detection can be maintained by selecting the keyframe on the basis of an appropriate selection algorithm.

In this case, the keyframe is also a frame obtained for every predetermined time interval, or at timing based on a command from an external apparatus.

For example, object detection from all pixels in a frame at timing required by the apparatus or the application, and reduction of a data volume in following frames are achievable by setting the keyframe according to a type, a purpose, or the like of the apparatus incorporating the sensor device 1.

According to the second, the third, the fourth, the seventh, and the eighth embodiments, the calculation unit 8 identifies a class of an object detected from the detection signals obtained from the array sensor 2, determines whether or not the identified class is a target class, and generates region information (ROI 21 or AROI 22) in correspondence with the object of the target class (see steps S204 and S205 in FIGS. 9, 14, 16, 29, and 32).

Accurate region information for acquiring information associated with the object of the detection target can be created by generating the ROI 21 or the AROI 22 on the basis of determination of the presence of the target class used for defining the object region of the target class.

According to the third and the eighth embodiments described above, the calculation unit 8 identifies a class of an object detected from the detection signals obtained from the array sensor 2, and generates region information (AROI 22) corresponding to the object using a template corresponding to the identified class (see S210 and S211 in FIG. 14 and S262 and S211 in FIG. 32).

The AROI 22 applicable to an important region different for each class can be generated by using the template corresponding to the class.

Particularly in a case where the array sensor 2 is constituted by imaging elements, the largest amount of power is consumed by photoelectric conversion. In this case, photoelectrically converted pixels are desired to be reduced as much as possible. Reduction of a volume of effective data is achievable without influencing detection accuracy by reducing photoelectrically converted pixels according to the template. Particularly in a case of an image, it is important to generate not a beautiful image for a viewer, but an image from which an object is accurately recognizable by the processor 11. An image generated by designating pixels to be photoelectrically converted and converted into digital data using the template is an image suited for effective object detection achieved by a small data volume.

Further, the template indicates an acquisition region from which the detection signals are acquired for each class.

For example, it is assumed that the template indicates the detection elements from which detection information is to be acquired in the detection elements of the array sensor for each of the classes such as a "human" and a "car" (see FIGS. 12 and 13).

Readout of appropriate information from the array sensor 2 is achievable for each class by using the template which indicates pixels to be read in correspondence with the class. Particularly, information corresponding to a particularly needed portion can be intensively acquired for each class by increasing density in a part (face portion or number plate portion) as in the examples of FIGS. 12 and 13.

According to the fourth embodiment described above, the signal processing unit 30 performs a compression process for compressing the detection signals received from the array sensor 2 using the logic unit 5. The logic unit 5 performs the compression process at a compression rate different for each region on the basis of region information received from the calculation unit 8 (see FIG. 16).

In this manner, the signal processing unit 30 (logic unit 5) achieves data compression not reducing important information by setting different compression rates for an important region and a not so important region in the frame.

Further, the logic unit 5 performs a compression process at a low compression rate in a region designated by region information, and a compression process at a high compression rate in the other region (see FIG. 16).

The signal processing unit 30 (logic unit 5) performs a compression process at a low compression rate in a region designated by the ROI 21, and reduces a data volume at a high compression rate in the other region in a next frame and following frames where an object has been detected. The ROI 21 is generated according to object detection. Accordingly, the region indicated by the ROI 21 is also an important region for object detection performed by the processor 11. A low compression rate is set for this region to avoid reduction of information. In this manner, lowering of detection accuracy is prevented. On the other hand, the region other than the region indicated by the ROI 21 is a region not greatly influencing object detection. Accordingly, this region is compressed at a high compression rate to efficiently reduce the data volume.

As described in the fifth and the ninth embodiments, the sensor device 1 includes: the array sensor 2 including a plurality of detection elements arranged one-dimensionally or two-dimensionally; the signal processing unit 30 that acquires the detection signals obtained by the array sensor 2, and performs signal processing for the detection signals; and the calculation unit 8 that detects an object from the detection signals obtained by the array sensor 2, and gives an instruction of changing a frame rate of the detection signals received from the array sensor 2 on the basis of detection of the object.

For object detection from an image as in the embodiments, image signals at a high frame rate are not always required. For example, for detecting a human, no problem is caused in a frame not containing a human even if the frame rate is low. On the contrary, the frame rate is raised in a period of appearance of a human. In this case, an information volume increases, and therefore detection of an object (human), and information recognizable according to the detection are allowed to increase.

Specifically, by changing the frame rate according to detection of the object, the data volume is adaptively raised at the time of a need of the data, and reduced at the time of no need of the data. Accordingly, a processing data volume or a transfer data volume can be reduced without lowering object detection performance.

Note that it is adoptable to give an instruction of changing the frame rate of detection signals received from the array sensor on the basis of object detection from detection signals obtained by the array sensor in the form of not only image signals but also sound wave detection signals, haptic sense detection signals, or the like. In this manner, even in a case of use of a sound wave sensor array or a contact sensor array, the data volume is adaptively raised at the time of a need of the data, and reduced at the time of no need of the data. Accordingly, an effect of reduction of a processing data volume or a transfer data volume without lowering object detection performance can be produced.

The frame refers to a frame of an image in a case where the array sensor is an imaging element array. The frame has the same meaning even in the case of the sound wave detection element or the haptic senser element, and indicates a data unit read from a plurality of detection elements of the array sensor in one reading period regardless of types of the array sensor. The frame rate corresponds to density within a unit time of this frame.

In the cases of the fifth and ninth embodiments, the interface unit 7 (output unit), which outputs detection signals subjected to signal processing by the signal processing unit 30 to an external device, is configured to output, to the processor 11 or the like, detection signals whose frame rate changes on the basis of a result of object detection.

Accordingly, the data volume to be transferred considerably decreases. As a result, reduction of communication costs and reduction of a transfer time are achieved. In addition, information necessary for targeted object detection is contained. Accordingly, accuracy of object detection by the processor 11 or the like does not lower. Further, a processing load imposed on the processor 11 is also reduced by reduction of the data volume.

Further, a delay of processing caused by a heavy load of calculation on the processor 11 side, and a power consumption increase of the entire system are avoidable.

According to the fifth and the ninth embodiments, the calculation unit 8 at least stores setting values for a frame rate of a first mode (idling mode), and setting values for a frame rate of a second mode (normal mode), and performs control based on the setting values of either the first mode or the second mode according to a result of object detection (see FIGS. 18 and 35).

In this manner, control as active sampling is achievable by a simple process which selects setting values according to a result of object detection, i.e., presence or absence of an object of a target class.

It is preferable that one or both of the setting values for the frame rate of the first mode and the setting values for the frame rate of the second mode in the fifth and the ninth embodiments are rewritable from an external device. For example, the setting values are made changeable according to a use application, processing ability, a use purpose of an application, or the like of an external processor.

Frame rate setting according to the purpose of the processor 11 or the application of the processor 11 is achievable by rewriting the setting values from the processor 11 or the like.

According to the example described above in the fifth and ninth embodiments, the calculation unit 8 changes the frame rate by giving an instruction of a readout interval of the detection signals from the array sensor 2 (see FIGS. 18 and 35).

For example, the calculation unit 8 (keyframe selection unit 81) instructs the array sensor 2 and the ADC/pixel selector 3 to switch between the idling mode and the normal mode to change the interval of image signal readout performed by the array sensor 2 and the ADC/pixel selector 3 for frame rate switching.

In this case, the intervals of photoelectric conversion and readout themselves achieved by the array sensor 2 are increased in the idling mode for lowering the frame rate. The array sensor 2 consumes a large amount of power for photoelectric conversion. Accordingly, an increase in the readout interval of the array sensor 2 is considerably effective for reducing power consumption.

According to the description of the fifth and the ninth embodiments, the calculation unit 8 may instructs the signal processing unit 30 (logic unit 5) to change the frame rate to achieve a frame rate change.

Specifically, switching of the frame rate is executed by a frame rate conversion in a course of signal processing.

Frame rate conversion may be achieved by the logic unit 5. For example, the frame rate can be lowered by performing frame thinning. In this case, the effect of reduction of power consumption of the array sensor 2 is not produced in a state where the array sensor 2 constantly performs readout at a high frame rate.

However, the effect of reduction of the data volume transferred to the processor 11 can be produced even in this case.

According to the fifth and the ninth embodiments described above, the calculation unit 8 identifies a class of an object detected from detection signals obtained from the array sensor 2, determines whether or not the identified class is a target class, and gives an instruction of a frame rate change according to a determination result (see S304, S305, and S301 in FIG. 18, and S304, S352, and S301 in FIG. 35).

Presence of the target class is determined, and the frame rate is raised by selecting the normal mode on the basis of the presence of the object of the target class. In a case where the object of the target class is not detected, the frame rate is lowered by selecting the idling mode. In this manner, accurate detection is achievable according to the presence of the object corresponding to the detection target.

For example, detailed monitoring is achievable by raising the frame rate on the basis of detection of a human as a target class for a use purpose such as monitoring a human, while the idling mode is selected for other purposes to achieve reduction of power consumption or reduction of a data volume.

According to the respective embodiments, the detection elements of the array sensor 2 are constituted by imaging elements. Specifically, detection signals generated by the array sensor 2 are image signals generated by image capturing (photoelectric conversion).

Accordingly, appropriate reduction of a data volume with object detection accuracy maintained, and reduction of processing loads and reduction of transfer costs by the reduction of the data volume, and others are achievable in object detection using captured images.

According to the embodiments, the sensor device 1 is assumed to have an integral-type sensing module configuration which has an AI chip or a DRAM chip constituting the calculation unit 8.

On the other hand, adoptable is such an example which has a configuration where the AI chip or the DRAM chip constituting the calculation unit 8 is provided outside the array sensor 2. In this case, the calculation unit provided outside performs the readout and signal processing control described in the respective embodiments.

Further, adoptable is an example which unify the array sensor 2 and the AI chip constituting the calculation unit 8, and uses an external DRAM chip.

According to the sixth embodiment, there is provided the threshold setting unit 85 that sets thresholds for all or some of parameters used for image processing performed by the logic unit 5 (image processing unit), or image capturing processing associated with image capturing performed by the array sensor 2 to achieve a process using the parameters set on the basis of the thresholds.

For example, image signals having minimum necessary quality or the like (e.g., minimum necessary resolution) for processing of object detection or the like can be output by setting (changing) the parameters using the threshold. Accordingly, lowering of performance, accuracy, or the like of processing of processes in following stages (e.g., object detection) is avoidable while reducing a data volume of image signals to be output.

Further, power consumption reduction and processing speed increase are achievable accordingly.

In addition, according to the processing example of FIG. 22 described in the sixth embodiment, the calculation unit 8 identifies a class of an object detected from the image signals obtained from the array sensor 2 by image capturing, selects a parameter set used for image processing on the basis of the identified class, performs process setting of the logic unit 5 using the selected parameters, and sets (adjusts) the selected parameters according to thresholds. Accordingly, a part or all of the parameters included in the parameter set adapted for each class are further adjusted and set according to the thresholds. The data volume is thus further adjusted to a necessary and sufficient volume after adaptation to the class while maintaining detection accuracy such as object detection. The data volume may be further reduced by further adjustment of the parameter set adapted to the class. Accordingly, reduction of power consumption, and processing speed increase can be further promoted.

However, configurations other than the example depicted in FIG. 22 may be adopted. All or some of set parameters may be simply changed on the basis of thresholds regardless of classes. In this case, reduction of the data volume of the image signals, reduction of power consumption, and processing speed increase can be achieved while maintaining performance and accuracy required for object detection or the like.

According to the sixth embodiment, the threshold setting unit 85 sets thresholds corresponding to a class of an object detected from the image signals. For example, thresholds considered to be appropriate are set according to the class such as a "human," a "car," and a "sign."

A relation between resolution and detection accuracy required for images for a purpose such as object detection differs for each class. Accordingly, thresholds are set according to classes, and resolution or the like of the image signals output from the logic unit 5 is changed. In this manner, output based on minimum necessary resolution or the like is achievable according to classes. Specifically, data reduction, power consumption reduction, processing speed increase, and the like are achievable while optimizing parameters such as resolution according to classes and maintaining object detection accuracy or the like at a required level.

According to the sixth embodiment, the threshold setting unit 85 sets thresholds on the basis of a learning process performed for the image signals. For example, the thresholds are obtained by performing learning processing as local learning on the sensor device 1 side. Desirable values for thresholds and parameters corresponding to the thresholds are determined by performing learning for the image signals. In this manner, parameter setting is adaptably achievable according to an image capturing environment, captured image contents, a detection target object, and the like.

Further, thresholds suited for image accuracy required for the sensor device 1 can be calculated by performing this local learning within the sensor device 1 or the terminal apparatus 100 including the sensor device 1.

Further, optimization of resolution or the like of the image signals to be output is achieved with parameter setting further adapted to the class by setting thresholds using local learning for each class.

According to the sixth embodiment, the threshold setting unit 85 sets thresholds such that a predetermined rate is obtained as a confidence rate (rate of confidence of object detection).

The confidence rate required as accuracy of object detection from an image differs for each purpose, target, device/application program type, season, district, or the like of the detection.

For example, in a case where only 80% confidence is required, it is sufficient if parameters are set according to the thresholds so set as to obtain 80% or higher confidence. Further, in a case where 95% or higher confidence is required, it is sufficient if parameters are set on the basis of raised thresholds.

Accordingly, by setting thresholds (and setting parameters) on the basis of a confidence rate required for object detection, desirable quality of image signals, and corresponding data reduction, power consumption reduction, processing speed increase, and the like are achievable as adaptation according to execution of the processing of threshold setting.

According to the sixth embodiment described above, the threshold setting unit 85 is provided in a device having a housing identical to that of the logic unit 5 (see FIGS. 21, 25, and 26). For example, the threshold setting unit 85 is provided in a unit functioning as the sensor device 1, or the terminal apparatus 100 including the sensor device 1. In addition, the threshold setting unit 85 sets thresholds and parameters corresponding to the thresholds by performing local learning. This means that a state adaptable to an apparatus as the sensor device 1 and the terminal apparatus 100 is learned to set thresholds. In this manner, appropriate threshold setting which implements output required for the sensor device 1 or the terminal apparatus 100 is achievable.

According to the seventh and the eighth embodiments, the calculation unit 8 sets the active area RA for the detection signals acquired from the array sensor 2 on the basis of information associated with previous region information (the object detection region bounding box 20 on the basis of which region information is generated, or the ROI 21 or the AROI 22 each of which is region information itself) (S251 in FIGS. 29 and 32).

In addition, the calculation unit 8 detects an object from the detection signals in the active area RA, and gives, to the signal processing unit 30, an instruction of the ROI 21 or the AROI 22 generated on the basis of detection of an object as region information associated with acquisition of the detection signal obtained from the array sensor 2 or associated with signal processing for the detection signals.

In this manner, a processing load of object detection for setting the ROI 21 or the AROI 22 is considerably reduced. Specifically, processing of step S203 is reduced. Accordingly, effects of processing load reduction, speed increase, and power consumption reduction are achievable.

According to the seventh and the eighth embodiments, the calculation unit 8 sets the active area RA such that the active area RA contains a detection region of object detection on the basis of which the previous ROI 21 or AROI 22 are generated, i.e., the bounding box 20.

A region which does not contain the bounding box 20 at all is produced in an image by continuation of processing in some cases. This area may be designated as the non-active area DA where a target object is not detectable, while the other area may be designated as the active area RA, i.e., a region where an object may be detected.

The active area RA can be easily and appropriately set on the basis of a plurality of the previous bounding boxes 20. Further, the active area RA suited for an image capturing environment, an image capturing direction, or the like can be set.

According to the seventh and the eighth embodiments, the calculation unit 8 detects an object from detection signals acquired from the array sensor 2 in a state where the ADC/pixel selector 3 has selected detection elements using the ROI 21 or the AROI 22, and instructs the ADC/pixel selector 3 to acquire detection signals of the active area in a following frame from the array sensor in a case where a target object is not detected (see S205, S201, and S252 in FIGS. 29 and 32).

Specifically, the calculation unit 8 returns acquisition of detection signals by the acquisition unit to a normal state when a target object is not detected any more in a frame for which only information associated with partial detection elements from the array sensor 2 has been acquired.

In this manner, the state returns to such a state where the object is detected from image signals of the active area in one frame, and detection of the target object is again achievable in a necessary range of the captured image. A state for monitoring of the entire image is thus practically produced.

According to the seventh and the eighth embodiments, the calculation unit 8 generates region information on the basis of object detection from detection signals of the active area RA in a keyframe of detection signals obtained from the array sensor 2 (see S201 and S252 in FIGS. 29 and 32).

This class identification is performed for not all frames but only the keyframe. Accordingly, a processing load imposed on the calculation unit 8 does not excessively increase. Further, a state for achieving appropriate object detection can be maintained by selecting the keyframe on the basis of an appropriate selection algorithm.

In this case, it is also adoptable to designate, as the keyframe, a frame obtained for every predetermined time interval, or at timing based on a command from the outside such as the processor 11.

According to the eighth embodiments, the calculation unit 8 identifies a class of an object detected from the detection signals obtained from the array sensor 2, and generates region information (AROI 22) corresponding to the object using a template corresponding to the identified class. Used in this case is the AROI 22 where parameters such as resolution are calculated on the basis of thresholds and recorded (see S262 and S211 in FIG. 32).

For example, image signals having minimum necessary quality or the like (e.g., minimum necessary resolution) for processing of object detection or the like can be output by setting (changing) the parameters in the acquisition region indicated by the AROI 22 using the thresholds.

Further, an image generated by designating pixels to be photoelectrically converted and converted into digital data using a template is an image suited for effective object detection achieved by a small data volume.

Accordingly, by using the template, and setting parameters such as resolution using thresholds, lowering of performance, accuracy, or the like of processing of following processes (e.g., object detection) is avoidable while reducing a data volume of image signals to be output. Further, power consumption reduction and processing speed increase are achievable accordingly.

Further, the template indicates an acquisition region for which detection signals are acquired for each class such as a "human" and a "car." Accordingly, information associated with a particularly necessary portion can be also intensively acquired for each class.

According to the ninth embodiment, provided is the threshold setting unit 85 that sets a threshold of a frame rate according to a class identified for an object detected from the detection signals obtained from the array sensor 2 such that a process using the frame rate set on the basis of the threshold is performed (see FIG. 35).

A frame rate suited for a class of a detection target is applicable by setting (changing) the frame rate using the threshold. Specifically, reduction of a data volume of image signals, power consumption reduction, and processing speed increase are achievable by reducing the frame rate while preventing lowering performance of object detection in the detection target class.

According to the ninth embodiment, the threshold setting unit 85 sets a threshold as a frame rate at which object tracking from an image is maintained.

In this manner, data reduction, power consumption reduction, processing speed increase, and the like according to classes are achievable while maintaining accuracy of object detection performed along with object tracking from an image.

According to the ninth embodiment, the calculation unit 8 uses a frame rate set by the threshold setting unit 85 as the frame rate in the second mode (normal mode) for raising the frame rate. In this manner, a frame rate relatively lowered according to classes is used in a case where the frame rate increases.

The first, the second, the third, the fourth, the fifth, the sixth, the seventh, the eighth, and the ninth embodiments can be combined as appropriate.

These combinations can increase the effects of the respective embodiments. Specifically, the effects of reduction of a data volume of image signals, power consumption reduction, processing speed increase, and the like can be further increased while maintaining accuracy of processing such as object detection from an image.

Note that advantageous effects to be produced are not limited to the advantageous effects described in the present description presented only by way of example. In addition, other advantageous effects may be offered.

Note that the present technology may adopt following configurations.

(1)

A sensor device including:

an array sensor that includes a plurality of visible light or invisible light imaging elements arranged one-dimensionally or two-dimensionally;

an image processing unit that performs image processing for image signals obtained by image capturing using the array sensor; and a threshold setting unit that sets a threshold used for parameter setting for all or some of parameters used for image capturing processing associated with image capturing performed by the array sensor or image processing performed by the image processing unit to achieve a process using the parameter set on the basis of the threshold.

(2)

The sensor device according to (1) described above, in which the threshold setting unit sets the threshold corresponding to a class of an object detected from the image signals.

(3)

The sensor device according to (1) or (2) described above, in which the threshold setting unit sets the threshold on the basis of a learning process performed for the image signals.

(4)

The sensor device according to any one of (1) to (3) described above, in which the threshold setting unit sets the threshold such that a predetermined rate is obtained as a confidence rate of object detection.

(5)

The sensor device according to any one of (1) to (4) described above,
in which the threshold setting unit is provided in a device having a housing identical to a housing of the image processing unit.

(6)

A sensor device including:
an array sensor that includes a plurality of detection elements arranged one-dimensionally or two-dimensionally;
a signal processing unit that acquires detection signals obtained by the array sensor, and performs signal processing for the detection signals; and
a calculation unit that detects an object from the detection signals obtained by the array sensor, and gives, to the signal processing unit, an instruction of region information generated on the basis of detection of the object as region information associated with acquisition of the detection signals obtained from the array sensor or associated with signal processing for the detection signals,
in which the calculation unit sets an active area of the detection signals acquired from the array sensor on the basis of information associated with previous region information, and detects the object using the detection signals of the active area.

(7)

The sensor device according to (6) described above,
in which the calculation unit sets the active area such that a plurality of pieces of region information generated in a previous predetermined period each contains a detection region detected by object detection on the basis of which the respective pieces of region information are generated.

(8)

The sensor device according to (6) or (7) described above,
in which the signal processing unit includes an acquisition unit that selectively acquires detection signals from the detection elements of the array sensor,
the acquisition unit acquires, as one frame of the detection signals, the detection signals of the detection elements selected on the basis of the region information received from the calculation unit, and,
in a case where a targeted object is not detected by object detection from the detection signals acquired from the array sensor in a state where the acquisition unit has selected the detection elements on the basis of the region information, the calculation unit instructs the acquisition unit to acquire the detection signals of the active area from the array sensor in a following frame.

(9)

The sensor device according to any one of (6) to (8) described above,
in which the calculation unit detects the object from the detection signals of the active area in a target frame designated as a keyframe in the detection signals obtained from the array sensor, and generates the region information on the basis of detection of the object.

(10)

The sensor device according to any one of (6) to (9) described above,
in which the calculation unit identifies a class of the object detected from the detection signals obtained from the array sensor, and generates region information corresponding to the object using a template that indicates an acquisition region of the detection signals in correspondence with the identified class, and
the calculation unit includes a threshold setting unit that sets a threshold for all or some of parameters used for signal processing performed by the signal processing unit or acquisition of the detection signals using the array sensor, and sets, on the basis of the threshold, the parameter for a process performed for the acquisition region indicated by the template.

(11)

A sensor device including:
an array sensor that includes a plurality of detection elements arranged one-dimensionally or two-dimensionally;
a signal processing unit that acquires detection signals obtained by the array sensor, and performs signal processing for the detection signals; and
a threshold setting unit that sets a threshold of a frame rate according to a class identified for an object detected from the detection signals obtained by the array sensor such that a process using the frame rate set on the basis of the threshold is performed according to the class identified for the object detected from the detection signals obtained by the array sensor.

(12)

The sensor device according to (11) described above,
in which the threshold setting unit sets the threshold as a frame rate at which object tracking from an image is maintained.

(13)

The sensor device according to (11) or (12) described above,
in which control is performed on the basis of a setting value of a frame rate of either a first mode or a second mode according to a result of object detection, and
a setting value of a frame rate set by the threshold setting unit is used as the setting value of the frame rate of one of the first mode and the second mode.

(14)

The sensor device according to any one of (1) to (13) described above, further including:
an output unit that outputs image signals subjected to image processing by the image processing unit to an external device.

(15)

The sensor device according to (14) described above,
in which the output unit also transmits information associated with class identification of the image signals to be output.

(16)

The sensor device according to any one of (1) to (15) described above,
in which the image processing unit performs, as image processing for the image signals, at least one of color correction, gamma correction, color gradation processing, gain processing, contour emphasis processing, data compression processing, frame rate conversion, resolution conversion, aspect ratio conversion, contrast adjustment processing, sharpness adjustment processing, gray level adjustment processing, or sampling rate change processing.

(17)

A signal processing method performed by a sensor device including
- an array sensor that includes a plurality of visible light or invisible light imaging elements arranged one-dimensionally or two-dimensionally, and
- an image processing unit that performs image processing for image signals obtained by image capturing using the array sensor, the signal processing method including:
setting a threshold used for parameter setting for all or some of parameters used for image capturing processing associated with image capturing performed by the array sensor or image processing performed by the image processing unit to achieve a process using the parameter changed on the basis of the threshold.

(18)

A signal processing method performed by a sensor device including
- an array sensor that includes a plurality of detection elements arranged one-dimensionally or two-dimensionally, and
- a signal processing unit that acquires detection signals obtained by the array sensor, and performs signal processing for the detection signals, the signal processing method including:
performing a process that detects an object from the detection signals obtained by the array sensor, and gives, to the signal processing unit, an instruction of region information generated on the basis of detection of the object as region information associated with acquisition of the detection signals obtained from the array sensor or associated with signal processing for the detection signals;
performing a process that sets an active area of the detection signals acquired from the array sensor on the basis of previous region information; and
detecting the object using the detection signals of the active area as the detection signals obtained by the array sensor.

(19)

A signal processing method performed by a sensor device including
- an array sensor that includes a plurality of detection elements arranged one-dimensionally or two-dimensionally, and
- a signal processing unit that acquires detection signals obtained by the array sensor, and performs signal processing for the detection signals, the signal processing method including:
setting a threshold of a frame rate according to a class identified for an object detected from the detection signals obtained by the array sensor such that a process using the frame rate set on the basis of the threshold is performed according to the class identified for the object detected from the detection signals obtained by the array sensor.

REFERENCE SIGNS LIST

1: Sensor device
2: Array sensor
3: ADC/pixel selector
4: Buffer
5: Logic unit
6: Memory
7: Interface unit
8: Calculation unit
11: Processor
12: External sensor
20: Bounding box
21: ROI
22: Advanced ROI (AROI)
23: Candidate region
30: Signal processing unit
81: Keyframe selection unit
82: Object region recognition unit
83: Class identification unit
84: Parameter selection unit
85: Threshold setting unit
100: Terminal apparatus

The invention claimed is:

1. A sensor device comprising:
an array sensor that includes a plurality of detection elements arranged one-dimensionally or two-dimensionally, and
an electronic processor configured to
selectively acquire detection signals obtained by the array sensor;
perform signal processing for the detection signals;
detect an object from the detection signals obtained by the array sensor;
output an instruction of region information generated on a basis of detection of the object as region information associated with acquisition of the detection signals obtained from the array sensor or associated with signal processing for the detection signals;
set an active area of the detection signals acquired from the array sensor on a basis of information associated with previous region information; and
detect the object using the detection signals of the active area,
wherein selectively acquiring detection signals includes acquiring, as one frame of the detection signals, the detection signals of the detection elements selected on a basis of the region information, and
the electronic processor is further configured to, in a case where a targeted object is not detected by object detection from the detection signals acquired from the array sensor in a state where the detection elements are selected on the basis of the region information, acquire the detection signals of the active area from the array sensor in a following frame.

2. The sensor device according to claim 1, wherein
the active area is set such that a plurality of pieces of region information generated in a previous predetermined period each contains a detection region detected by object detection on a basis of which the respective pieces of region information are generated.

3. The sensor device according to claim 1, wherein the electronic processor is further configured to
detect the object from the detection signals of the active area in a target frame designated as a keyframe in the detection signals obtained from the array sensor, and generate the region information on the basis of detection of the object.

4. The sensor device according to claim 1, wherein the electronic processor is further configured to
identify a class of the object detected from the detection signals obtained from the array sensor;
generate region information corresponding to the object using a template that indicates an acquisition region of the detection signals in correspondence with the identified class;

set a threshold for all or some of parameters used for signal processing or acquisition of the detection signals using the array sensor; and set, on the basis of the threshold, the parameter for a process performed for the acquisition region indicated by the template.

5. A sensor device comprising:

an array sensor that includes a plurality of detection elements arranged one-dimensionally or two-dimensionally; and an electronic processor configured to acquire detection signals obtained by the array sensor;

perform signal processing for the detection signals; and set a threshold of a frame rate according to a class identified for an object detected from the detection signals obtained by the array sensor such that a process using the frame rate set on a basis of the threshold is performed according to the class identified for the object detected from the detection signals obtained by the array sensor, wherein the threshold is set as a frame rate at which object tracking from an image is maintained.

6. The sensor device according to claim 5, wherein control is performed on a basis of a setting value of a frame rate of either a first mode or a second mode according to a result of object detection, and a setting value of a set frame rate set is used as the setting value of the frame rate of one of the first mode and the second mode.

7. The sensor device according to claim 5, wherein the electronic processor is further configured to:

output image signals subjected to signal processing to an external device.

8. The sensor device according to claim 7, wherein the electronic processor is further configured to transmit information associated with class identification of the image signals to be output.

9. The sensor device according to claim 5, wherein the electronic processor is further configured to perform, as signal processing, at least one of color correction, gamma correction, color gradation processing, gain processing, contour emphasis processing, data compression processing, frame rate conversion, resolution conversion, aspect ratio conversion, contrast adjustment processing, sharpness adjustment processing, gray level adjustment processing, or sampling rate change processing.

10. A sensor device comprising:

an array sensor having a plurality of detection elements arranged one-dimensionally or two-dimensionally, and an electronic processor configured to acquire detection signals obtained by the array sensor;

perform signal processing for the detection signals;

detect an object from the detection signals obtained by the array sensor;

output an instruction of region information generated on a basis of detection of the object as region information associated with acquisition of the detection signals obtained from the array sensor or associated with signal processing for the detection signals;

set an active area of the detection signals acquired from the array sensor on a basis of information associated with previous region information;

detect the object using the detection signals of the active area in a target frame designated as a keyframe in the detection signals obtained from the array sensor; and generate the region information on the basis of detection of the object.

11. A sensor device comprising:

an array sensor having a plurality of detection elements arranged one-dimensionally or two-dimensionally, and an electronic processor configured to acquire detection signals obtained by the array sensor;

perform signal processing for the detection signals;

detect an object from the detection signals obtained by the array sensor;

output an instruction of region information generated on a basis of detection of the object as region information associated with acquisition of the detection signals obtained from the array sensor or associated with signal processing for the detection signals;

set an active area of the detection signals acquired from the array sensor on a basis of information associated with previous region information;

detect the object using the detection signals of the active area;

identify a class of the object detected from the detection signals obtained from the array sensor;

generate region information corresponding to the object using a template that indicates an acquisition region of the detection signals in correspondence with the identified class;

set a threshold for all or some of parameters used for signal processing or acquisition of the detection signals using the array sensor; and set, on the basis of the threshold, the parameter for a process performed for the acquisition region indicated by the template.

12. A sensor device comprising:

an array sensor having a plurality of detection elements arranged one-dimensionally or two-dimensionally, and an electronic processor configured to acquire detection signals obtained by the array sensor;

perform signal processing for the detection signals;

set a threshold of a frame rate according to a class identified for an object detected from the detection signals obtained by the array sensor such that a process using the frame rate set on a basis of the threshold is performed according to the class identified for the object detected from the detection signals obtained by the array sensor, wherein control is performed on a basis of a setting value of a frame rate of either a first mode or a second mode according to a result of object detection, and a setting value of a set frame rate is used as the setting value of the frame rate of one of the first mode and the second mode.

13. A non-transitory computer readable medium storing instructions that, when executed by an electronic processor, cause the electronic processor to perform a set of operations comprising:

selectively acquiring detection signals obtained by an array sensor that includes a plurality of detection elements arranged one-dimensionally or two-dimensionally;

performing signal processing for the detection signals;

detecting an object from the detection signals obtained by the array sensor;

outputting an instruction of region information generated on a basis of detection of the object as region information associated with acquisition of the detection signals obtained from the array sensor or associated with signal processing for the detection signals;

setting an active area of the detection signals acquired from the array sensor on a basis of information associated with previous region information; and detecting the object using the detection signals of the active area, wherein selectively acquiring detection signals includes acquiring, as one frame of the detection signals, the detection signals of the detection elements selected on a basis of the region information, and the set of operations further include, in a case where a targeted object is not detected by object detection from the detection signals acquired from the array sensor in a state where the detection elements are selected on the basis of the region information, acquiring the detection signals of the active area from the array sensor in a following frame.

14. A non-transitory computer readable medium storing instructions that, when executed by an electronic processor, cause the electronic processor to perform a set of operations comprising:

acquiring detection signals obtained by an array sensor that includes a plurality of detection elements arranged one-dimensionally or two-dimensionally;

performing signal processing for the detection signals; and setting a threshold of a frame rate according to a class identified for an object detected from the detection signals obtained by the array sensor such that a process using the frame rate set on a basis of the threshold is performed according to the class identified for the object detected from the detection signals obtained by the array sensor, wherein the threshold is set as a frame rate at which object tracking from an image is maintained.

15. A non-transitory computer readable medium storing instructions that, when executed by an electronic processor, cause the electronic processor to perform a set of operations comprising:

acquiring detection signals obtained by an array sensor having a plurality of detection elements arranged one-dimensionally or two-dimensionally;

performing signal processing for the detection signals;

detecting an object from the detection signals obtained by the array sensor;

outputting an instruction of region information generated on a basis of detection of the object as region information associated with acquisition of the detection signals obtained from the array sensor or associated with signal processing for the detection signals;

setting an active area of the detection signals acquired from the array sensor on a basis of information associated with previous region information;

detecting the object using the detection signals of the active area in a target frame designated as a keyframe in the detection signals obtained from the array sensor; and generating the region information on the basis of detection of the object.

16. A non-transitory computer readable medium storing instructions that, when executed by an electronic processor, cause the electronic processor to perform a set of operations comprising:

acquiring detection signals obtained by an array sensor having a plurality of detection elements arranged one-dimensionally or two-dimensionally;

performing signal processing for the detection signals;

detecting an object from the detection signals obtained by the array sensor;

outputting an instruction of region information generated on a basis of detection of the object as region information associated with acquisition of the detection signals obtained from the array sensor or associated with signal processing for the detection signals;

setting an active area of the detection signals acquired from the array sensor on a basis of information associated with previous region information;

detecting the object using the detection signals of the active area;

identifying a class of the object detected from the detection signals obtained from the array sensor;

generating region information corresponding to the object using a template that indicates an acquisition region of the detection signals in correspondence with the identified class;

setting a threshold for all or some of parameters used for signal processing or acquisition of the detection signals using the array sensor; and setting, on the basis of the threshold, the parameter for a process performed for the acquisition region indicated by the template.

17. A non-transitory computer readable medium storing instructions that, when executed by an electronic processor, cause the electronic processor to perform a set of operations comprising:

acquiring detection signals obtained by an array sensor having a plurality of detection elements arranged one-dimensionally or two-dimensionally;

performing signal processing for the detection signals; and setting a threshold of a frame rate according to a class identified for an object detected from the detection signals obtained by the array sensor such that a process using the frame rate set on a basis of the threshold is performed according to the class identified for the object detected from the detection signals obtained by the array sensor, wherein control is performed on a basis of a setting value of a frame rate of either a first mode or a second mode according to a result of object detection, and a setting value of a set frame rate is used as the setting value of the frame rate of one of the first mode and the second mode.

18. A signal processing method performed by a sensor device, the method comprising:

acquiring detection signals obtained by an array sensor having a plurality of detection elements arranged one-dimensionally or two-dimensionally;

performing signal processing for the detection signals;

detecting an object from the detection signals obtained by the array sensor;

outputting an instruction of region information generated on a basis of detection of the object as region information associated with acquisition of the detection signals obtained from the array sensor or associated with signal processing for the detection signals;

setting an active area of the detection signals acquired from the array sensor on a basis of information associated with previous region information;

detecting the object using the detection signals of the active area;

identifying a class of the object detected from the detection signals obtained from the array sensor;

generating region information corresponding to the object using a template that indicates an acquisition region of the detection signals in correspondence with the identified class;

setting a threshold for all or some of parameters used for signal processing or acquisition of the detection signals using the array sensor; and setting, on the basis of the threshold, the parameter for a process performed for the acquisition region indicated by the template.

* * * * *